(12) United States Patent
Hazel

(10) Patent No.: US 10,665,010 B2
(45) Date of Patent: May 26, 2020

(54) GRAPHICS PROCESSING SYSTEMS

(71) Applicant: GEOMERICS LTD, Cambridge (GB)

(72) Inventor: Graham Paul Hazel, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 15/625,597

(22) Filed: Jun. 16, 2017

(65) Prior Publication Data

US 2017/0365090 A1  Dec. 21, 2017

(30) Foreign Application Priority Data

Jun. 17, 2016 (GB) .................................... 1610608.0

(51) Int. Cl.
*G06T 15/50* (2011.01)
*G06T 15/40* (2011.01)
*G06T 15/60* (2006.01)
*G06T 17/00* (2006.01)

(52) U.S. Cl.
CPC ............ *G06T 15/506* (2013.01); *G06T 15/40* (2013.01); *G06T 15/60* (2013.01); *G06T 17/005* (2013.01)

(58) Field of Classification Search
CPC .............................. G06T 15/506; G06T 15/40
USPC ........................................................ 345/421
See application file for complete search history.

(56) References Cited

U.S. PATENT DOCUMENTS

| | | | |
|---|---|---|---|
| 3,889,107 A * | 6/1975 | Sutherland | G06T 15/405 345/421 |
| 6,535,209 B1 | 3/2003 | Abdalla | |
| 6,760,024 B1 | 7/2004 | Lokovic | |
| 7,868,901 B1 | 1/2011 | Edmondson | |
| 8,026,915 B1 | 9/2011 | Laur | |
| 8,217,949 B1 | 7/2012 | Carpenter | |
| 8,704,826 B1 | 4/2014 | Hakura | |
| 9,741,159 B2 | 8/2017 | Hazel | |
| 2004/0125103 A1* | 7/2004 | Kaufman | G06T 15/06 345/419 |

(Continued)

FOREIGN PATENT DOCUMENTS

GB  2525636  4/2015

OTHER PUBLICATIONS

GB Combined Search and Examination Report dated Dec. 8, 2016, GB Patent Application No. GB1610608.0.

(Continued)

*Primary Examiner* — Hai Tao Sun
(74) *Attorney, Agent, or Firm* — Vierra Magen Marcus LLP

(57) ABSTRACT

When rendering a scene for output that includes a light source that could cast shadows in a graphics processing system, the world-space volume for the scene to be rendered is first partitioned into a plurality of sub-volumes, and then a set of geometry to be processed for the scene that could cast a shadow from a light source to be considered for the scene in the sub-volume is determined for any sub-volume that is lit by a light source. The determined sets of geometry for the sub-volumes are then used to determine light source visibility parameters for output samples, such as vertex positions and/or screen space sampling positions, for the scene. The determined light source visibility parameter for an output sample is then used to modulate the effect of the light source at the output sample when rendering an output version of the output sample.

19 Claims, 20 Drawing Sheets

(56) References Cited

U.S. PATENT DOCUMENTS

| | | |
|---|---|---|
| 2004/0207623 A1 | 10/2004 | Isard |
| 2004/0239673 A1 | 12/2004 | Schmidt |
| 2004/0263511 A1 | 12/2004 | West |
| 2005/0134588 A1 | 6/2005 | Aila |
| 2007/0247472 A1 | 10/2007 | Tong |
| 2008/0049017 A1* | 2/2008 | Shearer .................. G06T 15/06 345/421 |
| 2013/0187947 A1 | 7/2013 | Barringer |
| 2013/0241938 A1 | 9/2013 | Gruber |
| 2013/0328873 A1 | 12/2013 | Harada |
| 2014/0176529 A1 | 6/2014 | Meixner |
| 2014/0300619 A1 | 10/2014 | Hasselgren |
| 2015/0042655 A1 | 2/2015 | Gautron |
| 2015/0254889 A1 | 9/2015 | Bakalash |
| 2015/0317825 A1 | 11/2015 | Hazel |
| 2016/0093098 A1 | 3/2016 | Anderson |
| 2016/0203635 A1 | 7/2016 | Wyman |
| 2016/0260249 A1 | 9/2016 | Persson |

OTHER PUBLICATIONS

PCT Patent Application No. PCT/GB2017/050365, filed Feb. 10, 2017.

GB Search Report dated Oct. 20, 2014 in Great Britain Patent Application No. GB1407609.5, 3 pages.

Martin, Sam "Real Time Area Lighting Now and Next" Geomerics, AltDevConf 2012, 51 pages.

Burns, et al. "The Visibility Buffer: A Cache-Friendly Approach to Deferred Shading" Journal of Computer Graphics Techniques, pp. 55-69, vol. 2, No. 2, 2013.

Sintorn, et al. "An Efficient Alias-free Shadow Algorithm for Opaque and Transparent Objects using per-triangle Shadow Volumes" Proceedings of the 2011 Siggraph Asia Conference, Article No. 153, 10 pages.

Sintorn, et al. "Per-Triangle Shadow Volumes Using a View-Sample Cluster Hierarchy" Proceedings of the 18th meeting of the ACM Siggraph Symposium on Interactive 3D Graphics and Games, 2014, pp. 111-118.

Office Action dated Dec. 13, 2018, U.S. Appl. No. 15/804,755.

Notice of Allowance dated to Office Action dated May 28, 2019, U.S. Appl. No. 15/804,755.

Response to Office Action dated Mar. 13, 2019, U.S. Appl. No. 15/804,755.

* cited by examiner

US 10,665,010 B2

GRAPHICS PROCESSING SYSTEMS

BACKGROUND

The technology described herein relates to graphics processing systems and in particular to methods of and apparatus for taking account of the effect of shadows when rendering images for display.

The Applicants have previously proposed in their GB Patent Application GB-A-2525636 a technique for taking account of the effect of shadows when rendering images for output. In this technique, for each region of a frame being rendered, a set of geometry that could cast a shadow is determined, and then for each sampling position of a set of sampling positions for the region of the frame being rendered, a light source visibility parameter is determined using the determined set of geometry. The so-determined light source visibility parameters are then used, e.g., to modulate a light source when shading the geometry in the frame region to produce the effect of shadows in the frame region.

The Applicants believe that there remains scope for improvements to this technique that they have previously proposed for taking account of the effect of shadows when rendering images for output.

BRIEF DESCRIPTION OF DRAWINGS

A number of embodiments of the technology described herein will now be described by way of example only and with reference to the accompanying drawings, in which.

Like reference numerals are used for like components where appropriate in the drawings.

DETAILED DESCRIPTION

Figure 1:
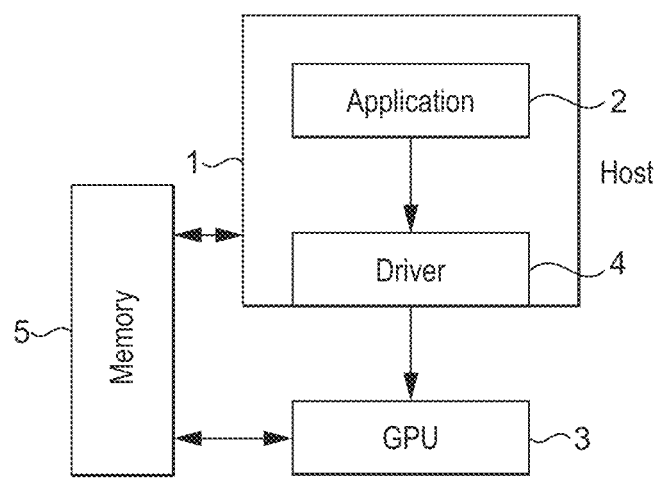
FIG. 1 shows an exemplary computer graphics processing system.

A first embodiment of the technology described herein comprises a method of operating a graphics processing system when rendering a scene for output that includes a light source that could cast shadows, the method comprising:

partitioning the world-space volume for the scene to be rendered into a plurality of sub-volumes;

for at least one sub-volume for the scene being rendered:
determining a set of geometry to be processed for the scene that could cast a shadow from a light source to be considered for the scene in the sub-volume; and for at least one output sample for the scene being rendered:
determining a light source visibility parameter using the determined set of geometry for a sub-volume that the world-space volume for the scene has been partitioned into.

A second embodiment of the technology described herein comprises a graphics processing system comprising processing circuitry configured to, when rendering a scene for output that includes a light source that could cast shadows:

partition the world-space volume for the scene to be rendered into a plurality of sub-volumes;

for at least one sub-volume for the scene being rendered:
determine a set of geometry to be processed for the scene that could cast a shadow from a light source to be considered for the scene in the sub-volume; and for at least one output sample for the scene being rendered:
determine a light source visibility parameter using the determined set of geometry for a sub-volume that the world-space volume for the scene has been partitioned into.

The technology described herein is directed to a method and apparatus for taking account of the effect of shadows when rendering a scene for output. In the technology described herein, like in the Applicant's earlier patent application, a set of geometry that could cast a shadow is determined and then used to determine a light source visibility parameter for an output sample or samples.

However, in contrast to the arrangement described in the Applicant's earlier patent application, in the technology described herein the sets of geometry are determined for sub-volumes of the world-space output volume that the scene will be rendered for, rather than for particular screen space frame regions. In other words, the sets of geometry that could cast a shadow are determined for respective volumes in the 3D-world-space that the scene to be rendered occupies, rather than in the two dimensional screen space that the scene will be rendered to.

As will be discussed further below, the Applicants have recognised that determining sets of geometry that could cast shadows for volumes in world-space can facilitate using the techniques described in the Applicant's earlier UK patent application in other situations and at other stages in the overall rendering process, thereby potentially facilitating more efficient and effective rendering that takes account of the effect of shadows.

For example, unlike in the Applicant's previously described arrangement, the arrangement of the technology described herein can be used to potentially accelerate the operation when attempting to take account of the effect of shadows in advance of any set of geometry actually being defined in the screen space (and, e.g., in advance of any transformation of the geometry from the 3D world-space for the scene to the screen space that the scene will be rendered to). It can also facilitate sorting geometry that could cast a shadow into smaller volumes of the scene, even where there has been no "structure" yet defined within the volume for the scene.

The technology described herein can also allow, for example, light source visibility parameters to be determined, e.g., for discrete positions within the 3D world-space of the scene, rather than, e.g., being tied to particular screen space sampling positions. In particular, it is suitable for deriving per-vertex and per-sample visibility parameters for an arbitrary set of points in the 3D world-space occupied by the scene. This can facilitate, for example, more efficiently and effectively taking account of the effect of shadows when rendering scenes that contain, for example, "volumetric effects", such as smoke or other particles in space, and in particular, if such "volumes" are moving within the scene (e.g. between frames).

The world-space for the scene being rendered should, and in an embodiment does, correspond to the volume of world-space that will be considered when rendering the scene. It may e.g be, and in one embodiment is, the entire world space that contains anything in the virtual world for the scene being rendered. In an embodiment it corresponds to a or the camera volume in world-space being considered when rendering the scene. (In this case, there could be a single camera volume being considered, or plural camera volumes could be considered (e.g. where there are plural camera positions to be considered for the scene). In the latter case, the plural camera volumes could be considered and processed collectively (altogether, as a larger, composite volume), or the process could be performed for each camera volume separately (individually).)

("World-space" is (in an embodiment) intended herein to refer to the space for the scene being rendered as defined by standard Cartesian 3D coordinates in a fixed frame of reference (as opposed e.g., to camera-space (viewpoint) coordinates or other coordinates)).

The world-space volume for the scene that is being rendered can be partitioned (divided) into a plurality of sub-volumes for the purposes of the technology described herein in any suitable and desired manner. This may, and in an embodiment does, depend upon what graphics "structure" (structural elements), if any, has already been defined in the world-space for the scene when the partitioning of the world-space for the scene is to be done.

The scene volume should be divided into plural sub-volumes for the purposes of the technology described herein. The number of sub-volumes may be selected as desired, e.g. so as to ensure that there is enough parallel work to fill the graphics processor (GPU). In an embodiment the scene volume is divided into at least 1,000 sub-volumes, and in an embodiment between 1,000s and 10,000s of sub-volumes. In an embodiment, the sub-volumes do not overlap (in an embodiment none of the sub-volume overlap with each other).

As will be discussed further below, while it is likely that a (and plural or each) sub-volume that the world-space volume for the scene is partitioned into will have a "volume" within the world-space volume for the scene (i.e. have a length, width and depth within the world-space volume for the scene), the Applicants have recognised that in certain circumstances, a "sub-volume" may only have an area (i.e. a length and width, but zero depth) within the volume of world-space for the scene, or, indeed, simply comprise a line or point within the volume of world-space for the scene. This may in particular be the case where the volume of world-space for the scene is partitioned into the sub-volumes based on structural elements defined for the scene within the world-space for the scene (as will be discussed further below).

For example, where a group of coplanar (axis-aligned) structural elements is being used to define a sub-volume for the scene, that coplanar (axis-aligned) group of structural elements may have zero depth and/or zero depth and width in the world-space volume for the scene.

Thus while the sub-volumes that the world-space volume for the scene is partitioned into in the technology described herein will typically be "volumes" having (non-zero) lengths, widths and depths in the world-space for the scene, the sub-volumes in the technology described herein could equally comprise portions of the world-space volume for the scene that have no (have zero) extent in a given direction or directions in the world-space volume for the scene (e.g. are planar having zero depth, or are linear having zero width and depth).

The technology described herein extends to all of these possible arrangements and configurations for the sub-volumes. Thus in an embodiment, the volume of world-space for the scene is partitioned into a plurality of sub-volumes that each have a (non-zero) length, width and depth in the world-space volume of the scene. In another embodiment, one or more of the sub-volumes that the world-space volume for the scene is partitioned into have zero depth (are planar), and/or have zero depth and width (are linear). This could be the case for all the sub-volumes that the volume of world-space for the scene is partitioned into, but may be more likely to be the case for some but not all of the sub-volumes. Thus in an embodiment, the volume of world-space for the scene is partitioned into one or more sub-volumes that have a length, a width and a depth in the world-space volume for the scene, and one or more other sub-volumes that have zero depth (and (potentially) zero depth and width) in the world-space volume for the scene.

For example, where a group of coplanar (axis-aligned) structural elements is being used to define a sub-volume for the scene, that coplanar (axis-aligned) group of structural elements may have zero depth and/or zero depth and width in the world-space volume for the scene.

In an embodiment, the volume of world-space for the scene is partitioned into a plurality of, in an embodiment equal, sub-volumes based on the position and size (volume) of each sub-volume, irrespective of (and without reference to) any graphics structure that may be present in and defined for the world space volume for the scene. In this case, the world-space occupied by the scene is in an embodiment divided into a plurality of sub-volumes as evenly as possible. Thus, in an embodiment, the world-space for the scene being rendered is partitioned into a plurality of equal sized and same shaped sub-volumes for the purposes of the technology described herein.

This may be particularly appropriate where, for example, there is no graphics structure (other than the scene bounds in world-space) defined in the world-space volume when it is desired to partition that volume.

This arrangement may also be appropriate where it is simply desired to determine and sort the geometry that could cast shadows for respective sub-volumes within the overall volume in world-space occupied by the scene, for example in an arrangement where it is desired to cast shadows on some dynamic (moving) structure, such as smoke or other particles that may move through the volume of the scene from frame-to-frame.

In this case, the size and shape of the sub-volumes that the overall world-space volume is divided into can be selected as desired. In an embodiment, each volume is cuboid, in an embodiment a rectangular cuboid, and in an embodiment a cube.

Where there is some structure, such as a set of positions, defined for the scene defined in the world-space in advance of the scene volume partitioning process, then it would still be possible simply to divide the scene volume into, e.g. equal, sub-volumes, e.g., and in an embodiment, without any regard to the actual structure that is defined within the scene volume.

In an embodiment, where there is some structure defined for the scene volume, then the subdivision of the scene volume into such volumes is based, at least in part (takes account, at least in part) of any structure (structural elements) for the scene that is defined within the scene volume in world-space. For example, where there is geometry defined in the scene volume in world-space, then the subdivision of the scene volume in world-space into sub-volumes for the purposes of the technology described herein in an embodiment takes account of, and is in an embodiment based on, at least in part, the geometry that is defined in the scene volume in world-space.

The graphics "structure" (structural elements) that may be defined for the scene in world-space in this regard may be any suitable such graphics structure or structural elements, such as defined points and/or positions in world-space, defined objects (e.g. primitives) in world-space, etc.

In an embodiment, the structure (structural elements) that is defined in world-space in this regard comprises a set of discrete positions that are defined for the scene in the world-space. In this case, the positions are in an embodiment positions in the 3D world-space that each have an associated normal direction. Such positions could, for example, and in an embodiment do, comprise one or more of: vertices defined for the scene (vertex positions defined for the scene); (sampling) positions in the 3D world-space defined for the scene (e.g. in the case where the scene includes a volumetric effect such as smoke or other particles distributed in the world-space for the scene); and/or points on surfaces that need to be shaded that are defined in the world-space for the scene.

Thus in an embodiment, the subdivision of the scene volume in world-space into sub-volumes is in an embodiment based on and takes account of positions that are defined for the scene in the world-space.

In such arrangements, the 3D world-space volume for the scene may be divided into sub-volumes for the purposes of the technology described herein based on the structure (structural elements), e.g. positions, that are defined in the world-space for the scene in any suitable and desired manner.

In an embodiment, the structural elements defined in the world-space for the scene are divided into plural groups of those structural elements to thereby divide the volume for the scene into a plurality of sub-volumes (with each sub-volume being and corresponding to the volume of world space occupied by the group in question).

Thus, in an embodiment, a set of defined positions for the scene within the world-space for the scene are divided into plural groups of those positions to thereby divide the volume for the scene into a plurality of sub-volumes. These positions may, e.g., be vertex positions or other sampling positions defined in the world-space for the scene.

The structural elements, e.g. defined positions, within the world-space can be divided into groups for this purpose in any suitable and desired manner.

In an embodiment, the structural elements, e.g. positions, defined for the scene are divided into groups for this purpose based on the (size of the) volume of world-space that will be occupied by the structural elements, e.g. positions, in the group.

This could be done, e.g., and in an embodiment, so as to try to have the size of the volume of 3D world-space occupied by each group of structural elements being as similar as possible.

In an embodiment, the structural elements, e.g. positions, within the world-space are divided into groups such that the volumes of world-space occupied by the groups do not overlap with each other.

In an embodiment the structural elements, e.g. positions, defined for the scene are divided into groups so as to reduce (e.g. minimise) the size of the volume in world-space that will be occupied by each group. Thus, the division of the structural elements, e.g. positions, defined for the scene into groups is in an embodiment based on their proximity to each other in the world-space for the scene.

In an embodiment the structural elements, e.g. positions, within the world-space are divided into groups such that the volumes of world-space occupied by the groups are smaller in size, and in an embodiment are as small in size as possible (such that the volume occupied by each group is made more compact (based on the "compactness" of the volume of world-space occupied by each group)).

The "size" of the volume occupied by a group of structural elements in this regard can be considered and assessed in any appropriate and desired manner. It is in an embodiment considered in terms of the size of the bounding volume (box) for the group of structural elements, e.g. positions. The size may not be a volume itself, but could, and in an embodiment does, also bear some relation to, e.g. the area occupied by the group of structural elements. This will then allow for coplanar (axis aligned) groups of structural elements, e.g. positions (which would accordingly have a "zero-volume" bounding box, but a bounding rectangle having a particular area). Suitable measures for the size of the volume occupied by a group of structural elements comprise, e.g., the length of the diagonal or diagonals of a bounding box for a group of structural elements, the sum of the axis extents of a bounding box for a group of structural elements, and/or the surface area of a bounding box for a group of structural elements.

Correspondingly, a measure of the "compactness" of a group's size (e.g. of whether the size is minimised or not), could, for example, be based on any suitable measure of the size occupied by the group that is indicative of its "compactness" or not, such as a measure of the perimeter or diagonals of the bounding box occupied by the group, of the surface area of the bounding box occupied by the group, etc.

In an embodiment, the structural elements, e.g. positions, are also or instead (and in an embodiment also) divided into groups based on the number of (taking account of the number of) structural elements that are or will be present in the groups (in each group). In an embodiment, this is based on the density of the structural elements within the world-space volume for the scene. For example, where the structural elements are denser, then in an embodiment, the groups are configured to contain more structural elements, but where the structural elements are less dense, the groups are configured to contain fewer structural elements. In the latter case, it could be the case that each group contains only a single structural element, for example.

In an embodiment, the structural elements, e.g. positions, are also or instead (and in an embodiment also) divided into groups such that, e.g., and in an embodiment, each group either has the same number of elements, e.g. positions, in it, and/or no more than a maximum number of elements, e.g. positions, in it.

Thus, in an embodiment, the structural elements, e.g., positions, in the world-space are grouped so as to constrain the number of positions within each group, and/or so as to constrain the volume in world-space occupied by each group.

Correspondingly, in an embodiment, the structural elements, e.g. positions, defined in the world-space are divided into groups such that each group contains the same particular, in an embodiment selected, and in an embodiment fixed, number of elements (e.g. positions) (or at least no more than a particular, and in an embodiment selected, in an embodiment predefined, maximum number of elements (e.g. positions)), and, in an embodiment, also based on the volume of world-space that will be occupied by the group (and in an embodiment such that the volume of world-space occupied by each group is "minimised").

In arrangements where the world-space volume for the scene is divided based on structure that is defined in the world-space for the scene, then in an embodiment, each structure (e.g. discrete position) that is defined in the world-space is in an embodiment assigned to (associated with) a respective sub-volume that the world-space volume occupied by the scene has been divided into, but it is not necessarily the case (and not required to be the case) that there is a sub-volume for each and every part of the world-space volume for the scene. For example, for regions of the world-space volume for the scene where there is no structure (e.g. discrete positions) defined, then there may not be, and does not need to be (and in an embodiment is not), a corresponding sub-volume defined for that region of the world-space volume for the scene.

In the case where the sub-volumes are based on a subdivision of structure defined in the world-space for the scene being rendered, then in an embodiment the volume of world space that is occupied by each sub-volume is based on, and in an embodiment corresponds to, the world-space volume occupied by the defined structural elements for sub-volume in question. In this case therefore, the sub-volumes will be configured to "fit" the structural elements in question.

In these arrangements, the volume of world-space that the group of structural elements (e.g. positions) falls within (occupies) can be determined in suitable and desired way. In an embodiment, this volume (and thus the sub-volume in question) comprises a bounding volume for the group of structural elements, and most in an embodiment an axis aligned bounding volume for the group of structural elements. Thus, in an embodiment, minimum and maximum x, y and z values are determined (and in an embodiment stored) for each group of structural elements, indicating the extent of the group of structural elements in each respective axis direction. For example, and in an embodiment, the minimum and maximum values in each axis direction (e.g. x, y, z) for all the positions that the group of structural elements includes are determined (and stored) as indicating the volume of space that the group of structural elements relates to (encompasses).

Other arrangements, such as more sophisticated forms of bounding volume, would, of course, be possible.

In the case where the sub-volumes are based on a subdivision of structure defined in the world-space for the scene being rendered, then in an embodiment, the structural elements defined for the scene in world-space are grouped into groups to define sub-volumes within the world-space volume for the scene once for a scene and/or for a sequence of output frames to be generated, with the volumes occupied by the groups of structural elements then being updated if and as the structural elements change position (e.g. from frame-to-frame) within the world-space volume for the scene. In this case, the structural elements for the scene which are grouped together to define the sub-volumes will remain the same over a period of time (e.g. for the scene in question and/or over a sequence of output frames being rendered), but the volumes (e.g. bounding boxes) occupied by the group of structural elements will be updated if and as the structural element's positions change.

Alternatively, the structural elements could be repartitioned into groups for each, e.g., frame, to allow for movement within the scene.

Once the world-space volume for the scene has been partitioned into the plurality of sub-volumes, then in an embodiment for each sub-volume that the world-space volume for the scene has been divided into, data indicating the volume of world-space that that sub-volume occupies is stored (and, if necessary, first generated).

The data that is stored for a sub-volume that represents the volume of space that the sub-volume occupies can take any suitable and desired form. In an embodiment, this data indicates a bounding volume corresponding to the sub-volume, and most in an embodiment an axis-aligned bounding volume for the output volume.

Thus, in an embodiment, minimum and maximum x, y and z values are stored for each sub-volume, indicating the extent of the sub-volume in each respective axis direction.

Other arrangements, such as more sophisticated forms of bounding volume, would, of course, be possible.

In the case where the world-space volume for the scene being rendered is simply divided up on a "volume" basis, then the only property of each sub-volume may be the volume that it occupies. Thus in an embodiment all that is stored for each sub-volume is an indication of the volume that it occupies.

However, where there is structure for the scene defined for the world-space, and in particular where the world-space volume for the scene has been divided up into sub-volumes based at least in part on the structure (e.g. positions) that is defined for the scene in world-space, then in an embodiment as well as storing for each sub-volume that the world-space volume for the scene has been divided into, a representation of the world-space volume occupied by the sub-volume in question, there is also stored data representative of the "structure" (structural elements) (e.g. the discrete positions, e.g. vertex positions) that are present in the sub-volume in question.

Thus in an embodiment, there is stored for each sub-volume that the world-space volume for the scene is divided into, both an indication of the world-space volume occupied by the sub-volume, and an indication of the set of structural elements (e.g. the sample points and/or discrete positions) for the scene that fall within the sub-volume.

The data representative of the structural elements (e.g. positions) that are present in a sub-volume can represent the structural elements that are present in the sub-volume in any suitable and desired manner. Thus this may, for example, comprise a set or range of indices indicative of the structural elements (e.g. positions) in question, such as a set of vertex indices indicating the vertices that are present within the sub-volume.

The structural elements (e.g. positions) could also be indicated implicitly, e.g. based on each sub-volume corresponding to a known, particular, in an embodiment predefined, number of structural elements (e.g. positions) and the structural elements (e.g. positions) being divided up into sub-volumes in a particular, in an embodiment predefined (and thus known) order (such that the organisation of the sub-volumes implicitly defines which structural elements (e.g. positions) are present in each sub-volume), and/or by indicating, e.g., a first structural element (e.g. position) for the sub-volume, with it then being known how many structural elements (e.g. positions) following that structural element (e.g. position) in a particular, in an embodiment predefined, order (e.g. index order) of the structural elements will also be present in the sub-volume.

Other arrangements would, of course, be possible.

The data for the sub-volumes that the world-space volume has been divided into can be stored in any suitable and desired manner, e.g. in any suitable and desired (overall) data structure.

In an embodiment, the data for the sub-volumes that the world-space volume has been divided into is stored as a tree representation for representing the sub-volumes that the world-space volume has been divided into, with each leaf node of the tree representing one of the sub-volumes that the world-space volume has been divided into has been divided into, and there being stored for each leaf node of the tree, data for the corresponding sub-volume as discussed above.

Thus, in an embodiment, the method of the technology described herein comprises (and the processing circuitry is configured to):

generating a tree representation for representing the sub-volumes that the world-space volume has been divided into, the tree representation being configured such that each leaf node of the tree represents one of the sub-volumes that the world-space volume has been divided into, and each parent node of the tree represents a volume of the world-space volume corresponding to the combination of the sub-volumes of all of its child nodes;

and generating and storing for each leaf node of the tree representation, data indicating the volume of world-space that the sub-volume that the leaf node represents falls within, and, optionally, but in an embodiment, data representative of graphics structural elements defined for the scene that fall within the sub-volume that the leaf node represents.

Thus, once the world-space for the scene has been divided into plural sub-volumes, a tree representation of the sub-volumes is in an embodiment generated, with each leaf node of the tree corresponding to a respective sub-volume that the world-space volume has been divided into (thus there will be the same number of leaf nodes as there are sub-volumes).

The sub-volumes can be arranged as respective leaf nodes in any desired and suitable manner. In an embodiment the sub-volumes are arranged as (assigned to) the leaf nodes based on their spatial location(s) (and in an embodiment so as to minimize the "size" of the nodes of the tree representation(s) (as discussed above in relation to grouping structural elements for the scene)).

Each leaf node of the tree each represents a given sub-volume that the world-space volume has been divided into. Each higher node in the tree represents the combination of the sub-volumes that each of its child nodes represents. Thus, for example, a parent node that has N leaf nodes as its child nodes will represent the combination of the N sub-volumes that the N child leaf nodes represent. This is repeated up the tree representation for each higher node (such that the root node of the tree will represent the entire world-space volume in question).

Each node of the tree may have any desired and suitable number of child nodes. In an embodiment, the tree structure is balanced and/or symmetrical. In an embodiment, the tree structure has power of two number of leaf nodes.

In an embodiment, the tree structure is configured to be wide and shallow, i.e. such that each parent node has a large number of child nodes (the tree has a relatively high branching factor). In an embodiment each parent node has at least 64 child nodes, most in an embodiment 128 child nodes.

Correspondingly, in an embodiment, the tree structure only has a relatively small number of levels of hierarchy between the leaf nodes and the root node, such as 0, 1, 2, 3 or 4 levels between the leaf nodes and the root node.

Other arrangements for the tree structure would be possible, if desired.

Where there are more sub-volumes than a single such tree structure (e.g. having 128 leaf nodes) can support, then in an embodiment plural tree structures (representations) are generated, each representing a respective group of the sub-volumes that the world-space volume has been divided into.

Where more than one tree structure is required for a world-space volume, then in an embodiment the sub-volumes are allocated to respective tree structures based on the "size" that the overall sub-volumes that each tree structure represents will occupy. Most in an embodiment the arrangement is such that the volume of the combined sub-volumes for each tree structure is as small as possible.

For each leaf node of the tree representation, data indicative of the volume of space that that sub-volume occupies, together (potentially) with data representative of the structural elements that the leaf node represents is stored.

For each higher (i.e. non-leaf) node, data indicative of the volume of space that the sub-volumes of each of its child nodes collectively falls within (occupies) is in an embodiment stored. In an embodiment this is all that is stored for each higher node, but other data could be stored for the higher nodes as well, if desired. For example, where a more "general" tree representation, e.g. with a non-constant branching factor, is used, then it may be desirable to store the number of child nodes, and a reference to the first child node, for each higher level node in the tree.

Other data could also be stored for a node and/or for each node, if desired.

The tree representation for the data representative of the sub-volumes that the world space volume for the scene has been divided into can be built (the data for it generated) in any desired and suitable manner. In an embodiment, the leaf nodes are built first, using the data for the respective sub-volume for the leaf node in question, with the (and each) higher level node (in an embodiment including the root node) then being built from its respective child nodes (by "merging" its respective child nodes). Thus in an embodiment, the data for a "parent" node is determined and by combining or merging the (relevant) data from its child nodes (in an appropriate manner). "Constructing" higher level nodes (parent nodes) from their respective child nodes helps to minimise the number of passes over the "raw" data that will be required.

When merging two (or more) child nodes, then the merging can be done in any suitable and desired manner to provide a "merged" set of data for the higher level (parent) node.

So far as the data indicating the volume that the sub-volumes fall within (occupies) is concerned, the volume for a higher level node is in an embodiment determined from the respective volumes (e.g. bounding volumes) for the child nodes in question. For example, a bounding volume for the parent node that entirely encompasses all the bounding volumes of the child nodes could be determined (and in an embodiment this is done). In this case, the bounding volume for the parent node could be, and is in an embodiment, generating by taking the minimum and maximum vertex position values along each axis across all of the parent node's child nodes.

More sophisticated arrangements, such as more sophisticated forms of bounding volume could be used or desired. It would also be possible, e.g., to retain the separate volumes of the child nodes for a parent node, or to only merge some but not all of the child node volumes for a parent node, if desired. This may be appropriate where, e.g., the volumes of the child nodes do not overlap at all.

Once the world-space volume for the scene to be rendered has been partitioned into a plurality of sub-volumes, then a set of geometry to be processed for the scene that could cast a shadow from a light source to be considered for the scene is determined for at least one of the sub-volumes that the world-space volume for the scene has been divided into. Where there are plural light sources to be considered (that could cast shadows in a sub-volume), then in an embodiment each light source is considered and processed independently.

While it would be possible simply to do this for all the sub-volumes that the world-space volume has been divided into, in an embodiment this is done for selected sub-volumes only, and in an embodiment only for sub-volumes that meet certain, in an embodiment selected, in an embodiment predefined, criteria or conditions. Most in an embodiment only those sub-volumes that it is determined could be lit by a (by at least one) light source for the scene are processed in the manner of the technology described herein. Thus, a or plural (and in an embodiment each, where there is more than one) light source is in an embodiment culled against the sub-volumes to identify the sub-volumes that could be lit by the light source(s) (to identify the sub-volumes that could be affected by the light source(s)).

Thus in an embodiment, it is (first) determined which of the sub-volumes that the world-space volume for the scene has been divided into could be lit by a light source for the scene, and then some or all (and in an embodiment each) of those determined sub-volumes are processed in the manner of the technology described herein.

The sub-volumes that could be lit by a light source can be determined as desired. In an embodiment it is determined whether a (and each) sub-volume is within the light's volume of influence (with sub-volumes that are outside the volumes of influence of all the light sources to be considered then not being processed in the manner of the technology described herein).

In an embodiment, it is determined for each sub-volume, which light sources for the scene could affect that sub-volume. Most in an embodiment a list of the light sources that could affect a sub-volume is generated for and stored in association with (is associated with) each sub-volume that the world-space volume for the scene has been divided into.

For a sub-volume that falls to be processed in the manner of the technology described herein (i.e. that is "lit" by at least one light source for the scene), the set of geometry for the sub-volume that could cast a shadow from the light source(s) can be determined in any suitable manner.

The geometry that is considered is in an embodiment in the form of graphics primitives, and in an embodiment triangles, but this is not essential, and other forms of geometry could be used and considered, if desired.

In an embodiment a set of geometry for a sub-volume that could cast a shadow from the light source(s) is determined by determining whether a "splitting" plane for which the geometry that is being considered (e.g. a bounding volume for the geometry) lies on one side of the plane, and the light source being considered and the sub-volume being considered lie on the other side of the plane, exists or not. If such a splitting plane exists, then it is determined that the geometry in question should not cast a shadow for the sub-volume being considered, but if such a splitting plane does not exist then the geometry is considered as (potentially) being able to cast a shadow for the sub-volume being considered, and so is, in an embodiment, included in the set of geometry that could cast a shadow from the light source for the sub-volume in question. This process is in an embodiment repeated for each light source that falls to be considered for a sub-volume (and for each geometry element (e.g. graphics primitive that falls to be considered for the sub-volume).

In an embodiment, the set of geometry for a sub-volume that could cast a shadow from the light source(s) is determined by determining a bounding frustum or frustums that (together) contain the light source being considered and the sub-volume. Such a frustum can be constructed as desired (e.g. using any suitable known technique for determining such frustums), for example, and in an embodiment, by using the volume of the sub-volume and the area of the light source in question, to construct a bounding frustum (or frustums) for the light source in question.

In an embodiment, a single bounding frustum that contains the light source being considered and the sub-volume is generated for the sub-volume.

The set of geometry that could cast a shadow from the light source is in an embodiment then determined by determining for each geometry object (e.g. primitive, e.g. triangle), whether or not it intersects the light source bounding frustum (or at least one of the bounding frustums, where plural bounding frustums are being used) for the sub-volume. Any geometry that is determined to intersect the (or any one of the) light source bounding frustum(s) is in an embodiment then included in the determined set of geometry that could cast a shadow (affect the shadow being cast) in the sub-volume, but any geometry that is determined not to intersect the (or any of the) bounding frustum(s) is in an embodiment not included in the determined set of geometry that could affect the shadow being cast. (This is on the basis that to be able to cast a shadow in the sub-volume in question, the geometry object (e.g. primitive) must intersect a bounding frustum that includes the light and the sub-volume.)

The determination of whether any geometry for a sub-volume intersects a light source bounding frustum can be performed as desired, and in any suitable manner. For example, it would be possible simply to test each object, e.g. primitive (e.g. triangle) for the scene against the bounding frustum(s) in turn, to, e.g., and in an embodiment, prepare lists of geometry that could cast a shadow for a, in an embodiment for plural, and in an embodiment for each, sub-volume being considered.

However, in an embodiment, more efficient testing mechanisms are used. For example, a hierarchical testing arrangement, in which larger size representations of geometry objects, and/or of the sub-volumes, and/or of the light source bounding frustums are first tested, and then progressively sub-divided and tested again (if required), could be used to make the testing process more efficient (and in an embodiment, this is what is done).

Thus, in an embodiment, the light source bounding frustum intersection testing process operates to iteratively test a light source bounding frustum against progressively smaller representations of the scene geometry down to a given, in an embodiment selected, in an embodiment predetermined, minimum geometry object (which is in an embodiment a primitive), discarding any geometry representations that do not intersect the light source bounding frustum (at least in part), and then including in the set of geometry for a sub-volume any geometry found to intersect at least in part the light source bounding frustum.

In such arrangements, there is in an embodiment a separate hierarchy for the sub-volume light source bounding frustums and a separate hierarchy for the geometry.

In the case of the geometry, large static meshes, for example, could be pre-processed to determine bounding volumes for sub-sets of their primitives, which could then be intersection tested (with the bounding volumes being progressively sub-divided as required).

For the sub-volumes, light source bounding frustums for larger groupings of sub-volumes could first be tested and then the individual sub-volumes light source bounding frustums tested (if required). For example, the light source bounding frustums for individual sub-volumes could be used to construct bigger light source bounding frustums for sets of plural sub-volumes, e.g., for 2×2×2, 4×4×4 and/or 8×8×8 neighbouring sub-volumes.

In such an arrangement, higher-level (larger size) geometry representations (e.g. bounding volumes) in an embodiment are first intersection tested against higher-level (larger size) sub-volume light source bounding frustums, then any higher level geometry representations (e.g. bounding volumes) that are not culled by the first stage are intersection tested against the appropriate smaller, e.g. individual, sub-volume light source bounding frustums, and, so on, until finally, the individual geometry objects (e.g. primitives) for the higher level geometry representations that have not yet been culled are intersection tested against the individual sub-volume light source bounding frustums.

Correspondingly, where the determination of whether geometry that could cast a shadow in a sub-volume exists comprises determining whether a splitting plane that lies between the sub-volume and the potentially occluding geometry exists, then in an embodiment, a hierarchical testing arrangement, in which a larger size representations of the geometry objects, and of the sub-volumes are first tested, then progressively subdivided and tested again (if required), is used to make the testing process more efficient. In this case, the testing process in an embodiment operates to iteratively test progressively smaller representations of the geometry objects down to single objects (e.g. primitives), discarding the geometry objects for which a "splitting plane" exists, and then including in the set of geometry that could cast a shadow any geometry for which a "splitting plane" is not found to exist.

Again, there is in an embodiment a separate hierarchy for the sub-volumes and a separate hierarchy for the geometry objects. For the sub-volumes, in an embodiment respective sets of plural sub-volumes (e.g. 2×2×2, 4×4×4, and/or 8×8×8, neighbouring sub-volumes) are considered and are progressively subdivided.

Other arrangements would, of course, be possible.

In an embodiment, rather than simply considering each primitive that is defined for the scene in question in turn to determine the set of geometry that could cast a shadow for a sub-volume, the set of primitives to be processed for the scene for output are sorted into plural subsets of primitives, and then each such subset of primitives is used when determining the sets of geometry that could cast a shadow for the sub-volumes. This may allow these processes to be performed in a more efficient manner.

Thus, in an embodiment, a set of (plural) primitives to be processed for the scene for output is divided into plural subsets of primitives, such that each primitive is allocated into one subset of primitives only, and each subset of primitives contains only contiguous primitives. Most in an embodiment, data representative of the primitives of the subset of primitives, and data indicating the volume of space that the subset of primitives falls within, is generated and stored for each subset of primitives that the set of primitives has been divided into.

As will be discussed further below, subdividing a set of primitives to be processed into subsets in this manner, and then storing such data for each subset of primitives facilitates, inter alia, more effectively identifying primitives (i.e. geometry) that could cast a shadow in a sub-volume for a scene being rendered, e.g., and in an embodiment, for use in the techniques of the Applicant's earlier patent application GB-A-2525636 for taking account of the effect of shadows when rendering images for display.

The set of primitives may be any suitable set of primitives that is to be processed for rendering the scene for output. It may comprise any desired and suitable number of primitives.

The set of primitives may comprise all of the primitives that are to be processed for the scene, but in an embodiment comprises some but not all of the primitives to be processed for the scene. In this latter case, the set of primitives in an embodiment comprises a particular, identifiable set of primitives for the scene. In an embodiment, the set of primitives comprises a set of primitives that share a common transformation (e.g. translation and rotation—i.e. they are to be transformed by the same world matrix). In an embodiment, the set of primitives comprises all the static geometry for a scene. Such sets of primitives may comprise a single draw call, but this isn't necessary and they could comprise plural draw calls (e.g. with the same world matrix and/or that all contain static geometry) if desired.

Where the set of primitives does not comprise all the primitives for the scene (i.e. there are plural sets of primitives (e.g. draw calls) to be processed for the scene), then the process is in an embodiment performed for plural of (and in an embodiment for each of) the sets of primitives (e.g. draw calls) for the scene (and in an embodiment repeated for each set of primitives (e.g. draw call) for the scene).

The set of primitives is divided into subsets of contiguous primitives. In an embodiment, a primitive is considered to be contiguous with another primitive, if the primitives share an edge (if it shares an edge with that other primitive).

Thus, in an embodiment, the set of primitives is divided into plural subsets of primitives, such that each primitive is allocated into one subset of primitives only, and each subset of primitives contains only primitives that share a common edge with at least one other primitive in the subset of primitives. (It should be noted in this regard that all the primitives in a subset of primitives do not have to share the same common edge, rather the requirement is that each primitive in the subsets of primitives shares a common edge with another primitive in the subset of primitives (i.e. that there is no primitive in the subset of primitives that does not share a common edge with another primitive in the subset of primitives).)

The primitives can be grouped into subsets each containing only contiguous primitives in any suitable and desired manner.

In an embodiment, a subset of primitives is created by taking a primitive of the set of primitives that has not yet been allocated to a subset of primitives, determining if that primitive has any adjacent primitives that it is contiguous with that have not yet been allocated to a subset of primitives, and, if so, adding that contiguous primitive (or one of the contiguous primitives) to the subset of primitives that the current primitive is part of. It is in an embodiment then determined if there is an unallocated primitive that is contiguous with a primitive of the subset of primitives, and if so, that contiguous primitive is added to the subset of primitives, and so on, until the subset in question is to be considered to be complete or finished (until a condition for finishing the current subset of primitives and starting a new subset of primitives is reached), or the set of primitives is exhausted (finished).

The process of creating subsets of primitives is in an embodiment continued until all the primitives in the set of primitives being processed have been allocated to a subset of primitives.

If (when) no adjacent, contiguous unallocated primitive in the set of primitives is found, then the current subset of primitives that is being formed should be, and is in an embodiment, considered to be "complete", i.e. is finished, and a new subset of primitives is in an embodiment then started by selecting a new unallocated primitive to start a new subset of primitives with.

In the case where there is more than one unallocated primitive that is contiguous with the (primitive(s) of) current subset of primitives that is being considered (e.g., and in an embodiment, that shares an edge with a primitive of the subset), then in an embodiment one of the contiguous primitives is selected to add to the subset of primitives. Which of the adjacent contiguous primitives to add to the subset can be selected in any desired and suitable manner. In an embodiment, this is done based on one or more selection criteria.

In an embodiment, a selection criteria for selecting an adjacent primitive to add to a subset of primitives comprises the facing directions of the candidate adjacent primitives that could be added to the subset and the facing direction of an existing primitive or primitives of the subset. In an embodiment the arrangement is to preferentially add primitives having similar facing directions, and in an embodiment coplanar primitives, to a subset of primitives.

In an embodiment, a selection criteria for selecting an adjacent primitive to add to a subset of primitives also or instead (and in an embodiment also) comprises the effect that the new primitive will have on the size of the subset of primitives, and in particular on the increase that there would be in the size of the subset of primitives if the adjacent primitive is added to the subset. In this case, the candidate adjacent primitive that would increase the size of the subset of primitives by the least amount is in an embodiment selected as the primitive to add to the subset of primitives. Thus, in an embodiment the set of primitives are divided into subsets that are smaller in size, and in an embodiment that are as small in size as possible.

The "size" of a subset of primitives in this regard is in an embodiment considered in terms of the size of the bounding volume (box) for the subset of primitives (as discussed above in relation to the size of the sub-volumes).

In an embodiment, as well as a subset of primitives containing only contiguous primitives (such that a new subset is created whenever there are no remaining unallocated contiguous primitives for a given subset of primitives), the primitive subset creation process is also subject to one or more or other conditions or criteria for a "terminating" a subset of primitives (for starting a new subset of primitives).

In an embodiment, each subset of primitives is allowed to contain no more than a particular, in an embodiment selected, and in an embodiment predefined, number of vertices.

Capping the number of vertices that a subset of primitives can have correspondingly constrains each subset to contain no more than a particular maximum number of primitives (depending upon how many vertices there are in each primitive).

The (maximum) number of vertices (and correspondingly primitives) that each subset can have can be selected as desired. In an embodiment, each subset can contain up to a maximum of six vertices (such that correspondingly, where the primitives are triangles, each subset will contain up to four triangles). Other arrangements would, of course, be possible.

The data that is stored for each subset of primitives comprises data representative of the primitives of the subset of primitives and data indicating the volume of space that the subset of primitives falls within.

The data representative of the primitives of a subset of primitives can be any suitable and desired data that can represent the primitives of the subset of primitives. In an embodiment, this data at least allows the outer edges of the subset of (contiguous) primitives to be determined.

In an embodiment, the data representative of the primitives of the subset of primitives comprises data indicating a set of vertices for the subset of primitives. In this case, this data could simply indicate the vertices that are used by the primitives of the subset of primitives (and in an embodiment this is the case). However, as will be discussed further below in embodiments a reduced set of vertices can be, and is in an embodiment, stored for a subset of primitives, e.g., and in an embodiment, for particular, selected subsets of primitives, e.g., and in an embodiment, that meet a particular, in an embodiment selected, in an embodiment predetermined, condition or conditions.

In an embodiment the data indicating a set of vertices for a subset of primitives in an embodiment indicates a set of vertex positions for the subset of primitives (i.e. indicates (allows to be determined) the positions of the vertices in question). It could also indicate (allow to be determined) other data for the vertices, but that is not necessary.

The data indicating vertices for the primitives of a subset of primitives in an embodiment comprises a vertex index for each vertex to be indicated, that references a set of vertices to be used for the scene in question.

In an embodiment, the data that is stored for each subset of primitives comprises a set of vertex positions (in an embodiment in the form of a set of vertex indices) for the subset of primitives and additional topology data that, together with the vertex positions, can be used to determine the topology of the primitives in the subset of primitives in question.

Thus, in an embodiment, the data representative of the primitives that is stored for a (and for each) subset of primitives comprises a set of position indices indicating vertex positions for the subset of primitives, together with additional data indicative of the topology of the subset of primitives, which, together, can be used to determine the topology of the subset of primitives, and in particular, and in an embodiment, at least the positions of the outer edges of the subset of primitives.

Other arrangements would, of course, be possible.

The data that is stored for a subset of primitives that represents the volume of space that the subset of primitives falls within (occupies) can take any suitable and desired form. In an embodiment, this data indicates a bounding volume for the subset of primitives, and most in an embodiment an axis aligned bounding volume for the subset of primitives.

Other arrangements, such as more sophisticated forms of bounding volume, would, of course, be possible.

In an embodiment, the primitive subset data is stored in a fixed sized data structure. This then facilitates addressing, etc., of the data for a given subset of primitives.

Other arrangements would, of course, be possible.

While it would be possible simply to store an index or other indication for each vertex of each primitive of a subset of primitives for a subset of primitives (and in an embodiment this is done), in an embodiment, it is determined whether any adjacent, contiguous primitives to be included in a subset of primitives can be combined (merged) to form a single larger primitive corresponding to the pair of adjacent, contiguous primitives (and if they can, the primitives are in an embodiment merged (combined)). This will then have the effect of, e.g., reducing the number of edges that may need to be tested for a subset of primitives, when performing, e.g., visibility tests for the subset of primitives (as will be discussed further below).

In an embodiment, primitives in a subset of primitives are merged into a single primitive if the primitives meet one or more particular, and in an embodiment selected, in an embodiment predetermined, criteria or conditions.

In an embodiment, a condition for (potentially) merging primitives in a subset of primitives is that the primitives share an edge (have (a pair of) co-linear vertices).

In an embodiment, the facing direction of the primitives is also or instead (and in an embodiment also) used as a criteria when deciding whether to merge primitives or not. In an embodiment contiguous primitives, e.g., and in an embodiment, that share an edge, are merged if their facing directions are sufficiently similar, but are not merged if their facing directions are not sufficiently similar.

In an embodiment, a or the light direction is used as a criteria when considering whether or not to merge two primitives in a subset of primitives to form a single larger primitive. This would then allow non-coplanar primitives to (potentially) be merged as well.

In an embodiment, the primitives also have to be convex for them to be able to be merged.

Other arrangements would, of course, be possible.

Where primitives in a subset of primitives are merged, then the data that is stored that is representative of the primitives of the subset of primitives in an embodiment represents (is representative of) the primitives of the subset of primitives in their "merged" form.

The data for the set of primitives that is being processed can be stored in any suitable and desired manner, e.g. in any suitable and desired (overall) data structure.

In an embodiment, the data for the subsets of primitives is stored as a tree representation for representing the set of primitives, with each leaf node of the tree representing one of the subsets that the set of primitives has been divided into, and there being stored for each leaf node of the tree, data for the corresponding subset of primitives as discussed above.

Correspondingly, each parent node of the tree should and in an embodiment does represent a sub-set of primitives corresponding to the combination of the sub-sets of primitives of all of its child nodes.

The subsets of primitives can be arranged as respective leaf nodes in any desired and suitable manner. In an embodiment the primitive subsets are arranged as (assigned to) the leaf nodes based on their spatial location(s) (and in an embodiment so as to minimise the "size" of the nodes of the tree representation(s) (as discussed above in relation to selecting primitives to add to a subset of primitives)).

Each node of the tree may have any desired and suitable number of child nodes. In an embodiment, the tree structure is balanced and/or symmetrical. In an embodiment, the tree structure has power of two number of leaf nodes.

In an embodiment, the tree structure is configured to be wide and shallow, i.e. such that each parent node has a large number of child nodes (the tree has a relatively high branching factor). In an embodiment each parent node has at least 64 child nodes, most in an embodiment 128 child nodes.

Correspondingly, in an embodiment, the tree structure only has a relatively small number of levels of hierarchy between the leaf nodes and the root node, such as 0, 1, 2, 3 or 4 levels between the leaf nodes and the root node.

Other arrangements for the tree structure would be possible, if desired.

Where there are more subsets of primitives than a single such tree structure (e.g. having 128 leaf nodes) can support, then in an embodiment plural tree structures (representations) are generated, each representing a respective group of the subsets of primitives that the set of primitives has been divided into.

For each leaf node of the tree representation, data representative of the primitives of the sub-set of primitives that the leaf node represents and data indicative of the volume of space that that sub-set of primitives falls within, is stored.

For each higher (i.e. non-leaf) node, data indicative of the volume of space that the subsets of primitives that each of its child nodes collectively falls within (occupies) is in an embodiment stored. In an embodiment this is all that is stored for each higher node, but other data could be stored for the higher nodes as well, if desired. For example, where a more "general" tree representation, e.g. with a non-constant branching factor, is used, then it may be desirable to store the number of child nodes, and a reference to the first child node, for each higher level node in the tree.

Other data could also be stored for a node and/or for each node, if desired.

The tree representation for the set of primitives can be built (the data for it generated) in any desired and suitable manner. In an embodiment, the leaf nodes are built first, using the data for the respective sub-set of primitives for the leaf node in question, with the (and each) higher level node (in an embodiment including the root node) then being built from its respective child nodes (by "merging" its respective child nodes).

Once the set of primitives to be considered has been divided into subsets of primitives in the above manner, then the set of geometry to be processed for the scene that could cast a shadow from a light source to be considered for the scene in a, and in an embodiment each, sub-volume that is to be considered, is in an embodiment determined by determining which subsets of primitives that the set of primitives have been divided into could cast a shadow from a light source in the sub-volume(s) to be considered. Thus, in an embodiment, a set of subsets of primitives for the scene that could cast a shadow from a light source is determined for a, and in an embodiment for plural, and in an embodiment for each, sub-volume that is being considered. In an embodiment a set of subsets of primitives that could cast a shadow is determined for each respective light source for each respective sub-volume to be considered.

The set of subsets of primitives for a sub-volume that could cast a shadow from a light source can be determined in any suitable manner.

In an embodiment, this is done by determining whether a splitting plane for which the light source and the sub-volume are on one side of the plane, and the subset of primitives (i.e. the potentially occluding geometry) is on the other side of the plane, exists or not. If such a splitting plane exists, then it is determined that the subset of primitives in question should not cast a shadow for the sub-volume being considered, but if such a splitting plane does not exist, then the subset of primitives is considered as (potentially) being able to cast a shadow for the sub-volume being considered, and so is, in an embodiment, added to the set of subsets of primitives that could cast a shadow from the light source for the sub-volume.

In an embodiment, the set of subsets of primitives that could cast a shadow from a light source for a sub-volume is determined by determining for a, in an embodiment for plural, and in an embodiment for each, subset of primitives, whether or not it intersects a sub-volume light source bounding frustum (or at least one of the bounding frustums, where plural bounding frustums are being used) for the sub-volume. This is in an embodiment done using the data representing the volume of space that the subset of primitives falls within (e.g., and in an embodiment, by comparing that volume to the bounding frustum(s) in question).

Any subset of primitives that is determined to intersect the (or any one of the) sub-volume light source bounding frustum(s) is in an embodiment then included in the determined set of subsets of primitives that could cast a shadow (affect the shadow being cast) in the sub-volume, but any subset of primitives that is determined not to intersect the (or any of the) bounding frustum(s) is in an embodiment not included in the determined set of subset of primitives that could affect the shadow being cast.

The determination of whether any subsets of primitives could cast a shadow in a sub-volume, e.g. intersects a light source bounding frustum for a sub-volume, can be performed as desired, and in any suitable manner. For example, it would be possible simply to test each subset of primitives, e.g. against the bounding frustum(s), in turn.

However, in an embodiment, more efficient testing mechanisms are used. Thus, in an embodiment, a hierarchical testing arrangement, in which larger size representations of subsets of primitives, and/or of the sub-volumes, and/or of sub-volume light source bounding frustums, are first tested, and then progressively sub-divided and tested again (if required), is used to make the testing process more efficient.

Thus, in an embodiment, the light source bounding frustum intersection testing process operates to iteratively test a light source bounding frustum against progressively smaller representations of the subsets of primitives down to single subsets (testing subsets individually), discarding any subset representations that do not intersect the light source bounding frustum (at least in part), and then including in the set of subsets any subsets found to intersect at least in part the light source bounding frustum.

In such arrangements, there is in an embodiment a separate hierarchy for the sub-volume light source bounding frustums and a separate hierarchy for the subsets of primitives.

In the case of the subsets of primitives, groups of plural (e.g. and in an embodiment adjacent) subsets of primitives could, e.g., be combined to form a "larger" subsets of primitives and then the volume of space (a bounding volume) that a (and each) group of subsets of primitives falls within be determined and used as a bounding volume to test, with the bounding volumes of the individual subsets of primitives within a given group then subsequently being tested, if required. There could be multiple levels of groups of subsets of primitives, with each level being progressively bigger groupings to provide multiple levels of subset bounding volume representations to test against, if desired (and then being progressively sub-divided, as required).

For the sub-volumes, light source bounding frustums for larger groupings of sub-volumes could first be tested and then the individual sub-volume's light source bounding frustums tested (if required). For example, the light source bounding frustums for individual sub-volumes could be used to construct bigger light source bounding frustums for sets of plural sub-volumes, e.g., for 2×2×2, 4×4×4 and/or 8×8×8 neighbouring sub-volumes.

In an embodiment of such an arrangement, higher-level (larger size) primitive subset representations (e.g. bounding volumes) are first intersection tested against higher-level (larger size) sub-volume light source bounding frustums, then any higher level primitive subset representations (e.g. bounding volumes) that are not culled by the first stage are intersection tested against the appropriate smaller, e.g. individual, sub-volume light source bounding frustums, and so on, until finally, the individual primitive subsets of the higher level primitive subset representations that have not yet been culled are intersection tested against the individual sub-volume light source bounding frustums.

Correspondingly, where the determination of whether a subset of primitives could cast a shadow in a sub-volume region comprises determining whether a splitting plane that lies between the sub-volume and a potentially occluding subset of primitives exists, then in an embodiment, a hierarchical testing arrangement, in which larger size representations of subsets of primitives, and of the sub-volumes are first tested, and then progressively subdivided and tested again (if required), is used to make the testing process more efficient. In this case, the testing process in an embodiment operates to iteratively test progressively smaller representations of the subsets of primitives down to single subsets (testing subsets individually), discarding the subset representations for which a "splitting plane" exists, and then including in the set of subsets any subsets for which a "splitting plane" is not found to exist.

Again, there is in an embodiment a separate hierarchy for the sub-volumes and a separate hierarchy for the subsets of primitives. In the case of the subsets of primitives, in an embodiment groups of plural subsets of primitives are combined, in the same manner as that discussed above. For the sub-volumes, in an embodiment respective sets of plural sub-volumes, e.g. 2×2×2, 4×4×4 and/or 8×8×8, neighbouring sub-volumes, are considered and then progressively subdivided.

In an embodiment of such an arrangement, higher-level (larger size) primitive subset representations (e.g. bounding volumes) are first "splitting plane" tested against higher level (larger size) "sub-volumes" (such as, and in an embodiment, sets of 2×2×2 and/or 4×4×4, 8×8×8, etc. neighbouring sub-volumes, and then any higher level primitive subset representations that are not culled by the first stage are tested against appropriate smaller, e.g. individual, sub-volumes, and finally the individual primitive subsets of the higher level primitive subset representations that have not yet been culled are tested against the individual sub-volumes.

Other arrangements would, of course, be possible.

Other culling operations could also or instead (and in an embodiment also) be used to identify subsets of primitives that do not need to be included in a set of subsets of primitives that could cast a shadow in a sub-volume, if desired. For example, and in an embodiment, the bounding volumes of the subsets of primitives could be tested against the volume of influence of the light source(s) in question, with any subsets of primitives that fall outside the light volume(s) of influence then being culled (not considered further and not included in a set of subsets of primitives to be processed). This test is in an embodiment performed before testing the subsets of primitives against the light source bounding frustums for the sub-volumes, such that it can be used to cull subsets of primitives from having to undergo that testing.

In an embodiment, it is also determined whether a subset of primitives can be guaranteed to only contain primitives that are all facing in the same, particular, in an embodiment selected, direction (e.g. contains primitives that are all guaranteed to be front-facing, or contains primitives that are all guaranteed to be back-facing), with such subsets of primitives then, e.g. either being included or discarded from the subsets of primitives to be processed further. The facing directions of the primitives may be determined from their normals, for example. This would then allow, e.g., subsets of primitives that contain only front-facing (or only back-facing) primitives to be discarded from further processing.

In arrangements where the subsets of primitives (occluding geometry) are (potentially) culled before the subsets of primitives (occluding geometry) are then tested against the sub-volumes, then it would be possible to re-build the bounding boxes (sub-volumes) for the scene being rendered after that culling (e.g. in the case where once the subsets of primitives (geometry) have been culled it is then possible to re-group the primitives (structural elements) (to provide new sub-volumes to be tested) (and in an embodiment, this is done). This could also correspondingly be done in respect of the sub-sets of primitives (geometry). This may then provide "tighter" bounding boxes and more efficient culling and thus performance for the subsequent processing (notwithstanding that some regeneration of the bounding boxes may be required). Such a process could equally apply and be used when using other representations of the geometry as well as when using subsets of primitives to represent the geometry for the scene.

The data representing the subsets of primitives can be considered and processed to determine a set or sets of subsets of primitives to be processed in any suitable and desired manner.

Where that data is in the form of a tree representation then the tree representation is in an embodiment used to determine the set or sets of subsets of primitives to be processed by considering nodes of the tree in turn, in an embodiment starting with the root node and working down the tree towards the leaf nodes (if required).

When a node of the tree is to be considered, it is in an embodiment tested, e.g. against the sub-volume light source bounding frustum in question. Most in an embodiment the volume (region) of space that the sub-set(s) of primitives for a node is indicated to fall within is tested, e.g. against the volume (frustum) in question to determine if any of that volume (region) falls within the test volume (frustum) or not. Thus, in an embodiment, the bounding volume for a node is tested to determine if any part of the bounding volume falls within a given sub-volume light source bounding frustum.

The result of the test is in an embodiment used to determine whether to include the sub-set(s) of primitives for the node in the set of subsets of primitives that could cast a shadow for the sub-volume(s) in question. It is in an embodiment also or instead used to determine whether and how to continue the traversal of the tree.

Where the data representing the sub-volumes that the world-space volume for the scene has been divided into is also in the form of a tree representation, then in an embodiment the process operates to progressively consider the nodes of each tree representation in turn, starting with the root node and working down the trees towards their leaf nodes (if required). In an embodiment a node of one tree is tested against the current node of the other tree to determine whether the subset(s) of primitives for the "primitive subset" tree node in question should be included in the set(s) of subsets of primitives that could cast a shadow for the "sub-volume" tree node in question.

The testing is in an embodiment also or instead used to determine whether and how to continue the traversal of the trees (such that, e.g., and in an embodiment, the traversal may continue in one tree or the other tree, depending upon the results of the test for the current tree nodes).

This process is in an embodiment repeated until the trees have been completely traversed (until all the nodes in the trees that need to be tested, have been tested).

Where both the sub-volumes that the world-space volume for the scene has been divided into and the subsets that the set of primitives to be considered has been divided into are represented by appropriate (hierarchical) tree representations, then, where appropriate, both sub-divisions and tree representations could be the same (e.g. where the world-space volume for the scene has been divided into sub-volumes based on grouping primitives for the scene into respective groups (i.e. subsets) of primitives that then also correspond to the subsets of primitives that the set of primitives for the scene has been divided into for the purpose of testing the geometry for the scene). In this case, a single tree representation (bounding volume hierarchy) could be generated, and then two copies of that representation traversed in parallel when determining the set of geometry that could cast a shadow in each sub-volume.

The output of the processing (testing) of the subsets of primitives, e.g. the tree traversal, should be, and is in an embodiment, a set or sets of subsets of primitives that could cast a shadow for the (and for each) sub-volume that was considered (tested). This output can take any desired and suitable form, but in an embodiment comprises a list or lists of subsets of primitives indicating the subsets of primitives of the set of primitives that could cast a shadow for the (and for each) sub-volume that was considered (tested).

Once the set of geometry that could cast a shadow from a light source (whether in the form of a set of subsets of primitives, a set of primitives, or otherwise), has been determined for each sub-volume being considered, then these sets of geometry are used to determine light source visibility parameters for one or more output samples for the scene.

This may, and in an embodiment does, use any information representative of the geometry in an appropriate manner to allow the geometry to be used to determine a light source visibility parameter for the output samples.

Thus, for example, where subsets of primitives are represented in the manner discussed above, then in an embodiment, the information representative of the primitives in a (and in each) subset of primitives (such as the vertex indices and any topology information) is used to, in effect, (re-)construct the primitives of the subset of primitives in question such that those primitives can then be processed in the desired manner.

The output sample or samples for the scene for which a light source visibility parameter is determined for using the determined set(s) of (potentially) "shadow-casting" geometry can be any suitable and desired output sample or samples for the scene.

The output sample(s) should be, and are in an embodiment, samples for which an output value is to be rendered, e.g., and in an embodiment, when rendering an output frame representing the scene. Thus, they in an embodiment correspond to points in either the 3D world-space, or in the 2D screen space for which an output is to be generated (that need to be shaded).

In an embodiment the output samples are (sampling) positions for which an output value is to be rendered, e.g., and in an embodiment, when rendering an output frame representing the scene. Thus, they in an embodiment correspond to positions in either the 3D world-space or the 2D screen-space for which an output is to be generated (rendered).

In an embodiment, the output samples are positions that are defined in the world-space, such as a defined vertex position or positions, a defined output position or positions, and/or a defined position or positions on a surface, in the world-space. Thus, for example, and in an embodiment, a light source visibility parameter is determined for one or more vertex positions and/or one or more sampling positions defined in the world-space.

In such an embodiment, the output samples in a further embodiment correspond to a set of points (positions) that is defined in the world-space. This may correspond, for example, to a cloud of particles, such as smoke, that is defined in the world-space for the scene.

In an embodiment the output sample or samples for which a light source visibility parameter is determined comprise sampling positions of a frame being rendered to display the scene (i.e. a set of screen space sampling positions for a frame that it is being rendered to output, e.g., and in an embodiment, display, the scene).

Thus, in an embodiment, the output samples for the frame being rendered that a light source visibility parameter is determined for comprises sampling positions (and in an embodiment the set of sampling positions) that will be processed when rendering a frame representing the scene, e.g., and in an embodiment, when producing (rendering) the (e.g., and in an embodiment, final) output for the frame. (Thus, a light source visibility parameter value is in an embodiment determined for plural, e.g. each, (screen space) sampling positions of a frame being rendered.)

In an embodiment of such an arrangement, the light source visibility parameter values for the (screen-space) sampling positions for the frame being rendered are determined on a frame region-by-frame region basis.

In this case, the regions of the frames that are considered can be any suitable and desired regions of the frames. In an embodiment, each frame region represents a different part (region) of the frame in question. Each region should ideally represent an appropriate portion (area) of the frame, such as a plurality of sampling positions within the frame. Suitable region sizes could be, e.g., 8×8, 16×16, 32×32 sampling positions in the frame. The frame regions are in an embodiment regularly sized and shaped, in an embodiment in the form of rectangles (including squares).

Where a frame is already sub-divided into regions for the purpose of its processing, then in an embodiment, each region of the frame that is considered corresponds to a region that the frame is otherwise divided into for processing purposes. This could be the case where, for example, the graphics processing system is a tile-based system and the graphics processing, etc., is to be carried out in a tile-based fashion, for example using a tile-based graphics processing unit.

Thus, in an embodiment, each region of the frame that is considered in these embodiments corresponds to one or more tiles of the frame. In an embodiment, each region that is considered corresponds to a (single) tile that a graphics processor or system that is generating the frame in question operates on and produces as its output (i.e. the regions are the tiles that the frames are divided into for processing (rendering) purposes), although other arrangements, such as each region comprising a plurality of tiles or a part of a tile, would be possible if desired.

In these arrangements, the processing to determine light source visibility parameters may be performed for each region that the frame is divided into, or it may be performed for some but not all of the regions that the frame is divided into.

While it would be possible to determine light source visibility parameters simply for individual or only a few output samples for the scene being rendered, in an embodiment, light source visibility parameters are determined for a plurality of output samples, and, in an embodiment, for a set of plural output samples. The set of output samples for which light source visibility parameters are determined can comprise any suitable and desired set of output samples for the scene. Thus it may comprise a set of vertices that are defined for the scene, or an arbitrary set of points (positions) that are defined for the scene, e.g., and in an embodiment, representing a distribution of particles within the scene, or the set of screen space sampling positions to be rendered when rendering a frame representing the scene (either for the whole frame, or for a region or regions, such as a processing tile or tiles, of the frame).

For any given out sample (e.g. sampling position) for which a light source visibility parameter is required, the light source visibility parameter should be, and is in an embodiment, determined using the determined set of geometry that could cast a shadow from a light source to be considered for the scene for the sub-volume that the output sample falls within.

The sub-volume that an output sample for which a light source visibility parameter is required falls within can be determined in any suitable and appropriate manner.

For example, where the output volumes already have the output samples (e.g. vertex positions or discrete sampling positions) that light source visibility parameters are to be generated for associated with them, then it would, e.g., be possible simply to consider all (or at least the desired) output samples associated with a sub-volume and determine the light source visibility parameter for those output samples accordingly (and in an embodiment this is what is done).

Thus, in an embodiment, where the sub-volumes have output samples, e.g. sampling positions, for which a light source visibility parameter are required already associated with them, the technology described herein comprises determining for one or more (and in an embodiment for each) of the output samples of the set of output samples (e.g. sampling positions) associated with the sub-volume of the scene being rendered, a light source visibility parameter using the determined set of geometry that could cast a shadow from a light source to be considered for the scene for the sub-volume.

However, as discussed above, it could also be the case that the sub-volumes do not have output samples (e.g. sampling positions or other graphics structural elements) associated with them, but rather are simply defined in terms of the volume of the world-space that they occupy. In this case, it will be necessary for any given output sample for which a light source visibility parameter is required, to first determine which sub-volume that output sample (e.g. sampling position) falls within (and then use the determined set of geometry for that sub-volume to determine a light source visibility parameter for the output sample).

Thus, in an embodiment, the method of the technology described herein comprises (and the processing circuitry is configured to) for an output sample for which a light source visibility parameter is to be generated for the scene (and in an embodiment for one or more, and in an embodiment plural, and in an embodiment for each output sample, e.g., and in an embodiment, of an output frame, for which rendered fragment data is to be generated for the scene), (first) determining which sub-volume of the set of sub-volumes that the world-space volume for the scene to be rendered has been partitioned into the output sample falls within, and then using the determined set of geometry that could cast a shadow from a light source to be considered for the scene for that sub-volume to determine a light source visibility parameter for the output sample.

This arrangement may be particularly applicable where, for example, it is desired to render a scene that contains a dynamic volumetric effect, such as a cloud of smoke or other particles. In this case, the smoke or other particles could be defined as a discrete set of positions within the scene for which rendered output data is required but which positions (particles) are moving (changing) within the scene over time (e.g. from frame to frame), and the world-space volume for the scene divided up into sub-volumes on a "volume" basis (i.e. rather than associating each sub-volume with a particular set of particle positions), with the sub-volumes that the particles (output samples) are within then being determined from frame-to-frame (based on the particles' current positions), so as to allow for the movement of the cloud of particles within the scene from frame-to-frame.

In these arrangements, the sub-volume that a given output sample falls within can be determined in any suitable and desired manner. This is in an embodiment done based on the position of the output sample (e.g. at the time in question) in the world-space volume of the scene (by mapping that position to the corresponding world-space sub-volume).

In some cases, it will be the case that a light source visibility parameter is determined for at least one output sample in each sub-volume that the world-space volume for the scene has been divided into (e.g. where each sub-volume contains at least one output sample to be rendered) (and in an embodiment this is the case). However, it could be the case that some sub-volumes that the world-space volume for the scene has been divided into do not in fact contain any output samples that are to be rendered (e.g. in the case where the world-space volume has been partitioned on a per-volume basis, and there are some sub-volumes that do not in fact contain output samples that fall to be rendered in the manner of the technology described herein). Thus the technology described herein also extends to arrangements in which light source visibility parameters are determined for samples in only some but not all of the plurality of sub-volumes that the world-space volume for the scene has been divided into.

The light source visibility parameter that is determined for an output sample using the determined set of geometry that could cast a shadow in a sub-volume can be any desired and suitable parameter that can be used to provide a desired shadowing effect for the rendered output sample.

In one particularly embodiment it is a value that can be (and that is to be) used to modulate the effect of the light source at the output sample in question to provide (and to represent or simulate) the shadowing effect at that output sample. In this case, the light contribution from the light source if it were completely unoccluded is in an embodiment multiplied by the light source visibility parameter to give a "net" light contribution from the light source to the output sample in question when rendering (shading) the output sample.

In an embodiment, the light source visibility parameter for a (and for each) output sample indicates directly the "net" light contribution from the light source to the output sample in question (and thus is to be used as the "net" light contribution from the light source to the output sample in question when rendering (shading) the output sample).

Other arrangements would, of course, be possible.

In an embodiment, the light source visibility parameter for an output sample is representative of (is indicative of), and dependent upon, how much light from the light source will fall upon the output sample in question. This parameter can then be used to simulate the effect of the light source at the output sample in question when the output sample is rendered.

The light source visibility parameter for an output sample can be determined as desired and in any suitable manner using the determined set of geometry that could cast a shadow for the sub-volume that the output sample falls within.

In an embodiment, it is estimated how much light from the light source will fall upon the output sample in question. This can be estimated as desired, but in an embodiment, it is in an embodiment based, at least in part, on whether and how much of the light source is visible at the output sample in question, i.e. whether any of the geometry in the determined set of geometry that could cast a shadow for the sub-volume that the output sample falls within (e.g. whether any of the subsets of primitives in the determined set of subsets of primitives that could cast a shadow in the sub-volume) will occlude the light source from the output sample.

Whether and how much of a light source is visible at an output sample can be determined in any suitable and desired manner, but in an embodiment this is done by testing whether, for each of one or more sampling positions representing the position of the light source, a ray cast between the output sample (e.g. sampling position) to be rendered and the light source sampling position would intersect any geometry in the determined set of geometry that could cast a shadow for the sub-volume that the output sample falls within (i.e. could be occluded by any geometry in the determined set of geometry that could cast a shadow for the sub-volume that the output sample falls within or not).

In this process, the light source could be represented by a single sampling position (and in an embodiment, this is the case). This may be appropriate where the light source is a point source.

In an embodiment, the light source is represented by plural sampling positions. In this case, it is in an embodiment then tested for plural of (and in an embodiment for each of) the plural sampling positions that represent the light source, whether a ray cast between the output sample being considered and the light source sampling position would intersect any geometry in the determined set of geometry that could cast a shadow for the sub-volume that the output sample falls within (e.g. would intersect any subsets of primitives in the determined set of subsets of primitives that could cast a shadow in the sub-volume).

Using a plurality of sampling points to represent the light source allows area lights (i.e. light sources that have an area) to be considered and represented in an efficient and effective manner.

Where plural sampling positions are used to represent a light source then the sampling positions can be arranged in any suitable and desired fashion. In an embodiment, the sampling positions are arranged as an array of sampling positions that represents (and corresponds to) the light source in question.

The testing of whether a light source sampling point will be visible from the output sample position being considered can be done in any desired and suitable manner. It is in an embodiment done using a rasterisation operation.

Thus, in an embodiment, testing of whether light source sampling positions will be visible from the output sample being considered is done by rasterising the geometry in the determined set of geometry that could cast a shadow for the sub-volume that the output sample falls within onto a render target that corresponds to the light source sampling positions (with the output sample being considered as the viewpoint).

The light source sampling position occlusion testing can be used to provide the light source visibility parameter to be used for an output sample in any desired and suitable manner.

In an embodiment, it is determined whether each light source sampling position is occluded or not.

The light source visibility parameter for the output sample is in an embodiment then determined, at least in part, from the number of light source sampling positions that were found to be visible (or found to be occluded) by the testing process for the output sample.

In one embodiment, the light source visibility parameter for an output sample is, or corresponds to, the ratio (the proportion) of the visible light source sampling positions at the output sample to the total number of light source sampling positions.

It would also be possible to derive more sophisticated measures of the light falling on an output sample from the light source sampling position occlusion testing, if desired.

For example, for each non-occluded light source sampling position, a measure of the amount of light that will fall on the output sample from the light source sampling position in question could be determined, e.g. based on the distance (depth) of the output sample from the light source sampling position, and/or based on the amount of light that the light source sampling position in question is producing.

The above process should be repeated for each output sample (e.g. sampling position) that a light source visibility parameter is to be determined for.

The determined light source visibility parameter(s) for the output sample(s) can in an embodiment then be, and are in an embodiment then, used to simulate the effect of shadows when rendering the output sample(s) for output.

The determined light source visibility parameter(s) for the output sample(s) can be used as desired to simulate the (determined) effect of the shadows in the rendered output sample(s). As discussed above, the determined light source visibility parameters are in an embodiment used to modulate the light source at the output samples (e.g. sampling positions) when determining the output, rendered, colour to be used for the output samples.

Thus, in an embodiment, the method of the technology described herein further comprises (and the apparatus of the technology described herein is further configured to) using the determined light source visibility parameters for the output sample(s) when rendering an output version of the output sample(s), and most in an embodiment to modulate the effect of the light source in question at each output sample (in the output (rendered) version of the output sample).

The determined light source visibility parameters for output sample(s) could be provided as desired for use when rendering the output sample(s). For example, they could be written to (stored in) an output sample (e.g. a sampling position) light source visibility buffer that is then, e.g., read (and used) in the (or a) subsequent rendering pass. In an embodiment, this is what is done. In this case, the light source visibility buffer could, e.g., be cached and retained "on-chip" for use in a subsequent rendering pass, or it could, e.g., be written out to main memory and then read back in when it is to be used.

Various alternatives and/or modifications to the operation of the technology described herein would be possible, if desired.

For example, it would be possible to determine the light source visibility parameters at a different, e.g., and in an embodiment, lower, resolution than the rendered output sampling positions needed for rendering an output frame (and in an embodiment, that is what is done). In this case, the determined light source visibility parameters are in an embodiment appropriately upscaled (e.g.) to the resolution of the rendered output for the output frame when they are used when generating the rendered output for the frame. Where this is done, the upsampling (e.g.) is in an embodiment done in a manner that will tend to preserve contrast at edges in the image (e.g. by using a bilateral filter). In this case, a light source visibility parameter could, e.g., be determined for some but not all of the sampling positions of a sub-volume.

It would also be possible to perform, for example, an initial coarser determination of the light source visibility parameters, e.g. to determine light source visibility parameters for a lower resolution set of output samples, such as per-vertex position, in the manner of the technology described herein, and to then identify therefrom regions of an output frame where the light source visibility parameters are all similar and/or constant (e.g. all the sampling positions are all occluded or all un-occluded or very slowly changing), and those regions of the output frame where the light source visibility parameters are more rapidly changing, and to then perform a second pass to determine higher resolution (e.g. per-sampling point rather than per-vertex) light source visibility parameters in those regions of the output frame where it has been identified from the first pass that the light source visibility parameters are more rapidly changing. The second pass could either re-use the determined sets of geometry and/or light source visibility parameter determinations from the first pass, or determine new sets of geometry, etc., as desired.

Thus, in an embodiment, the process of determining light source visibility parameters for output samples for the scene for an output frame being rendered comprises first performing a lower resolution, coarser light source visibility parameter determining pass that determines light source visibility parameters for output samples at a coarser resolution, using the results of the first, coarser light source visibility parameter determination operation to select regions of the output frame for which to perform a second, higher resolution light source visibility parameter determination operation; and performing a second, higher resolution light source visibility parameter determining pass that determines light source visibility parameters for output samples at a higher resolution (than the first pass), for the selected regions of the frame.

The effect of this is in an embodiment that the higher resolution light source visibility parameter determination operation will only be performed for those regions of the frame where such higher resolution information is required. Thus, in an embodiment, the higher resolution light source visibility parameter determination operation is performed for some but not all of a frame being output (but with a lower resolution light source visibility parameter determination operation in an embodiment being performed for all of the frame being output).

It would also be possible to vary the resolution at which the light source visibility parameters are determined for a given sub-volume, set of sampling positions being rendered, etc. based on other criteria. For example, the resolution of the sampling could be varied depending upon the size of the light source being considered, the distance of the output samples (sampling positions) being rendered from the camera position (viewpoint), etc. (and in an embodiment this is done). For example, it may be possible to determine the light source visibility parameters at a lower resolution for larger light sources that will accordingly cast smoother shadows.

In arrangements where, for example, the geometry for the scene being rendered is organised into subsets of primitives as discussed above, then again the resolution at which the light source visibility parameters are determined could be varied depending, e.g., upon the volume that is occupied by each subset of primitives (as different subsets of primitives may occupy different world-space volumes, and therefore it may not be appropriate to simply always determine the light source visibility parameters at the same resolution, irrespective of the sizes of the volumes occupied by the subsets of primitives that are being considered). Again, in an embodiment, this is done.

Although the operation has primarily been described above with particular reference to the processing in respect of a given light source, it will be appreciated that this operation can be extended to an arbitrary number of lights. In this case, the process to determine light source visibility parameters should be, and in an embodiment is, repeated for each light source that could cast a shadow in a sub-volume.

Similarly, although the technology described herein has been described above with particular reference to the processing of a single sub-volume, it will be appreciated that the process should be, and is in an embodiment, repeated for plural, and in an embodiment for each, sub-volume that the world-space volume for the scene has been divided into (e.g. at least where a light source could cast shadows).

Similarly, the process is in an embodiment repeated for plural frames of a sequence of frames to be generated (and in an embodiment, output) representing the scene, e.g. and in an embodiment, for each frame of a sequence of frames to be rendered.

The frame(s) for output that is to be generated in the technology described herein can be any suitable and desired output frame that is to be generated by the graphics processing system. In an embodiment, it is an output frame for display (on a screen or via a printer, for example), but it could equally be any other form of output that a graphics processing system can be used to produce, such as a texture (e.g. in a render-to-texture process), or any other form of output data array.

The technology described herein also extends to a method and system that both creates and then uses the sub-volumes and/or representations of subsets of primitives of a set of primitives to be rendered, etc., in the manners discussed above.

The methods and apparatus of the technology described herein can be implemented in any appropriate and desired manner, e.g. in hardware or software (or both), and in (and be included in) any appropriate device or component.

It will be appreciated from the above, that the embodiments of the technology described herein at least involve a number of processes that will be performed to generate the overall, final, output frame. For example, there will be a stage of building the sub-volumes (and, e.g., subsets of primitives), followed by testing of the sub-volumes (and, e.g., subsets of primitives) to determine a set of geometry that could cast a shadow, with the determined geometry (e.g. set(s) of subsets of primitives) then being processed (used) in the desired manner.

These various processes may be carried out at different points in time and in different places in the overall graphics processing system, as and if desired.

For example, the process of building the sub-volumes (and, e.g., subsets of primitives) and the corresponding data structure(s) (e.g. bounding volume hierarchy topology) can be performed offline, in advance of the generation of the output frame in question, e.g. on a CPU (e.g. of the overall graphics processing system), or it could, e.g., be performed by the driver for the graphics processor that is to perform the graphics processing.

The data representing the sub-volumes (and, e.g., subsets of primitives) may be stored in any suitable and desired memory, which memory may be configured in any suitable and desired manner. For example, it may be an on-chip buffer or it may be an external memory (and, indeed, may be more likely to be an external memory). Similarly, it may be dedicated memory for this purpose or it may be part of a memory that is used for other data as well. In an embodiment, this data is stored in main memory of the system that incorporates the graphics processor.

The process of using the information about the sub-volumes (and, e.g., subsets of primitives) to determine set(s) of geometry that could cast shadows is in an embodiment then performed at "run time", in an embodiment by the graphics processor (e.g. and in an embodiment, operating as a General Purpose GPU (GPGPU) (using GPGPU compute code on the graphics processor).

In an embodiment, this processing includes, where appropriate, determining whether any of the sub-volumes fall completely outside the light volume of influence (and culling any such sub-volumes).

The use of the determined set or sets of geometry that could cast shadows when generating an output frame is in an embodiment then carried out on the graphics processor itself.

Thus, in an embodiment, the apparatus of the technology described herein may comprise one or more or all of: a host processor, a CPU of a host processor, a driver for a graphics processor (GPU) that is to perform the graphics processing operation, and a graphics processor (GPU).

As will be appreciated from the above, the technology described herein is accordingly in an embodiment implemented and executed in a graphics processing system that includes a host processor (CPU) and a graphics processor (GPU), with the host processor executing a driver for the graphics processor, with the GPU, e.g., using the data representing the sub-volumes (and, e.g., subsets of primitives) to determine a set or sets of geometry that could cast shadows, and in an embodiment then using the so-identified set(s) of geometry in the desired manner.

The graphics processor and/or graphics processing system may also comprise, and/or be in communication with, one or more memories and/or memory devices that store the data described herein, and/or the output data generated by the graphics processing unit, and/or store software for performing the processes described herein. The graphics processing unit may also be in communication with the host microprocessor, and/or with a display for displaying images based on the data generated by the graphics processing unit.

The technology described herein can be used in any suitable and desired graphics processing system.

The technology described herein is particularly suitable for use with tiled renderers (graphics processing systems). It is particularly suitable for tiled deferred renderers, but could also be used with other tiled methods, such as "tiled forward rendering", if desired. Thus, in an embodiment, the graphics processing system is a tiled renderer, in an embodiment a tiled deferred renderer.

The graphics processing system is in an embodiment able to be operated both in a conventional graphics context, e.g. to perform conventional graphics rendering processes, and also in a compute context so as to be able to perform GPGPU processing.

The graphics processor may contain any suitable and desired processing stages (elements) that a graphics processor and processing pipeline may contain such as a rasteriser, a renderer, an early depth (or an early depth and stencil) tester, a late depth (or depth and stencil) tester, a blender, a tile buffer or buffers, a write-out unit, etc.

The graphics processing system in an embodiment includes at least local memory, such as (on-chip) buffer or buffers, and/or register(s), that can be used to store the data required, e.g. for the light source visibility parameter determination process and the determined light source visibility parameters. Where present, the tile buffers can be used for this purpose, if desired.

The technology described herein can be used for all forms of output that a graphics processing system may be used to generate, such as frames for display, render-to-texture outputs, etc.

Thus the graphics processing system should (and in an embodiment does) produce some useful output data, e.g. graphics processing output data for use in (subsequent) graphics processing operations etc. In an embodiment, the generated output data is used to provide an image for display, e.g. is provided to a display for display. In an embodiment, the various functions of the technology described herein are carried out on a single graphics processing platform that generates and outputs the rendered fragment data that is, e.g., written to the frame buffer for the display device.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Furthermore, any one or more or all of the processing stages of the technology described herein may be embodied as processing stage circuitry, e.g., in the form of one or more fixed-function units (hardware) (processing circuitry), and/or in the form of programmable processing circuitry that can be programmed to perform the desired operation. Equally, any one or more of the processing stages and processing stage circuitry of the technology described herein may be provided as a separate circuit element to any one or more of the other processing stages or processing stage circuitry, and/or any one or more or all of the processing stages and processing stage circuitry may be at least partially formed of shared processing circuitry.

Subject to any hardware necessary to carry out the specific functions discussed above, the graphics processing system and pipeline can otherwise include any one or more or all of the usual functional units, etc., that graphics processing pipelines include.

It will also be appreciated by those skilled in the art that all of the described embodiments and embodiments of the technology described herein can, and in an embodiment do, include, as appropriate, any one or more or all of the optional features described herein.

The methods in accordance with the technology described herein may be implemented at least partially using software e.g. computer programs. It will thus be seen that when viewed from further embodiments the technology described herein provides computer software specifically adapted to carry out the methods herein described when installed on data processor, a computer program element comprising computer software code portions for performing the methods herein described when the program element is run on data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

Embodiments of the technology described herein will now be described in the context of the processing of computer graphics for display.

When a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output for display.

FIG. 1 shows a typical computer graphics processing system, comprising a host processor (CPU) 1, a graphics processing unit (GPU) 3, and a memory 5 for storing data required by and/or generated by the host processor 1 and GPU 3.

When an application 2 that is executing on the host processor 1 requires graphics processing from the GPU 3, such as a frame to be displayed, the application 2 will send appropriate commands and data to a driver 4 for the GPU 3 that is running on the host processor 1.

The driver 4 will then send appropriate commands to the graphics processor 3 to cause it to generate the graphics output required by the application 2.

The commands and data provided to the driver 4 will (typically) indicate a list of primitives to be rendered for the output frame to be generated by the graphics processor 3, together with an associated vertex array that includes the vertices to be used for the primitives for the output frame.

The output frame to be generated by the graphics processor 3 may typically be a frame intended for display on a display device, such as a screen or printer, but may also, for example, comprise intermediate data intended for use in later rendering passes (also known as a "render to texture" output), etc.

The primitives to be processed for the output frame are usually listed in the order that they are to be rendered. Each primitive will have associated with it a set of vertices which are referred to by their index in the associated vertex array.

To further facilitate the rendering operation, the primitives to be processed for an output frame will usually be organised into distinct draw calls. For each draw call there will be a set of primitives to be processed, with each primitive in the set having associated with it a set of vertices which are referred to by their indices in the associated vertex array. The draw calls for an output frame are processed in turn to generate the output frame.

Figure 2:
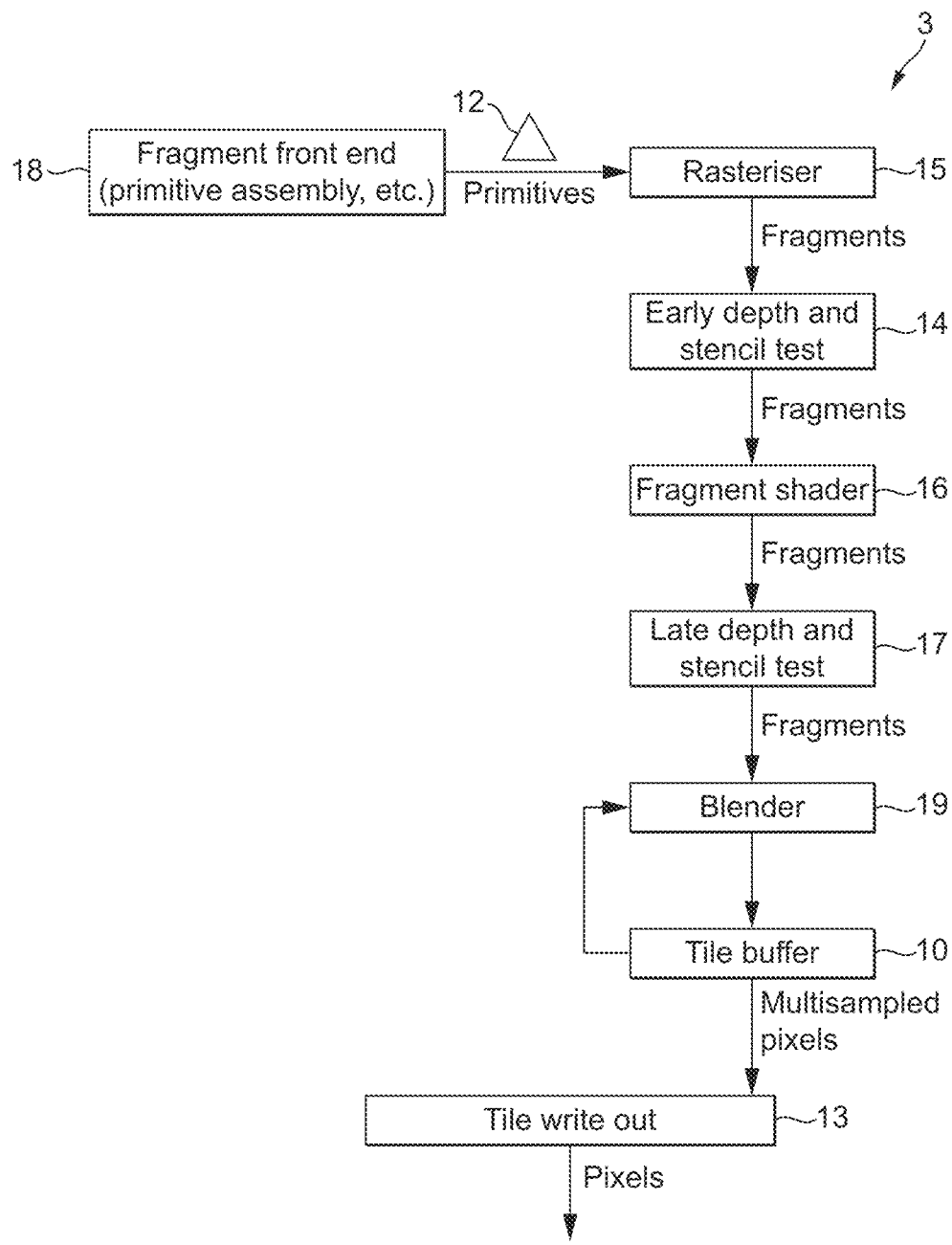
FIG. 2 shows schematically an exemplary graphics processing pipeline.

FIG. 2 shows schematically the graphics processor (graphics processing pipeline) 3 in more detail. In the present embodiment the graphics processing pipeline 3 is a tiled deferred renderer with a fully programmable GPGPU context, for example a renderer which executes partly via Direct Compute, OpenCL, CUDA, etc.

As the graphics processing pipeline 3 shown in FIG. 2 is a tile-based renderer, it will produce tiles of a render output data array, such as an output frame to be generated.

In tile-based rendering, rather than the entire render output, e.g., frame, effectively being processed in one go as in immediate mode rendering, the render output, e.g., frame to be displayed, is divided into a plurality of smaller sub-regions, usually referred to as "tiles". Each tile (sub-region) is rendered separately (typically one-after-another), and the rendered tiles (sub-regions) are then recombined to provide the complete render output, e.g., frame for display. In such arrangements, the render output is typically divided into regularly-sized and shaped sub-regions (tiles) (which are usually, e.g., squares or rectangles), but this is not essential. Each tile corresponds to a respective set of screen space sampling positions.)

Figure 3:
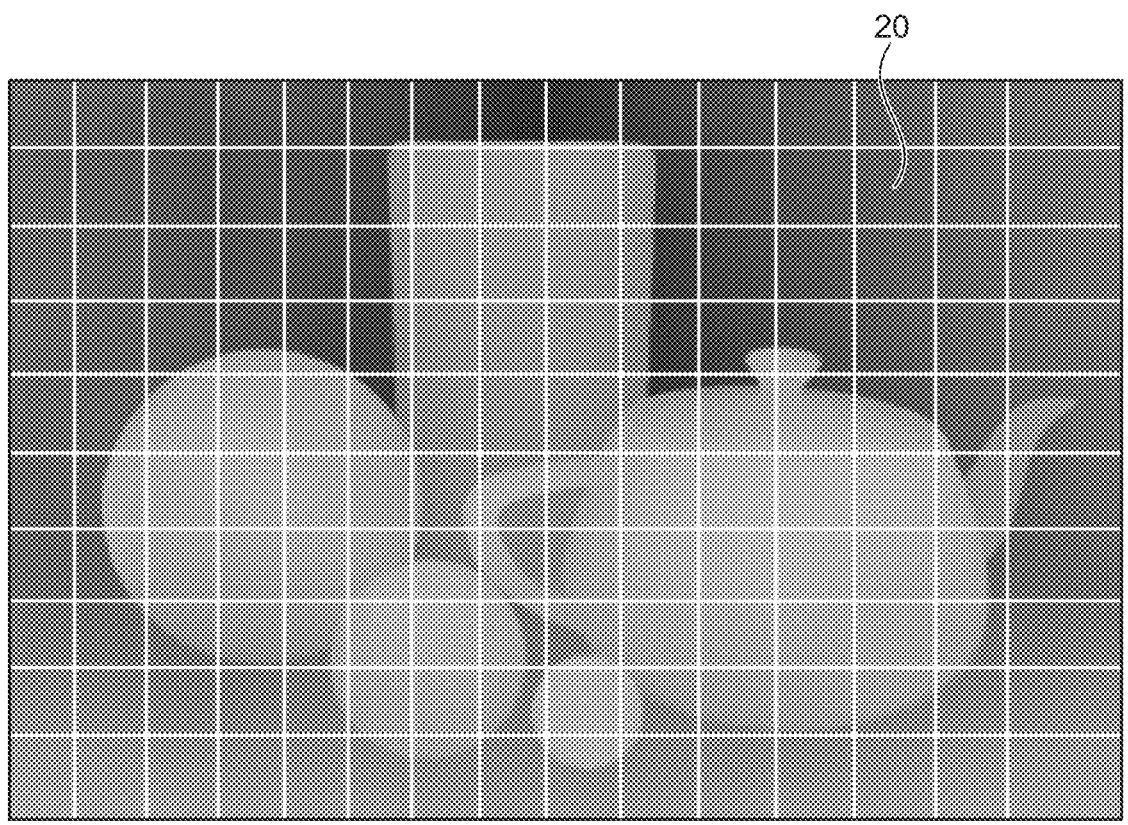
FIG. 3 shows an exemplary image to be displayed that has been divided into tiles for processing purposes.

FIG. 3 shows an exemplary image to be displayed that has been divided into respective tiles 20.

The render output data array may typically be an output frame intended for display on a display device, such as a screen or printer, but may also, for example, comprise intermediate data intended for use in later rendering passes (also known as a "render to texture" output), etc.

FIG. 2 shows the main elements and pipeline stages of the graphics processing pipeline 3 that are relevant to the operation of the present embodiment. As will be appreciated by those skilled in the art there may be other elements of the graphics processing pipeline that are not illustrated in FIG. 2. It should also be noted here that FIG. 2 is only schematic, and that, for example, in practice the shown functional units and pipeline stages may share significant hardware circuits, even though they are shown schematically as separate stages in FIG. 2. It will also be appreciated that each of the stages, elements and units, etc., of the graphics processing pipeline as shown in FIG. 2 may be implemented as desired and will accordingly comprise, e.g., appropriate processing circuitry and/or processing logic, etc., for performing the necessary operation and functions.

FIG. 2 shows schematically the pipeline stages after the graphics primitives (polygons) 12 for input to the rasterisation process have been generated. Thus, at this point the graphics data (the vertex data) has undergone fragment frontend operations 18, such as transformation and lighting operations (not shown), and a primitive set-up stage (not shown) to set-up the primitives to be rendered, in response to the commands and vertex data provided to the graphics processor.

As shown in FIG. 2, this part of the graphics processing pipeline 3 includes a number of stages, including a rasterisation stage 15, an early Z (depth) and stencil test stage 14, a renderer in the form of a fragment shading stage 16, a late Z (depth) and stencil test stage 17, a blending stage 19, a tile buffer 10 and a downsampling and writeout (multisample resolve) stage 13.

The rasterisation stage 15 of the graphics processing pipeline 3 operates to rasterise the primitives making up the render output (e.g. the image to be displayed) into individual graphics fragments for processing. To do this, the rasteriser 15 receives graphics primitives 12 for rendering, rasterises the primitives to sampling points and generates graphics fragments having appropriate positions (representing appropriate sampling positions) for rendering the primitives.

The fragments generated by the rasteriser are then sent onwards to the rest of the pipeline for processing.

The early Z/stencil stage 14 performs a Z (depth) test on fragments it receives from the rasteriser 15, to see if any fragments can be discarded (culled) at this stage. To do this, it compares the depth values of (associated with) fragments issuing from the rasteriser 15 with the depth values of fragments that have already been rendered (these depth values are stored in a depth (Z) buffer that is part of the tile buffer 10) to determine whether the new fragments will be occluded by fragments that have already been rendered (or not). At the same time, an early stencil test is carried out.

Fragments that pass the fragment early Z and stencil test stage 14 are then sent to the fragment shading stage 16. The fragment shading stage 16 performs the appropriate fragment processing operations on the fragments that pass the early Z and stencil tests, so as to process the fragments to generate the appropriate rendered fragment data, as is known in the art.

This fragment processing may include any suitable and desired fragment shading processes, such as executing fragment shader programs on the fragments, applying textures to the fragments, applying fogging or other operations to the fragments, etc., to generate the appropriate fragment data. In the present embodiment, the fragment shading stage 6 is in the form of a shader pipeline (a programmable fragment shader), but other arrangements, such as the use also or instead of fixed function fragment shading units would be possible, if desired.

There is then a "late" fragment Z and stencil test stage 17, which carries out, inter alia, an end of pipeline depth test on the shaded fragments to determine whether a rendered fragment will actually be seen in the final image. This depth test uses the Z-buffer value for the fragment's position stored in the Z-buffer in the tile buffers 10 to determine whether the fragment data for the new fragments should replace the fragment data of the fragments that have already been rendered, by comparing the depth values of (associated with) fragments issuing from the fragment shading stage 16 with the depth values of fragments that have already been rendered (as stored in the depth buffer). This late fragment depth and stencil test stage 17 also carries out any necessary "late" alpha and/or stencil tests on the fragments.

The fragments that pass the late fragment test stage 17 are then subjected to, if required, any necessary blending operations with fragments already stored in the tile buffer 10 in the blender 19. Any other remaining operations necessary on the fragments, such as dither, etc. (not shown) are also carried out at this stage.

Finally, the (blended) output fragment data (values) are written to the tile buffer 10 from where they can, for example, be output to a frame buffer for display. The depth value for an output fragment is also written appropriately to a Z-buffer within the tile buffer 10. (The tile buffer stores colour and depth buffers that store appropriate colour, etc., values or a Z-value, respectively, for each sampling position that the buffers represent (in essence for each sampling position of a tile that is being processed).) These buffers store an array of fragment data that represents part (a tile) of the overall render output (e.g. image to be displayed), with respective sets of sample values in the buffers corresponding to respective pixels of the overall render output (e.g. each 2×2 set of sample values may correspond to an output pixel, where 4x multisampling is being used).

In the present embodiment, the tile buffer stores its fragment data as 32×32 arrays (i.e. corresponding to a 32×32 array of sample positions in the output to be generated, e.g., in the image to be displayed). Each 32×32 data position array in the tile buffer can accordingly correspond to (and will "natively" support) a 16×16 pixel "tile" of, e.g., the frame to be displayed, at 4× anti-aliasing (i.e. when taking 4 samples per pixel).

The tile buffer is provided as part of RAM that is located on (local to) the graphics processing pipeline (chip).

The data from the tile buffer 10 is input to a downsampling (multisample resolve) write out unit 13, and thence output (written back) to an external memory output buffer, such as a frame buffer of a display device (not shown). (The display device could comprise, e.g., a display comprising an array of pixels, such as a computer monitor or a printer.)

In the present embodiments, the downsampling and writeout unit 13 downsamples (in either a fixed or variable fashion) the fragment data stored in the tile buffer 10 to the appropriate resolution for the output buffer (device) (i.e. such that an array of pixel data corresponding to the pixels of the output device is generated), to generate output values (pixels) for output to the output buffer.

Once a tile of the render output has been processed and its data exported to a main memory (e.g. to a frame buffer in a main memory (not shown)) for storage, the next tile is then processed, and so on, until sufficient tiles have been processed to generate the entire render output (e.g. frame (image) to be displayed). The process is then repeated for the next render output (e.g. frame) and so on.

Other arrangements for the graphics processing pipeline 3 would, of course, be possible.

The above describes certain features of the operation of the graphics processing system shown in FIG. 1. Further features of the operation of the graphics processing system shown in FIG. 1 that allow the effect of shadows in an image being rendered to be simulated in accordance with embodiments of the technology described herein will now be described.

The present embodiments will be described, for ease of explanation, with reference to processing a frame composed of solid geometry and a single, rectangular, area light source. However, other arrangements would, of course, be possible.

The present embodiments operate to simulate the effect of shadows in a scene being rendered by partitioning the 3D world-space volume for the scene to be rendered into a plurality of sub-volumes, and then determining for the sub-volumes, a set of geometry that could cast a shadow from a light source on objects in the sub-volume, and then using the determined sets of "shadow-casting" geometry to derive a light source visibility parameter for output samples for the scene. The light source visibility parameters for the output samples are then used when rendering (shading) an output frame for the scene to modulate the colour values for the output samples so as to simulate the effect of the shadows at the output samples.

FIGS. 17-20 show the partitioning of the 3D world-space volume for a scene to be rendered into a plurality of sub-volumes in embodiments of the technology described herein.

Figure 17:
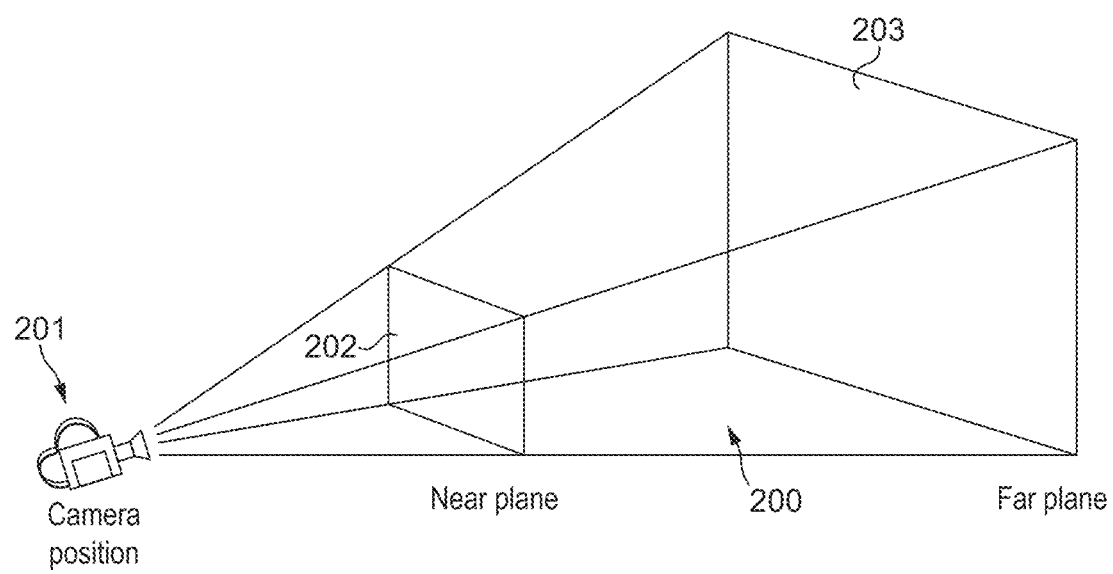
FIG. 17 shows the world-space volume for a scene to be rendered.

FIG. 17 shows an exemplary world-space volume 200 for a scene being rendered (defined by a view frustum from the camera (view) position 201 and near 202 and far 203 planes). This volume contains everything that is (potentially) visible in the scene (when the scene is rendered).

In the present embodiments, this 3D world-space volume for the scene being rendered is partitioned (subdivided) into a plurality of sub-volumes for processing purposes. Each sub-volume that the 3D world-space is divided into can be thought of as being, in effect, an output volume of the scene being rendered for which rendered graphics data may need to be generated to display (to render an image) displaying the scene.

In an embodiment, the world-space volume 200 for the scene is partitioned into a plurality of equal sub-volumes based on the position and volume of each sub-volume, irrespective of (and without reference to) any graphics structure that may be present in and defined for the world space volume for the scene.

This may be particularly appropriate where, for example, there is no graphics structure (other than the scene bounds in world-space) defined in the world-space volume when it is desired to partition that volume.

In this case, the size and shape of the sub-volumes that the overall world-space volume is divided into can be selected as desired. In an embodiment, each volume is cuboid, in an embodiment a rectangular cuboid, and in an embodiment a cube.

In other embodiments, the subdivision of the scene volume 200 into sub-volumes is based on structural elements (geometry) for the scene that are defined within the scene volume in world-space.

In this case, the structural elements defined in the world-space for the scene are divided into plural groups of those structural elements to thereby divide the volume for the scene into a plurality of sub-volumes (with each sub-volume being and corresponding to the volume of world space occupied by the group of structural elements in question).

In an embodiment the structural elements, e.g. positions, within the world-space are divided into groups such that the volumes of world-space occupied by the groups are smaller in size, and in an embodiment are as small in size as possible (such that the volume occupied by each group is made more compact (is based on the "compactness" of the volume of world-space occupied by each group)).

Suitable measures for the size of the volume occupied by a group of structural elements comprise, e.g., the sum of the axis extents of the bounding box for the volume occupied by a group of structural elements, and/or the surface area of the bounding box for the volume occupied by a group of structural elements.

In such an embodiment, the structural elements, e.g., positions, in the world-space are in a further embodiment grouped so as to constrain the number of elements within each group, and so as to constrain the volume in world-space occupied by each group.

Figure 18:
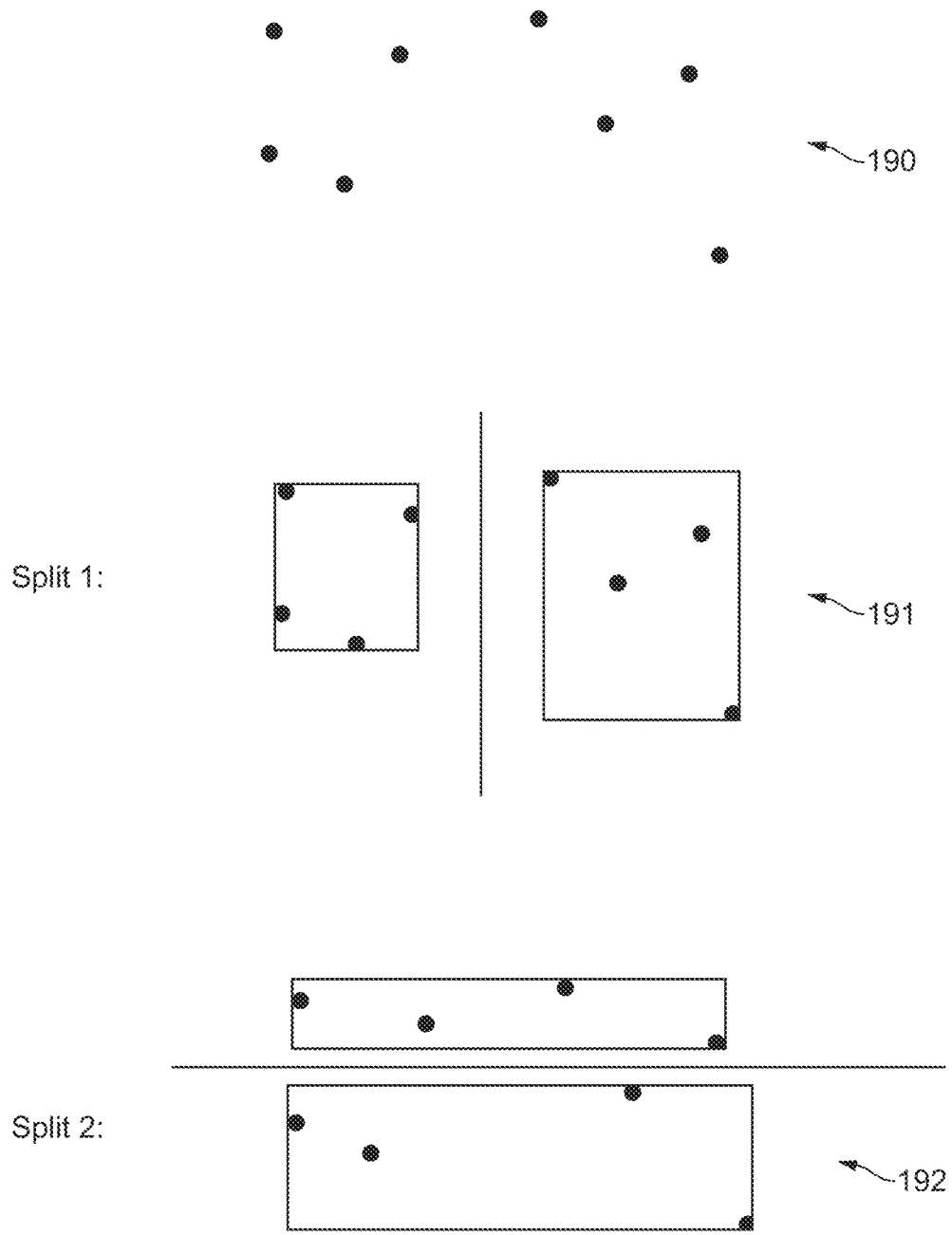
FIG. 18 shows schematically the partitioning of the world-space volume for a scene to be rendered into sub-volumes in an embodiment of the technology described herein.

FIG. 18 shows schematically an exemplary subdivision of an array of discrete positions 190 into groups and accordingly into sub-volumes in the above manners. This set of positions 190 may, e.g., comprise a set of vertex positions that are defined in the world-space for the scene, or a set of discrete positions, e.g. corresponding to particles, such as smoke particles, defined in the world-space for the scene.

For ease of illustration FIG. 18 simply shows the arrangement in two dimensions, but as will be appreciated by those skilled in the art, the principles can equally be (and would equally be) applied in three dimensions when subdividing the 3D world-space volume for the scene into sub-volumes.

In the example shown in FIG. 18, it is assumed that it is wished to divide the set of positions 190 into groups of four positions so as to subdivide the world-space volume into sub-volumes.

As shown in FIG. 18, there are two possibilities 191, 192 for dividing the set of sampling positions 190 into two groups of four sampling positions each and having sub-volumes that do not overlap. As shown in FIG. 18, the first grouping 191 of the sampling positions 190 is the "more compact" grouping, using a "compactness" measure of "shorter perimeter" or "shorted diagonal" for the corresponding areas occupied by the groups of sampling positions, and thus is the grouping that will (preferentially) be used to group the sampling positions 190 for the purpose of partitioning the world-space volume into sub-volumes.

This partitioning arrangement (sampling point grouping arrangement) shown in FIG. 18 can be generalised to three dimensions and used accordingly to partition a three-dimensional distribution of sampling positions into respective sub-volumes in a corresponding manner.

Once the world-space volume for the scene has been partitioned into the plurality of sub-volumes, then for each sub-volume that the world-space volume for the scene has been divided into, data indicating the volume of world-space that that sub-volume occupies is stored (and, if necessary, first generated).

In the present embodiments, this data indicates an axis-aligned bounding volume for the sub-volume. In the case where the sub-volumes are based on a subdivision of structure defined in the world-space for the scene being rendered, then the volume of world space that is occupied by each sub-volume accordingly corresponds to an axis aligned bounding volume for the group of structural elements for the sub-volume in question.

In the case where the world-space volume for the scene being rendered has been divided up into sub-volumes based at least in part on the structure (e.g. positions) that is defined for the scene in world-space, then in an embodiment as well as storing for each sub-volume that the world-space volume for the scene has been divided into, a representation of the world-space volume occupied by the sub-volume in question, there is also stored data representative of the "structure" (structural elements) (e.g. the discrete positions, e.g. vertex positions) that are present in the sub-volume in question.

The data representative of the structural elements (e.g. positions) that are present in a sub-volume can represent the structural elements that are present in the sub-volume in any suitable and desired manner. Thus this may, for example, comprise a set or range of indices indicative of the structural elements (e.g. positions) in question, such as a set of vertex indices indicating the vertices that are present within the sub-volume.

The bounding volume information (and any other desired information) is generated and stored for each sub-volume that the world-space volume for the scene has been divided into.

In the present embodiments, the data for the sub-volumes is stored as a bounding volume hierarchy, and in particular as a tree structure or structures representing the sub-volumes, with each leaf node in the tree corresponding to a given sub-volume (and having stored for it the data for that sub-volume). For each higher node in the tree, data representing a combined bounding volume of all its lower nodes is stored.

In the present embodiments, the tree structure that is formed is structured so as to have a very high (and constant) branching factor, and not many levels. In an embodiment tree structures having a 128 leaf nodes and only a few levels, e.g. 2 or 3 levels, above those 128 leaf nodes are used. Where a given world-space volume is divided into more than 128 sub-volumes, then additional tree structures are used as required. In this case, the "trees" (groups of 128 sub-volumes) are in an embodiment organised such that the combination of the sub-volumes of each tree is as small in volume as possible.

Other arrangements would, of course, be possible.

Figure 19:
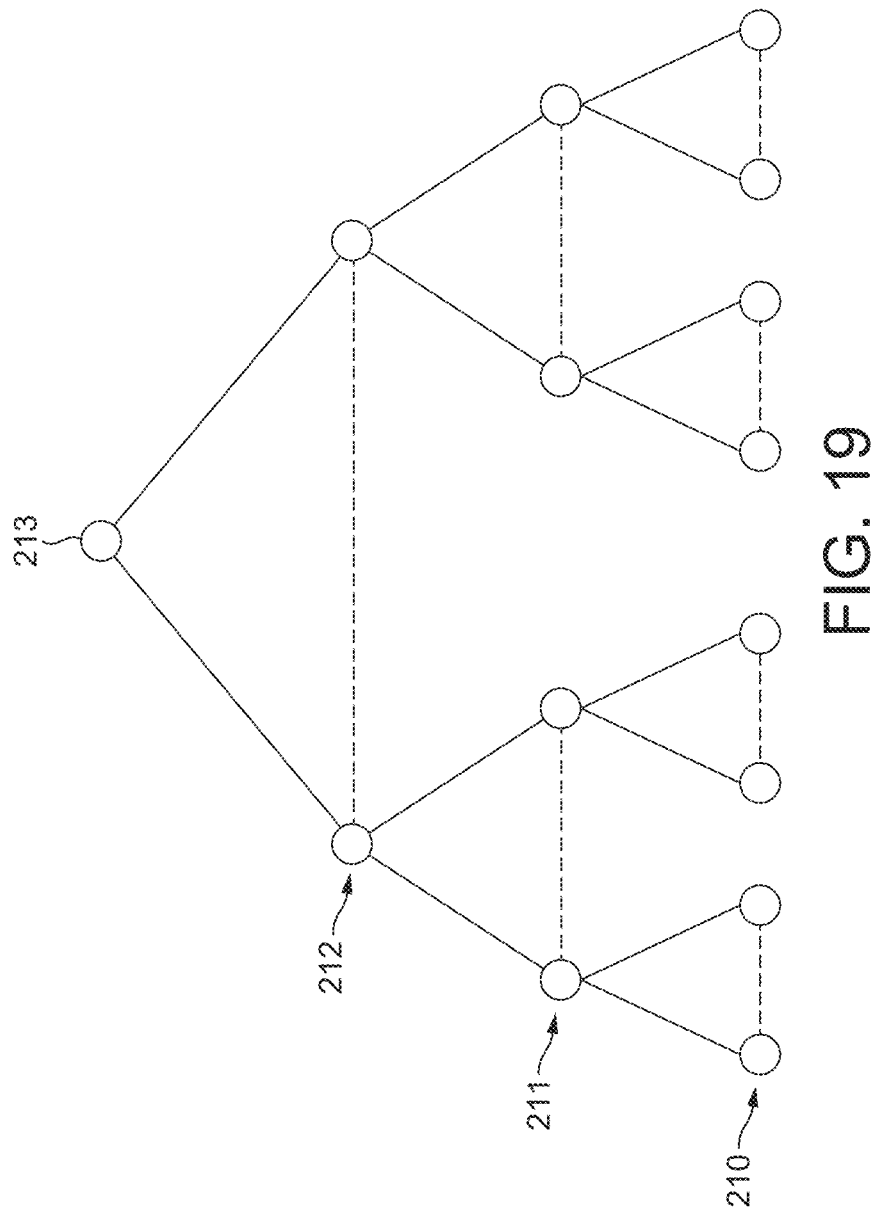
FIG. 19 shows an exemplary tree structure for representing a set of sub-volumes in an embodiment of the technology described herein.

FIG. 19 shows such an exemplary tree structure. Each leaf node 210 corresponds to a sub-volume and has stored for it the data for that sub-volume.

The higher level nodes 211, 212 accordingly correspond to the combination of their child nodes, and have stored for them a bounding volume that indicates the volume of space occupied by all of the sub-volumes of their respective child nodes.

The root node 213 accordingly corresponds to the combination of all of the leaf nodes, and has stored for it a bounding volume that indicates the volume of space occupied by all of the sub-volumes of the leaf nodes.

Other arrangements of and for the data that is stored for the sub-volumes would, of course, be possible.

Figure 20:
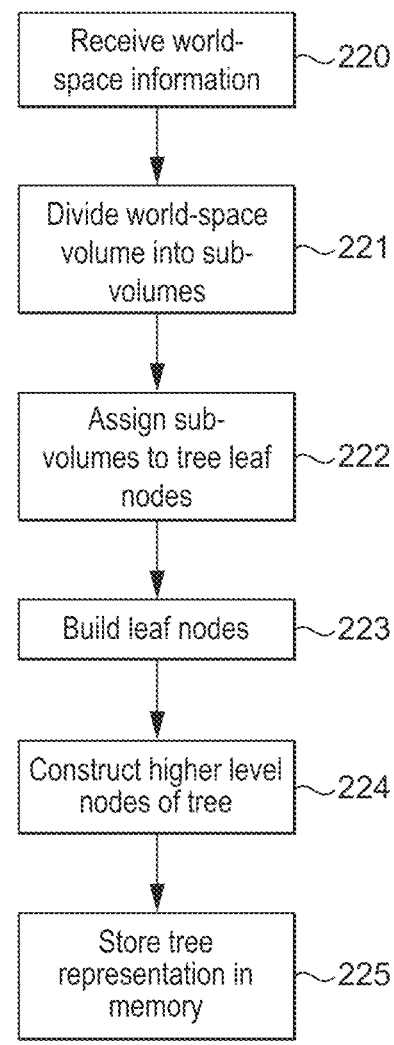
FIG. 20 shows the generation of a tree structure for representing a set of sub-volumes in an embodiment of the technology described herein.

FIG. 20 shows schematically the process for generating a tree representation for a set of sub-volumes that is used in the present embodiments.

Figure 14:
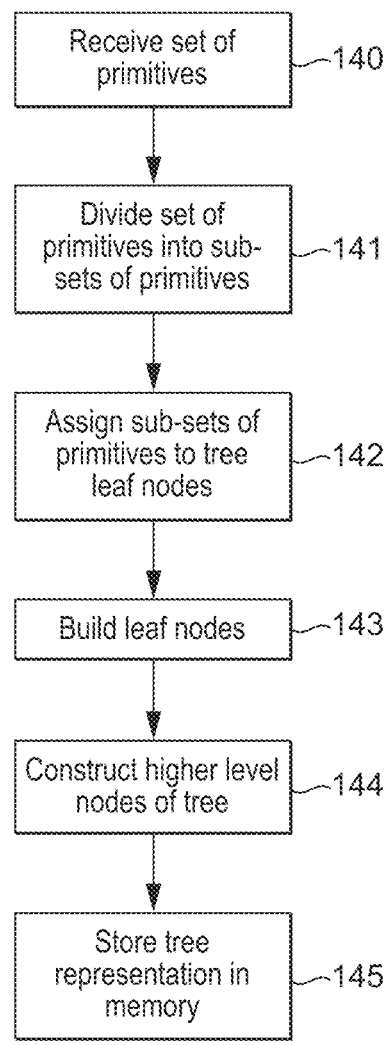
FIG. 14 shows the generation of a tree structure for representing a set of primitives in an embodiment of the technology described herein.

As shown in FIG. 14, information relating to the world-space volume for the scene being rendered will be received (step 220), and the world-space volume will be divided into plural sub-volumes in the manner discussed above (step 221).

Once the world-space volume has been divided into plural sub-volumes, a tree representation of the sub-volumes is constructed. The first stage in this process is to generate a leaf node of the tree for each respective sub-volume that the world-space has been divided into.

To do this, each sub-volume is assigned to a leaf node of the tree (step 222).

The leaf nodes are then "built", by determining and storing for each leaf node of the tree, the data representative of the sub-volume that the node represents (e.g. data indicating the volume of space that that sub-volume occupies) (step 223).

Once the leaf nodes that each represent a given sub-volume that the world-space volume has been divided into have been determined and "constructed", the higher level nodes for the tree representation are determined and constructed (step 224). The higher level nodes are built from their respective child nodes, by "merging" their respective child nodes so that each higher level node in the tree represents the combination of the sub-volumes that each of its child nodes represents.

The data that is stored for each higher level node comprises a bounding volume indicating the volume of space that all of its sub-volumes occupy. This bounding volume for a higher level node may be generated, e.g., by taking the minimum and maximum position values along each axis across all of the higher level node's child nodes.

Once the tree representation for the sub-volumes has been generated, it is then stored in memory for use (step 225).

Once the 3D world-space volume for the scene to be rendered has been partitioned into a plurality of sub-volumes in the manner discussed above, then for one or more of the sub-volumes, a set of geometry that could cast a shadow from a light source on objects in the sub-volume is determined.

While it would be possible simply to do this for all the sub-volumes that the world-space volume has been divided into, in the present embodiments this is done only for those sub-volumes that it is determined could be lit by a (by at least one) light source for the scene. Thus in the present embodiments, the sub-volumes that the world-space has been divided into are first culled against the volumes of influence of each light source for the scene, with sub-volumes that are outside the volumes of influence of the light sources not being processed further (for the purpose of determining sets of geometry that could cast shadows) (but any sub-volume that is within the volume of influence of at least one light source being processed further (for the purpose of determining sets of geometry that could cast shadows)). A list of the light sources that could affect a sub-volume is generated and stored in association with each sub-volume as part of this process, so that it can then be determined which light sources need to be considered for which sub-volumes.

The determined sets of "shadow casting" geometry are then used to derive a light source visibility parameter for output samples for the scene. The light source visibility parameters for the output samples are then used when rendering (shading) an output frame (image) for the scene to modulate the colour values for the output samples so as to simulate the effect of the shadows at the output samples.

Figure 4:
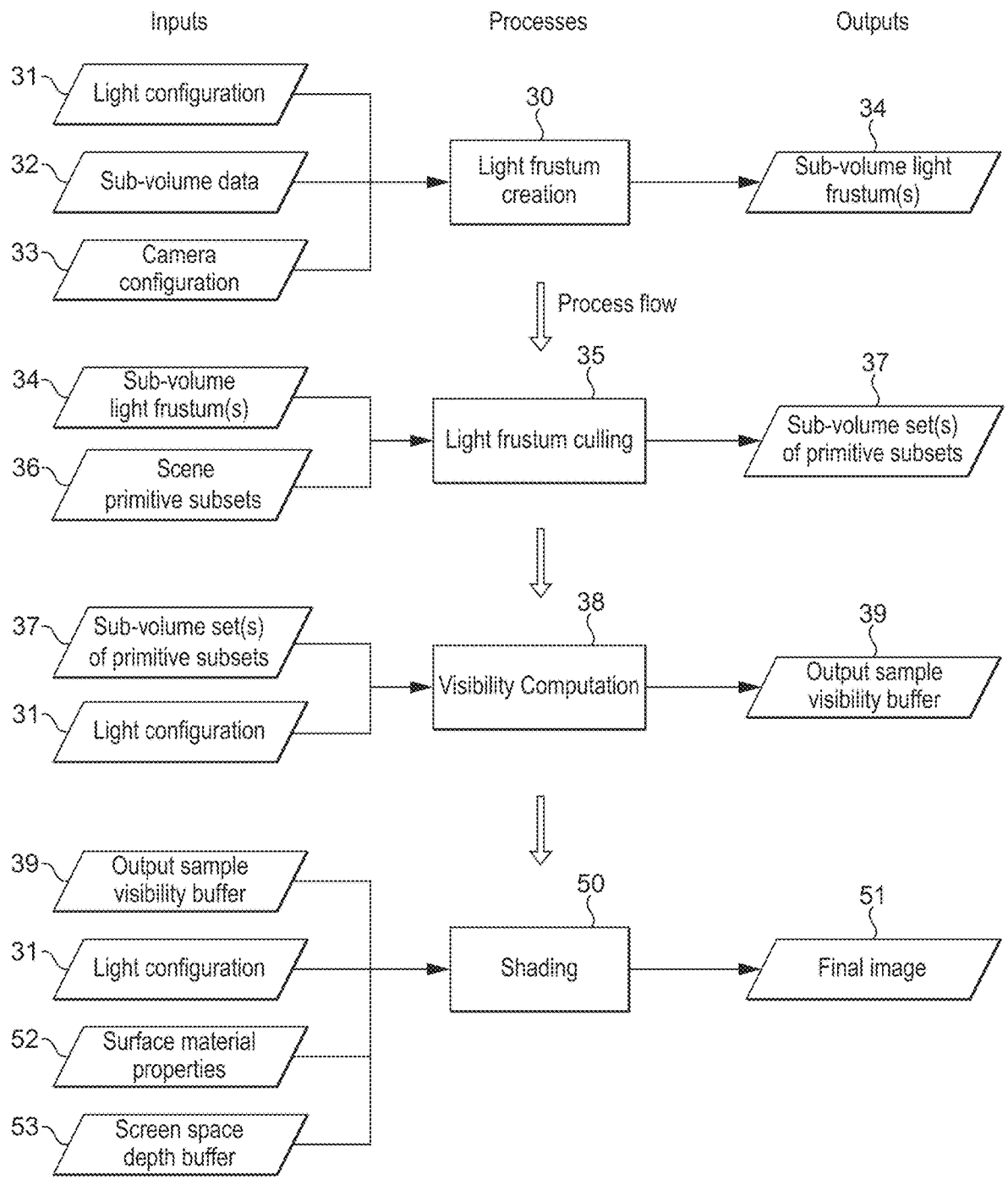
FIG. 4 shows schematically the processing of a sub-volume being rendered in an embodiment of the technology described herein.

FIG. 4 shows schematically the above operation for a given sub-volume in more detail.

As shown in FIG. 4, the process starts by creating bounding frustums for the light or for each light that could shine in the sub-volume in question (step 30). This operation takes as its inputs information about the configuration of the light or lights for the frame being rendered, the sub-volume data (tree representation) 32 that has previously been generated for the scene, and information indicating the camera configuration 33 for the scene, and produces as its output, one or more light source bounding frustums 34 for the sub-volume.

In the present embodiment, one bounding frustum is produced for a sub-volume for each light source, although other arrangements, such as producing plural bounding frustums for a given light source, would be possible, if desired.

Figure 5:
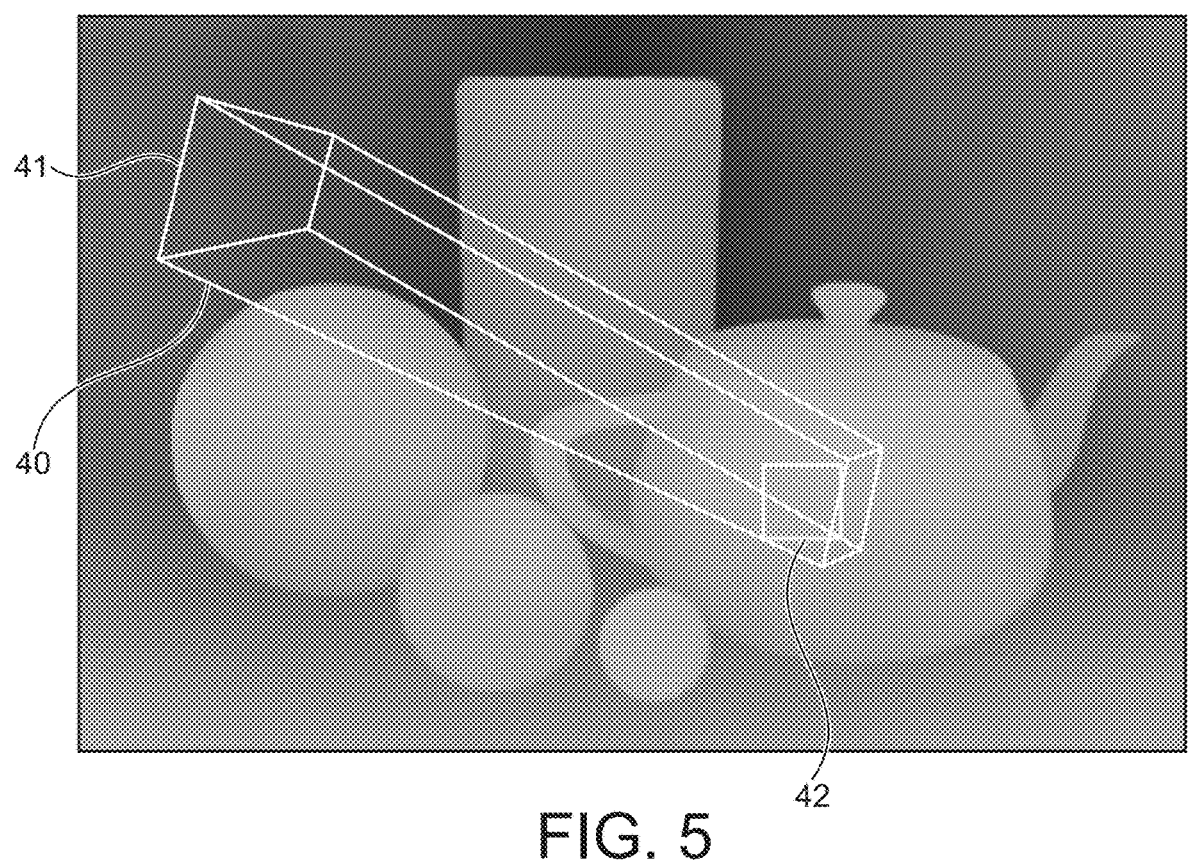
FIG. 5 shows an exemplary light source bounding frustum for a sub-volume.

To determine a light source bounding frustum for a sub-volume, the volume of space occupied by the sub-volume is determined using the sub-volume data 32. This is then used to construct a bounding frustum which contains the sub-volume and the light source itself. FIG. 5 illustrates this and shows an exemplary light source bounding frustum 40 for an area light 41 for a given sub-volume 42.

Once all the light source bounding frustums have been derived for the sub-volume being processed, those light source bounding frustums are then used, as shown in FIG. 4, to determine a set of geometry for the sub-volume that could cast a shadow in sub-volume tile (step 35).

In the present embodiment the set of geometry for a sub-volume that could cast a shadow in the sub-volume is determined as a set of subsets of primitives of a set of primitives that is to be processed for the scene in question. In effect, a set of primitives to be processed for the scene in question is divided into plural subsets of primitives, and it is then determined which of those subsets of primitives could cast a shadow in a sub-volume (and in each sub-volume being processed). The process of dividing the set of primitives into subsets of primitives and the data that is prepared and stored for the respective subsets of primitives that is then used in the operation of the present embodiment will be described in more detail below.

To determine a set of subsets of primitives that could cast a shadow in a sub-volume, as shown in FIG. 4, the scene geometry 36 in the form of subsets of primitives is culled against the light source bounding frustum(s) 34 for the sub-volume in a light frustum culling process 35. This process operates to construct a list of possible occluding subsets of primitives which could affect the shading of the sub-volume (cast a shadow in the sub-volume), by determining, for each subset of primitives, whether or not it intersects a light source bounding frustum for the sub-volume. (This is on the basis that any occluding subset of primitives which could affect the shaded value of geometry in the sub-volume must intersect the light source bounding frustum for the sub-volume.)

The output of this process is accordingly a list 37 of subsets of primitives for the sub-volume which could cast a shadow in the sub-volume.

The light source bounding frustum culling operation 35 can be carried out as desired. For example, it would be possible to iteratively test each subset of primitives in turn against each light source bounding frustum. However, in the present embodiments, this operation is accelerated by using a hierarchy for the sub-volume light source bounding frustums and a separate hierarchy for the subsets of primitives. In this case, high level, bounding volume, representations of the subsets of primitives are first tested against light source bounding frustums for sets of plural sub-volumes, and then any high level bounding volume representations of subsets of primitives that pass this first stage are intersection tested against the individual sub-volume light source bounding frustums. Finally, individual subsets of primitives are tested against the individual sub-volume light source bounding frustums.

Once the lists (sets) of subsets of primitives 37 that could affect the shading of the sub-volume have been determined, those sets of subsets of primitives are then used to determine a light source visibility parameter for plural output samples in the sub-volume in question for which a rendered output is required, in a visibility computation process 38, as shown in FIG. 4.

In the present embodiment, this visibility computation operation 38 operates to determine a light source visibility parameter for each screen space sampling position that falls within the sub-volume in question (which light source visibility parameter is then used to modulate the light source to simulate the effect of the shadows at the sampling position in question). (Thus, in the present embodiment, the output samples for which light source visibility parameters are determined (and that are then shaded using the determined light source visibility parameters) comprise screen space sampling positions that are to be rendered when rendering an output frame representing the scene being rendered.)

To do this, an array of sampling positions (representing the location of the light source being considered) is determined, and it is then determined for each screen space sampling position that falls within the sub-volume in question, whether rays cast between the screen space sampling position and each light source sampling position would intersect an occluding subset of primitives or not.

Figure 6:
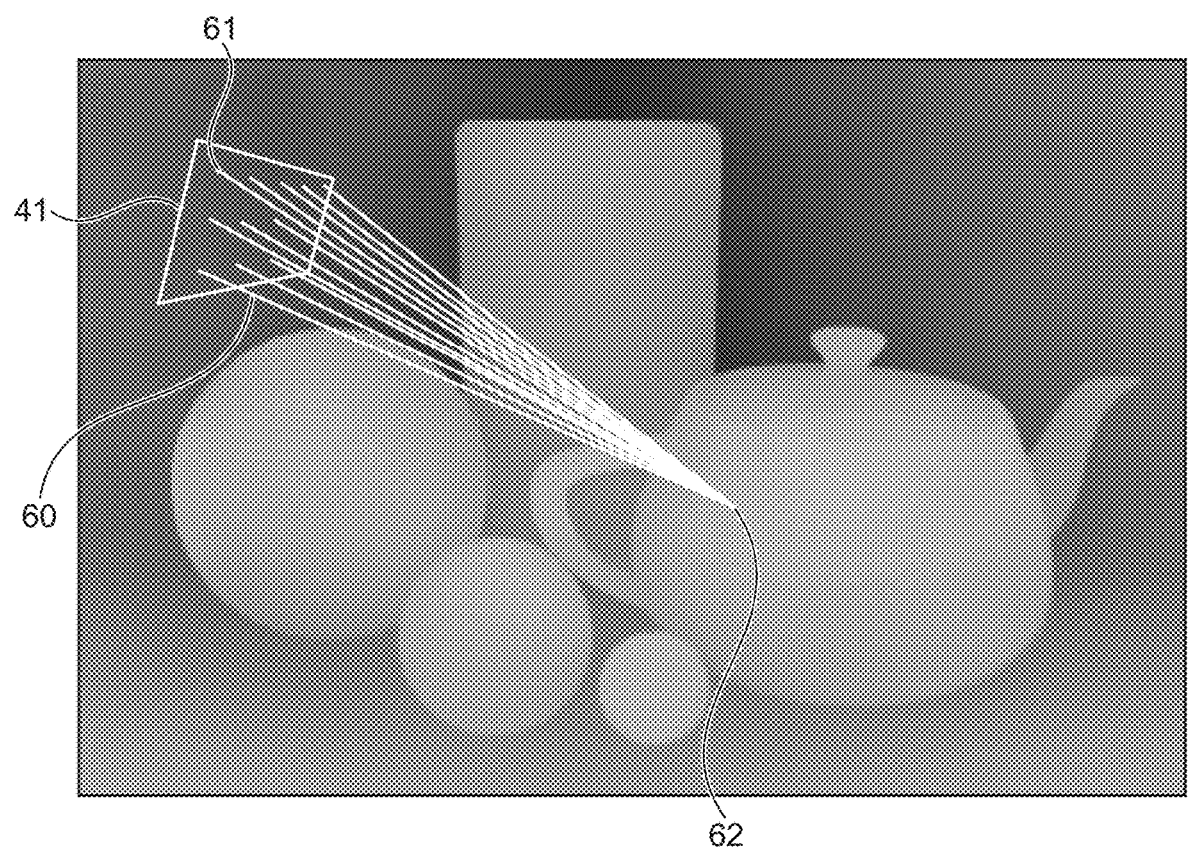
FIGS. 6, 7, and 8 illustrate the determination of occluded light source sampling positions in an embodiment of the technology described herein.
Figure 7:
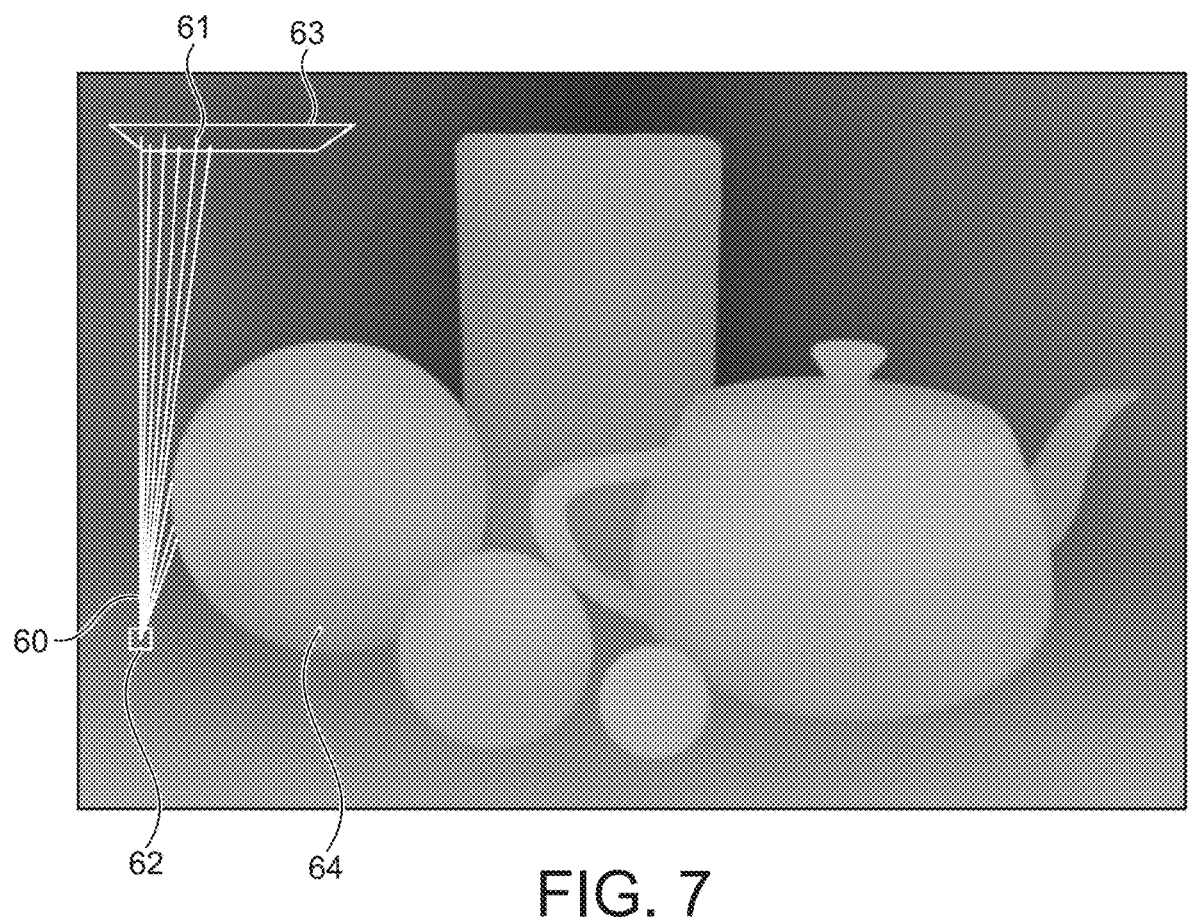
Figure 8:
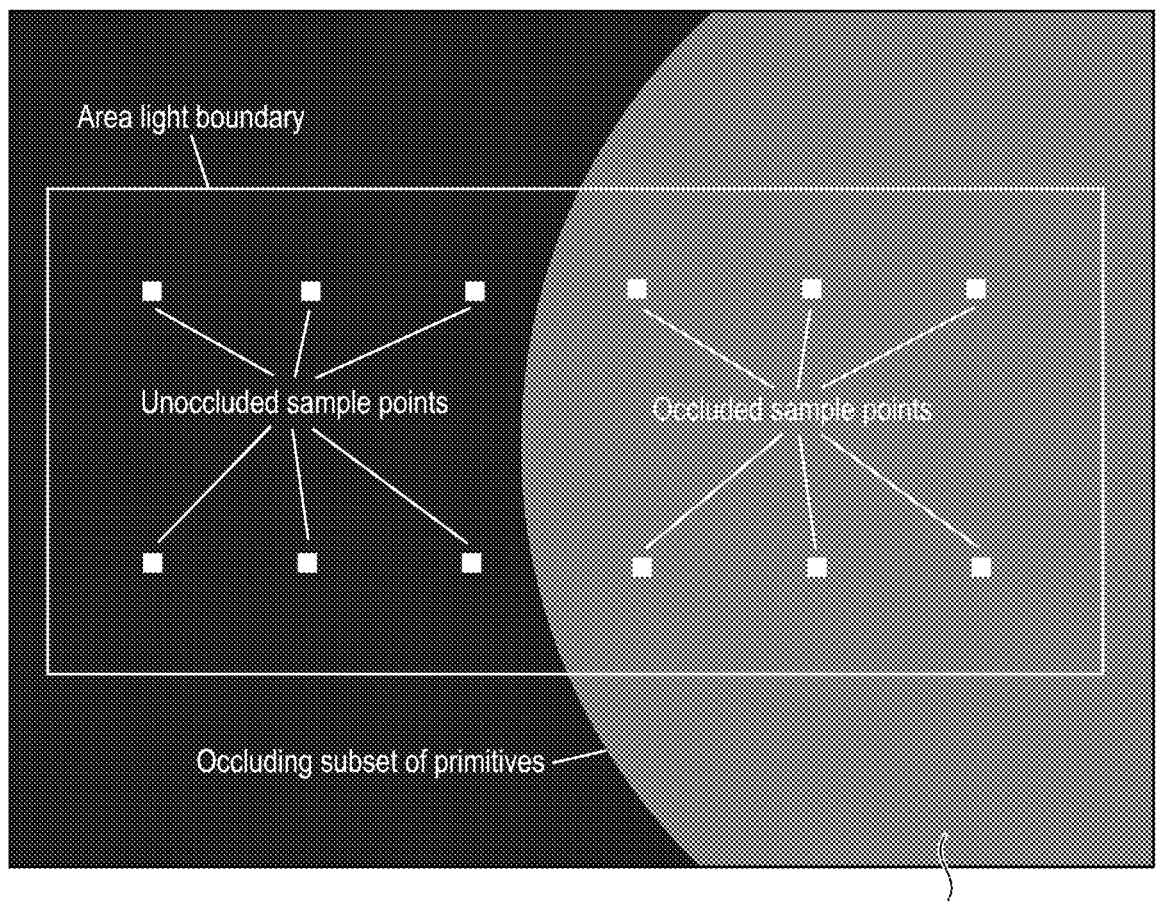

FIGS. 6, 7 and 8 illustrate this operation. FIG. 6 shows exemplary rays 60 cast from sampling positions 61 for an area light 41 to a screen space sampling position 62. In this example shown in FIG. 6, it is assumed that none of the rays from the screen space sampling position 62 to the light source sampling position 61 intersect an occluding subset of primitives.

FIG. 7 shows an alternative situation in which some of the rays 60 cast from the screen space sampling position 62 being considered to sampling positions 61 representing an area light 63 will be intersected by an occluding subset of primitives 64 (representing a sphere for example).

As shown in FIG. 8, in this case, some of the sampling points representing the area light 63 will be occluded from the perspective of the screen space sampling position 62 by the occluding subset of primitives 64 and others of those sampling points will not be occluded.

In the present embodiments, the determination of whether rays cast between an output sample position and each light source sampling position would intersect an occluding subset of primitives is carried out as a rasterisation operation. To do this, a single execution thread is used for each output sample, and operates to rasterise the subsets of primitives as indicated by the determined sets of subsets of primitives 37 for the sub-volume onto a render target that corresponds to the array of sampling positions that represent the light source. As for each output sample in the sub-volume the same set of subsets of primitives will be considered, the memory access and thread execution pattern for this operation can be extremely coherent.

In the present embodiment, this rasterisation operation (the visibility computation process 38) operates to identify for each light source sampling position whether it is occluded from the output sample position in question by any subsets of primitives or not. Thus the render target for the rasterisation process is an array having a single bit for each light source sampling position, with the bit being set by the rasterisation operation if it is determined that the light source sampling position in question will be visible from the output sample position being considered.

In this arrangement, where, for example, the light source is represented by, e.g., a few hundred sampling positions, the "light source visibility" render target will only require a few hundreds of bits (one per light source sampling position), and so can, for example, fit in registers (i.e. does not need to be stored in main memory).

Once all the relevant subsets of primitives have been considered by the rasterisation process, the number of set bits in the render target is then counted (i.e. the number of visible light source sampling positions for the output sample in question is counted), and used to determine a light source visibility parameter value for the output sample (sampling position) in question. In the present embodiment, the light source visibility parameter value for the output sample is determined as the ratio of visible (non-occluded) light source sampling positions for the output sample in question to the total number of light source sampling positions for the light source in question. Other arrangements would of course be possible.

This value is then stored for the output sample (in this case, screen space sampling position) in question in an output sample visibility buffer 39 that will store the determined light source visibility parameters for each output sample being considered. The process is then repeated for the next output sample position, and so on, until a light source visibility parameter has been determined and stored in the output sample visibility buffer 39 for each output sample being considered.

The output sample visibility buffer 39 for the sub-volume is stored locally to the graphics processing pipeline, e.g. in registers (and does not need to be and is not written out to main memory).

In these arrangements, the light source visibility parameter for an output sample position could simply be the proportion (ratio) of the number of light source sampling positions that are visible at the output sample position in question, or, for example, the proportion of visible light source sampling positions could be scaled to a number that is within a predefined range, such as between 0 and 1, which scaled value is then used as the light source visibility parameter value for the output sample in question.

The array of sampling positions that represent the location of the light source being considered in these embodiments can be selected as desired. For example, a regular grid of sampling positions could be used, or a rotated grid of sampling positions could be used to try to reduce aliasing.

Once the output sample visibility buffer 39 for a sub-volume has been determined, the values in the output sample visibility buffer can then be used when shading the geometry in the sub-volume to produce the rendered output image for the sub-volume, as shown in FIG. 4 (step 50).

As shown in FIG. 4, the shading operation 50 will determine an output set of colour data for each output screen space sampling position that is then used to display the output image 51 of the scene. This shading operation will, inter alia, take into account the intensity and colour of the light source, the colour and transparency of the surface that the light is falling on the depth of the surface that the light is falling on, and, in accordance with the present embodiments, the determined light source visibility parameters, to determine the output colour for each output sampling position.

To do this, the shading operation 50 uses, inter alia, the light configuration 31 for the scene, the relevant surface material properties 52 at the sampling position in question, the depth 53 at the sampling position in question, and the light source visibility parameter in the output sample visibility buffer 39 for the sampling position being considered. The light source visibility parameter from the output sample position visibility buffer 39 is used in the shading operation 50 in the present embodiments to modulate (attenuate) the indicated illumination value for the light source in question at the (and at each) sampling position being considered, by multiplying the illumination value for the light source by the light source visibility parameter for the sampling position being considered. This will then give a good, visually pleasing approximation to the correct shadowing result. Other arrangements would, of course, be possible.

In the present embodiments, each of the processing stages shown in FIG. 3 (thus the light frustum creation 30, the light frustum culling 35, the visibility computation 38 and the shading 50) are performed by the graphics processor 3 performing GPGPU processing via a compute context.

The above describes the operation for a single sub-volume for a single light source. The operation can be extended in a corresponding manner to arbitrarily many light sources for a volume.

It will also be appreciated that this operation should be repeated for each sub-volume of the scene being rendered for output (at least where there could be shadow-casting geometry) (and for each frame of a sequence of frames to be rendered).

As discussed above, in the present embodiments the geometry for a frame to be processed that is tested to determine if it will occlude a light source for a given sub-volume (and that is then tested against the respective light source representing sampling positions) is represented for this purpose as respective subsets of primitives of the set of primitives that is to be processed. The process for dividing a set of primitives to be processed into subsets of primitives that is used in the present embodiments will now be described with reference to FIGS. 9, 10, and 11.

In the present embodiments, it is assumed that the primitives in the set of primitives to be processed are in the form of triangles. Thus this operation of the present embodiments will be described with reference to primitives in the form of triangles. However, this is not essential, and primitives having other forms could be used if desired (with the process then operating in a corresponding manner for those primitives).

Figure 9:
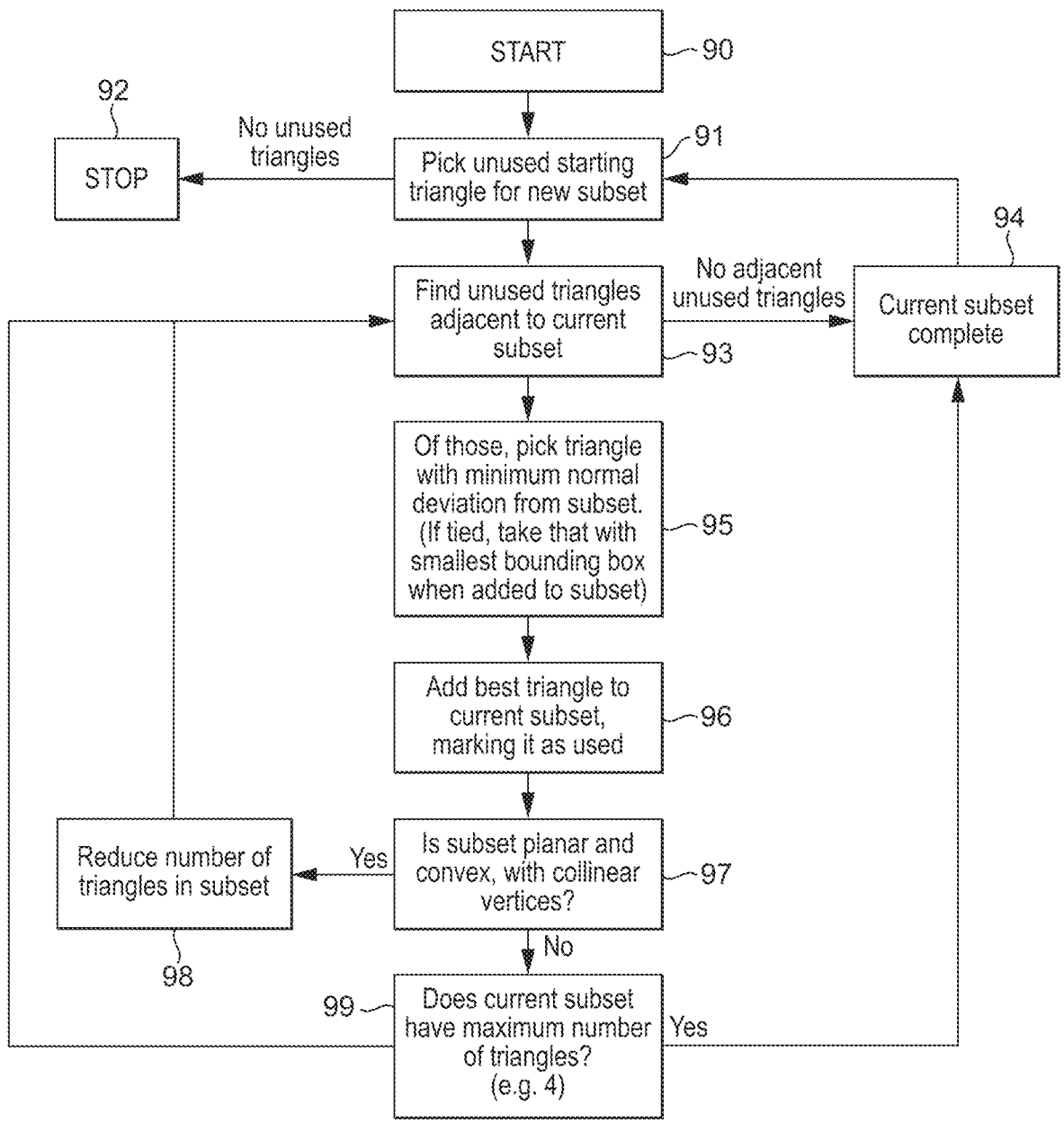
FIG. 9 shows schematically the subdivision of a set of primitives into subsets of primitives in an embodiment of the technology described herein.

As shown in FIG. 9, the processing starts (step 90) by selecting an unused starting triangle of the set of primitives being considered (i.e. a primitive in the set of primitives being processed that has not yet been allocated to a subset) to act as a starting triangle for a new subset of primitives (step 91).

The set of primitives that is being considered in this regard may, e.g., be the set of primitives to be processed for the desired graphics processing output (e.g. scene) as a whole, or it may be a set of primitives defined for a smaller subdivision of the graphics processing output, such as a set of primitives for a given draw call.

If at step 91 it is determined that there are no remaining unused (unallocated) primitives in the subset of primitives (i.e. that all the primitives of the subset of primitives being considered have been allocated to a respective subset of primitives), then the process of subdividing the set of primitives into subsets of primitives is complete (step 92).

On the other hand, if at step 91, there is an unused triangle (primitive) in the set of primitives, then that unused triangle is selected as a starting triangle for a new subset of primitives. It is then determined whether there are any unused triangles (i.e. any primitives in the set of primitives that have not yet been allocated to a subset of primitives) that are adjacent to and contiguous with the current subset of primitives (step 93).

If at this stage it is determined that there are no adjacent, contiguous, unused triangles in the set of primitives, then the current subset of primitives is considered to be complete (step 94), and the process returns to the selection of a new, unused starting primitive for a new subset of primitives at step 91.

On the other hand, if there are unused, contiguous triangles adjacent to the subset of primitives currently being considered, then one of those adjacent, contiguous triangles is selected as a triangle (primitive) to add to the current subset of primitives (step 95).

As shown in FIG. 9, if there is more than one unused, adjacent, contiguous triangle to the current subset, then firstly the candidate adjacent contiguous triangle to add to the subset of primitives that has the minimum normal deviation from the subset of primitives (in its current form) is selected as the triangle to add to the subset of primitives. If the candidate adjacent, contiguous triangles cannot be distinguished on the basis of their normal deviation from the subset of primitives, then the candidate adjacent, contiguous triangle that adds the smallest bounding box when added to the current subset of primitives is selected as the primitive to add to the subset of primitives.

The normal directions of the triangles and subset of primitives, and the bounding volumes for the subset of primitives and the candidate primitives can be determined for this purpose in any suitable and desired manner, for example based on the vertices for the primitives (triangles).

The selected candidate unused adjacent and contiguous triangle is then added to the current subset of primitives (and marked as being used (allocated to a subset of primitives)) (step 96).

Once a candidate triangle has been added to a subset of primitives at step 96, it is then determined whether the subset of primitives with that new triangle is planar and convex, with co-linear vertices (step 97). If so, the number of triangles in the subset is reduced, by merging the planar triangles with co-linear vertices to form a single primitive to remove their shared edge (step 98).

The process then returns to step 93 to determine if there are any further unused, adjacent and contiguous triangles that could be added to the current subset of primitives.

If at step 97 it is determined that the subset is not planar and convex with co-linear vertices, then triangles in the subset of primitives cannot be merged, so the process proceeds then to determine whether the current set of primitives has reached a selected maximum number of triangles or not (which in the present embodiment is set to be four triangles, although other arrangements would, of course, be possible) (step 99).

If it is determined that the current subset of primitives has not yet reached the maximum number of triangles permitted for a subset of primitives, then the process returns to step 93 to determine if there are any further unused, adjacent and contiguous triangles that could be added to the current subset of primitives.

On the other hand, if it is determined that the current subset of primitives has reached the maximum number of triangles permitted for a subset of primitives at step 99, then the current subset of primitives is considered to be complete (step 94) and the process returns to step 91 to determine a new starting triangle for a new subset of primitives (if any).

This process is repeated until all the primitives (triangles) in the set of primitives being considered have been allocated to a subset of primitives.

Figure 10:
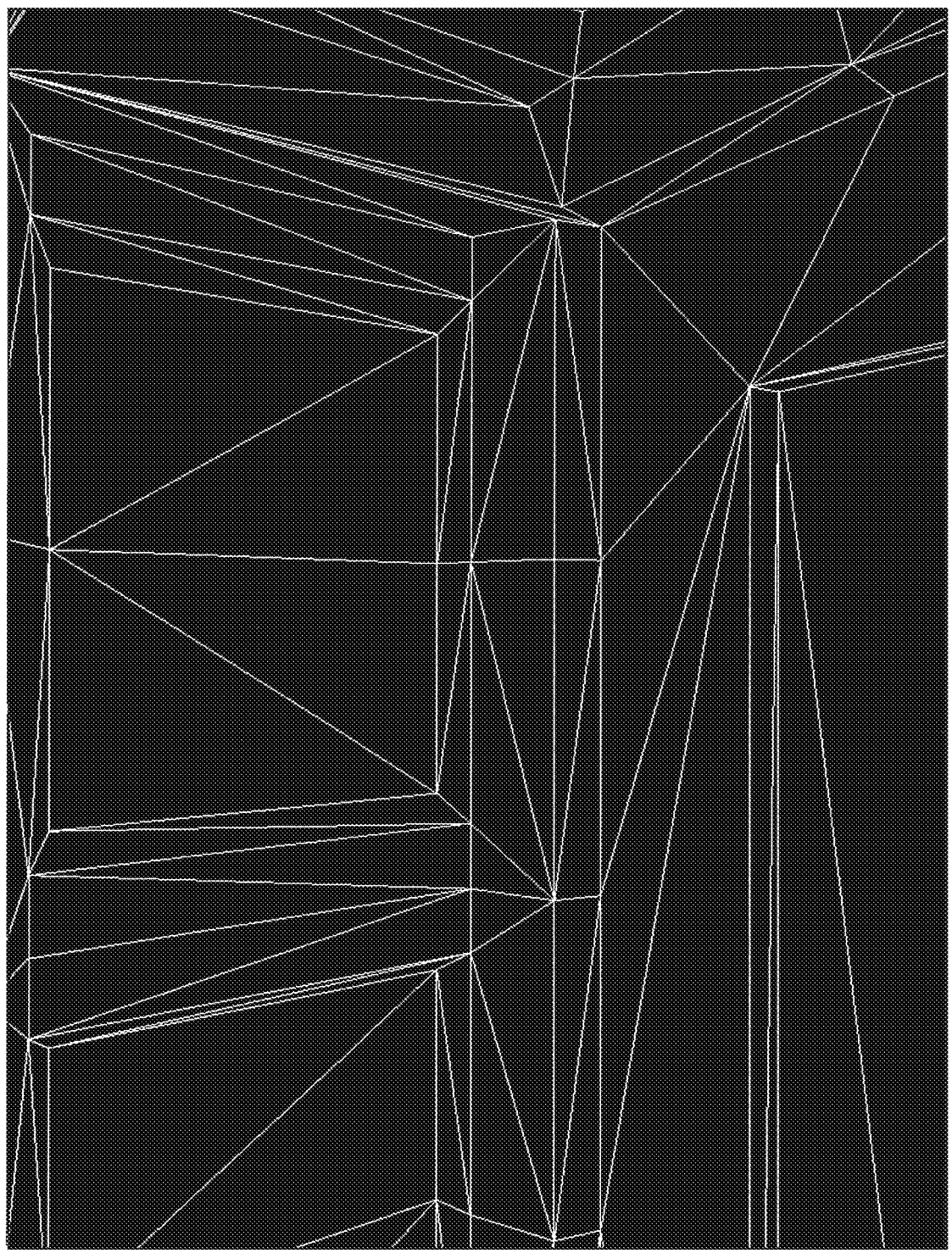
FIGS. 10 and 11 illustrate the subdivision of a set of primitives into subsets of primitives.
Figure 11:
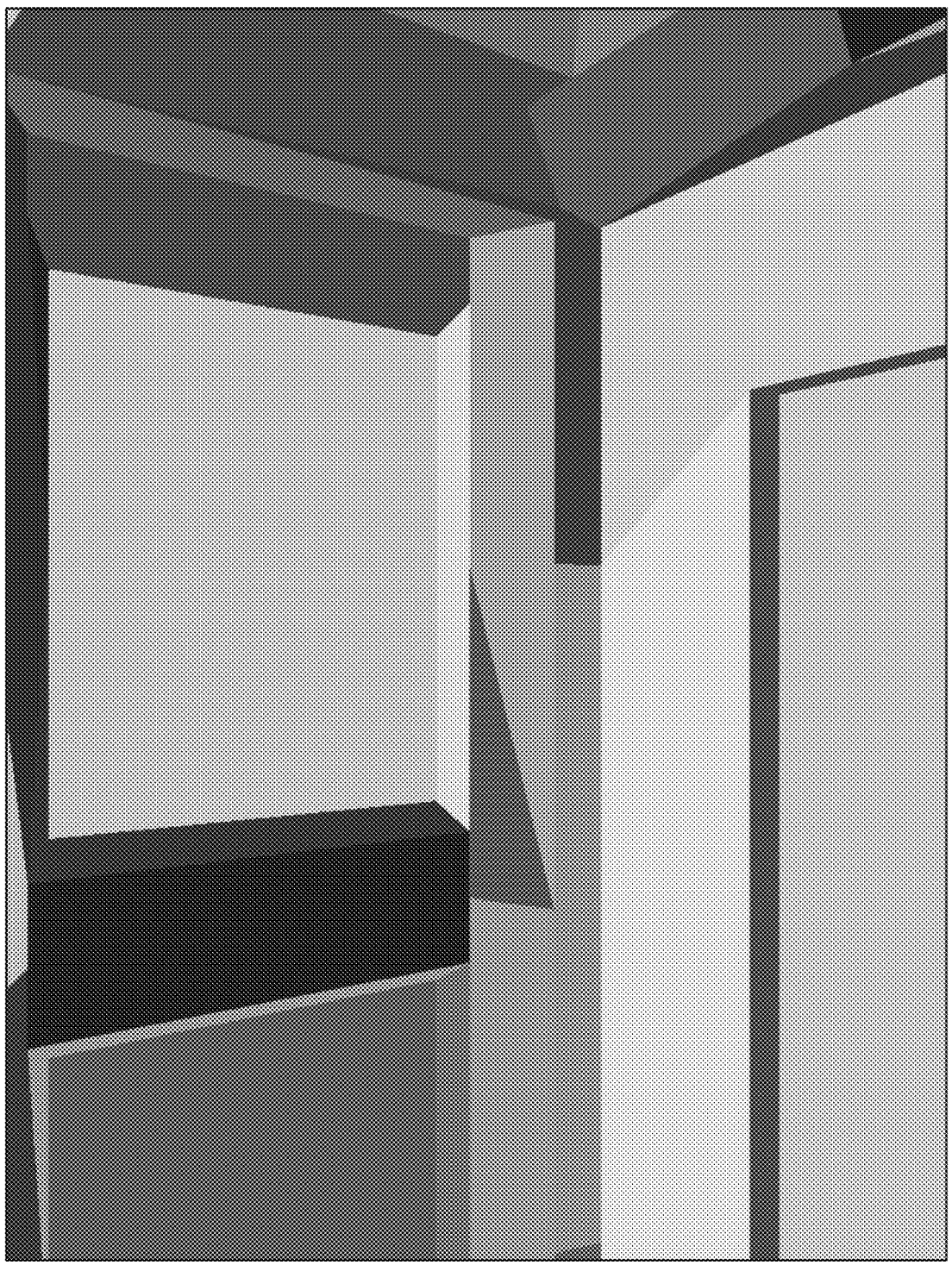

FIGS. 10 and 11 illustrate this subdivision of a set of primitives into subsets of primitives.

FIG. 10 shows an exemplary set of primitives to be subdivided into subsets of primitives in the manner of the present embodiment. FIG. 11 shows schematically the resulting subsets of primitives that are formed from the set of primitives shown in FIG. 10. Each different coloured region in FIG. 11 is a respective subset of primitives formed from the set of primitives shown in FIG. 10 in accordance with the process for dividing a set of primitives into subsets of primitives shown in FIG. 9.

Other arrangements for subdividing a set of primitives into subsets of primitives would, of course, be possible.

As well as subdividing the set of primitives to be processed into respective subsets of primitives, the present embodiments also store for each subset of primitives that the set of primitives has been divided into, data representative of the primitives of the subset of primitives, and data indicating the volume of space that the subset of primitives falls within.

In the present embodiments, this data is stored in a fixed sized data structure for each subset of primitives, as that facilitates, e.g., accessing that data in memory. Where the data for a given subset of primitives does not completely fill the fixed size data structure (e.g. because the subset contains less than the maximum permitted number of primitives), the data structure is in an embodiment padded with dummy values or includes data values to indicate this.

In the present embodiments, the data representative of the primitives in a subset of primitives that is stored for a subset of primitives comprises a set of vertex indices that indicate a vertex index for each unique vertex position of the subset of indices. To facilitate this, a modified set (list) of vertices that includes only unique vertex positions is generated from the set of vertices for the set of primitives in question. The index data that is then stored for each subset of primitives indicates the vertices (the vertex positions) in that modified set (list) of vertices. The vertex indices are stored for a subset of primitives in the order that the vertices are connected in, to facilitate the later determination of the topology of the subset of primitives in question.

As well as a set of position indices indicating vertex positions for a subset of primitives, in the present embodiments additional data indicative of the topology of the subset of primitives, which together with the vertex position indices for the subset of primitives can be used to determine the topology of the subset of primitives, is stored. In the present embodiments, this topology information comprises an indication of a number of primitives in the subset of primitives, an indication of the number of edges of the first primitive in the subset of primitives, an indication of the number of edges of the second primitive in the subset of primitives (if present) (in the present embodiment, the second primitive of a subset of primitives (if any) is always configured as being attached to a predefined edge of the first primitive of the subset), an indication of the edge that the third primitive in the subset of primitives (if present) attaches to, and an indication of the two vertices that the fourth primitive in the subset of primitives (if present) attaches to.

The Applicants have recognised in this regard, that by capping the number of primitives that can be present in a subset of primitives to, e.g., four, that constrains the potential topologies that a subset of primitives can take, and thereby facilitates indicating the topology of the primitives in a subset of primitives in a relatively efficient manner and using relatively little data capacity.

Figure 12:
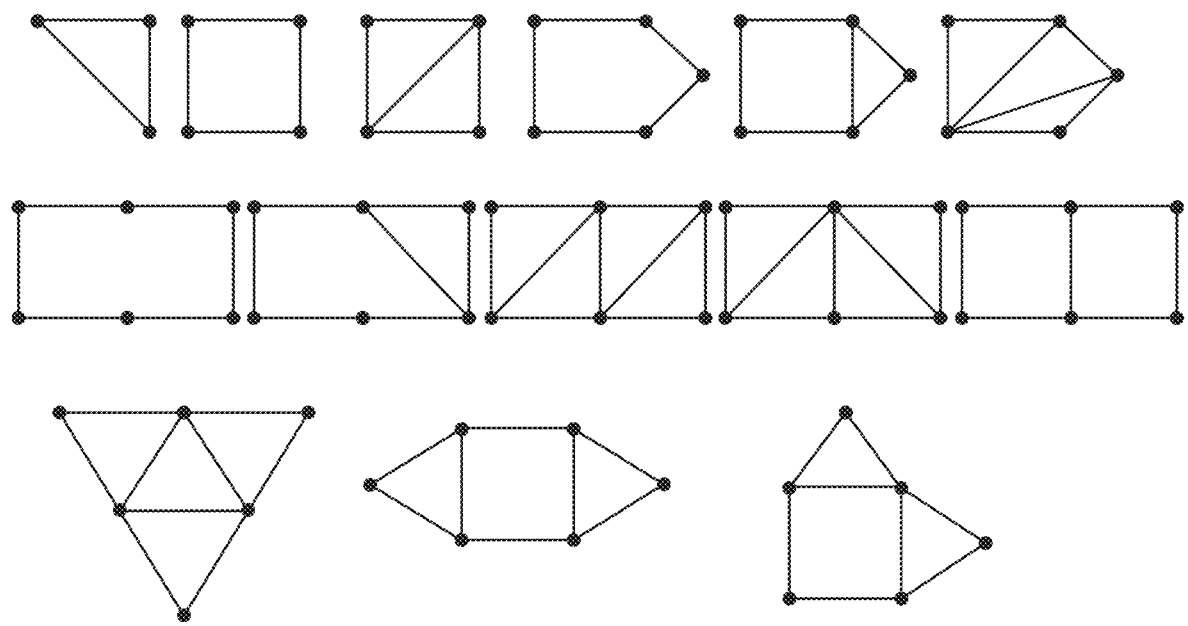
FIG. 12 shows the possible topologies for a subset of primitives in an embodiment of the technology described herein.

FIG. 12 shows the potential topologies that a subset of primitives can have where each subset is able to contain no more than four triangles (as in the present embodiments), and which can accordingly be indicated by the topology information that is used in the present embodiments.

The data that is stored for a subset of primitives that represents the volume of space that the subset of primitives falls within (occupies) defines (indicates), in the present embodiments, an axis aligned bounding volume for the subset of primitives.

This vertex index, topology and bounding volume information is generated and stored for each subset that a set of primitives is divided into.

In the present embodiments, the data for the subsets of primitives is stored as a bounding volume hierarchy, and in particular as a tree structure or structures representing the set of primitives, with each leaf node in the tree corresponding to a given subset of primitives (and having stored for it the data for that subset of primitives). For each higher node in the tree, data representing a combined bounding volume of all its lower nodes is stored.

In the present embodiments, the tree structure that is formed is structured so as to have a very high (and constant) branching factor, and not many levels. In an embodiment tree structures having a 128 leaf nodes and only a few levels, e.g. 2 or 3 levels, above those 128 leaf nodes are used. Where a given set of primitives is divided into more than 128 subsets of primitives, then additional tree structures are used as required. In this case, the "trees" (groups of 128 subsets of primitives) are in an embodiment organised such that the combination of the subsets of primitives of each tree is as small in volume as possible.

Other arrangements would, of course, be possible.

Figure 13:
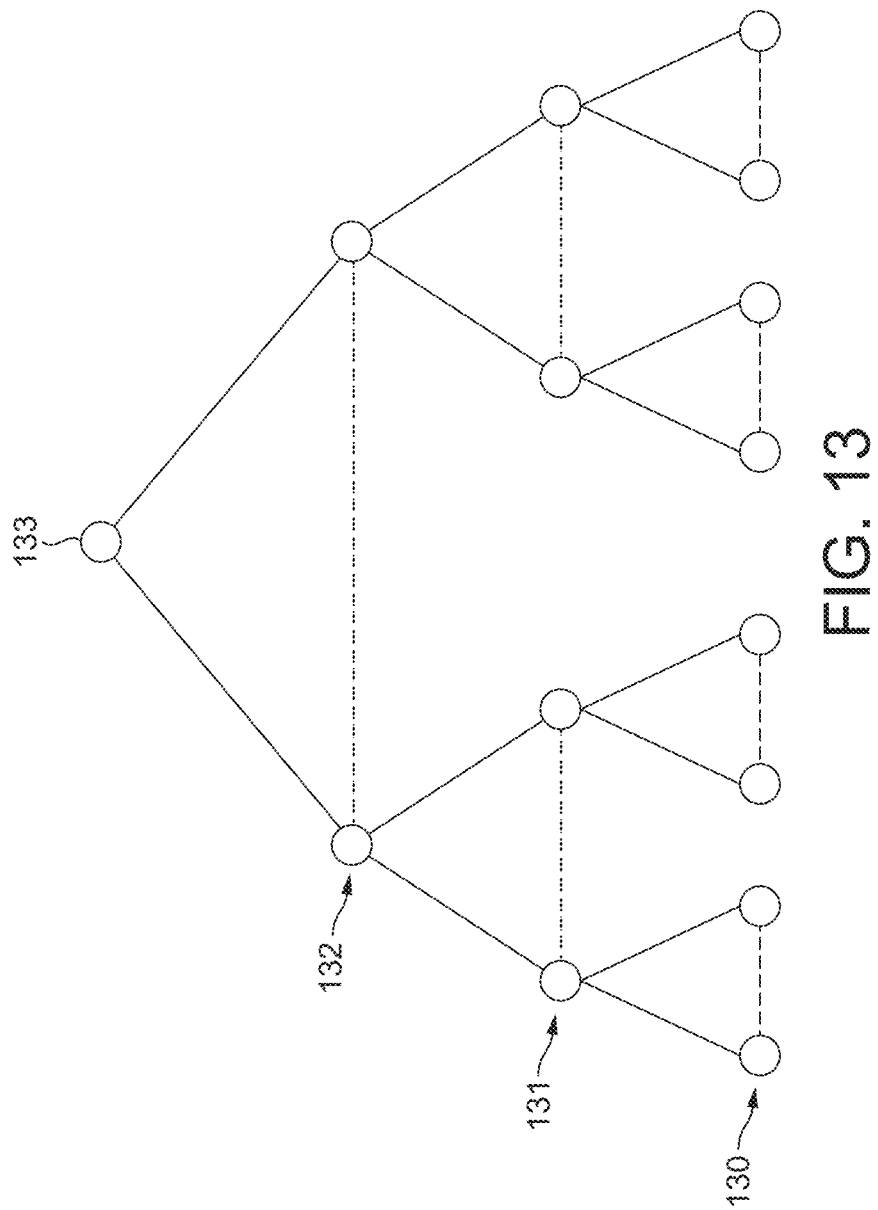
FIG. 13 shows an exemplary tree structure for representing a set of primitives in an embodiment of the technology described herein.

FIG. 13 shows such an exemplary tree structure. Each leaf node 130 corresponds to a subset of primitives and has stored for it the data for that subset of primitives.

The higher level nodes 131, 132 accordingly correspond to the combination of their child nodes, and have stored for them a bounding volume that indicates the volume of space occupied by all of the subsets of primitives of their respective child nodes.

The root node 133 accordingly corresponds to the combination of all of the leaf nodes, and has stored for it a bounding volume that indicates the volume of space occupied by all of the subsets of primitives of the leaf nodes.

Other arrangements of and for the data that is stored for a subset of primitives would, of course, be possible.

FIG. 14 shows schematically the process for generating a tree representation for a set of primitives that is used in the present embodiments.

As shown in FIG. 14, a set of primitives to be processed, e.g. for a draw call, will be received (step 140) and divided into plural sub-sets of primitives in the manner discussed above (step 141).

Once the set of primitives has been divided into plural sub-sets of primitives, a tree representation of the set of primitives is constructed. The first stage in this process is to generate a leaf node of the tree for each respective sub-set of primitives that the set of primitives has been divided into.

To do this, each primitive sub-set is assigned to a leaf node of the tree (step 142).

The leaf nodes are then "built", by determining and storing for each leaf node of the tree, the data representative of the primitives of the sub-set of primitives that the node represents, and data indicating the volume of space that that sub-set of primitives falls within (step 143).

Once the leaf nodes that each represent a given sub-set that the set of primitives has been divided into have been determined and "constructed", the higher level nodes for the tree representation are determined and constructed (step 144). The higher level nodes are built from their respective child nodes, by "merging" their respective child nodes so that each higher level node in the tree represents the combination of the sub-sets of primitives that each of its child nodes represents.

The data that is stored for each higher level node comprises a bounding volume indicating the volume of space that all of its sub-sets of primitives falls within. This bounding volume for a higher level node may be generated, e.g., by taking the minimum and maximum vertex position values along each axis across all of the higher level node's child nodes.

Once the tree representation for the set of primitives has been generated, it is then stored in memory for use (step 145).

Once prepared, the tree representation is then used, as discussed above, to determine (identify) subsets of primitives that could cast a shadow in a (and, e.g., each) sub-volume of the scene being rendered.

To use the tree representation to determine the subsets of primitives that could cast a shadow in a sub-volume, the nodes of the tree are traversed, building up a set of subsets of primitives that could cast a shadow. The tree is traversed from the root node, working down towards the leaf nodes (if the traversal is to continue).

During the traversal, the bounding volume for each node of the tree that is to be considered is tested against the light source bounding frustum(s) for the sub-volume that is being rendered, to determine if any part of the bounding volume falls within the light source bounding frustum. This frustum test is performed using a suitable bounding volume-frustum intersection test.

The result of the light source bounding frustum test for a node is used to determine whether to include the sub-set of primitives for the node in the set of subsets of primitives that could cast a shadow for the sub-volume, and to determine whether and how to continue the traversal of the tree.

The testing process starts with the root node of the tree.

If a node passes the light source bounding frustum test completely (i.e. its bounding volume is completely within the light source bounding frustum), the sub-sets of primitives for all the leaf nodes of the node are then included in (added to) the set of subsets of primitives that could cast a shadow for the sub-volume. The traversal of the tree then continues at the parent of the accepted node (and thus moves to the next child node of that parent node still to be tested (if any)).

Correspondingly, if a node fails the light source bounding frustum test completely (i.e. its bounding volume is completely outside the light source bounding frustum), the sub-sets of primitives for all the leaf nodes of the node are not included in (added to) the set of subsets of primitives that could cast a shadow for the sub-volume. The traversal of the tree again then continues at the parent of the rejected node (and thus moves to the next child node of the parent node of the rejected node still to be tested (if any)).

If a node that is not a leaf node partially passes the light source bounding volume frustum test (e.g. its bounding volume is only partially (but not fully) within the light source bounding frustum), then the sub-sets of primitives for the leaf nodes of the node are not included in the set of subsets of primitives that could cast a shadow for the sub-volume at that stage, but instead the traversal of the tree is continued to the child nodes of the node in question (which are then tested themselves).

Where there is no further child node of a parent node that is still to be tested, the traversal continues at the parent node of the parent node in question (and thus moves to the next child node of the higher level parent node still to be tested (if any)) (continues with the higher level node to be tested next (if any)).

If a leaf node is found to at least partially pass the light source bounding volume frustum test (i.e. its bounding volume is at least partially within the light source bounding frustum), then the sub-set of primitives for the leaf node is included in the set of subsets of primitives that could cast a shadow for the sub-volume. The traversal of the tree then continues at the parent of the accepted leaf node (and thus moves to the next leaf node of that parent node still to be tested (if any)).

This process is repeated until the tree has been completely traversed (until all the nodes in the tree that need to be tested, have been tested).

To generate the set of subsets of primitives, as the tree is traversed a running, master list of subsets of primitives is maintained, and as nodes pass the light source bounding frustum test, the subset(s) of primitives for each new "passing" node are added to the existing "master" list of subsets of primitives.

The output of the tree traversal is a set of subsets of primitives that could cast a shadow in the sub-volume in question (in the form of a list of subsets of primitives indicating the subsets of primitives that could cast a shadow for the sub-volume).

This subsets of primitives information is then provided to the graphics processing unit (GPU) 3 to indicate the subsets of primitives that could cast a shadow for the sub-volume in question. The GPU 3 then processes (renders) the sub-volume, using the indicated list of "shadow-casting" subsets of primitives to determine and simulate the effect of shadows in the sub-volume in the manner discussed above with reference to FIG. 4, etc.

Figure 15:
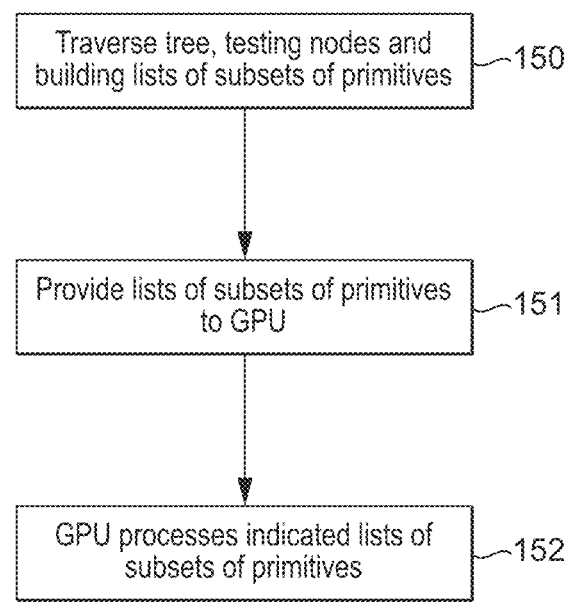
FIG. 15 shows the use of a tree structure in an embodiment of the technology described herein.

FIG. 15 is a flowchart showing the steps of the process of using the tree representation. As shown in FIG. 15, the process starts with traversing the tree, testing the nodes of the tree against the light source bounding frustum 150 and building lists of subsets of primitives using the results of those tests (step 150). The so-determined lists of subsets of primitives are then provided to the graphics processor 3 (step 151), and the graphics processor then processes the indicated lists of subsets of primitives appropriately (step 152).

When using the subsets of primitives that could cast a shadow for a sub-volume to determine and simulate the effect of shadows in the sub-volume, the graphics processor will use the information representative of the primitives of a subset of primitives that is stored for the subsets of primitives in question to determine the position of the primitive of the subset of primitives and thereby perform the occlusion testing against the subset of primitives in the manner discussed above, to determine the effect of a (and of each) subset of primitives that could cast a shadow on the light source visibility for each output sample (e.g. sampling position) of the sub-volume being processed.

This process is repeated for each sub-volume to be processed for the scene in turn, until all the sub-volumes have been rendered for the output frame showing the scene by the graphics processor 3. The process can then move on to the next output frame, and so on.

As discussed above, in an embodiment both the set of primitives for the scene and the set of sub-volumes that the world-space for the scene has been divided into are represented using appropriate bounding volume hierarchies, in the form of tree representations. In this case, in an embodiment the testing of the subsets of primitives against the sub-volumes is performed in a hierarchical manner by traversing the respective tree representations (bounding volume hierarchies) appropriately, starting at the root nodes of each tree and then progressively working down towards the leaf nodes of the trees (if the traversal is to continue).

In an embodiment, all the nodes at a respective level in each hierarchy are tested appropriately against each other, and then the process descends one level (if appropriate) in one of the tree representations (hierarchies) and tests again, and then in an embodiment descends one level in the other tree representation (hierarchy) (if appropriate) and tests again, and so on, until the lowest level leaf nodes of both tree representations (hierarchies) have been reached (if necessary). In general, the hierarchies can be descended in any order (and will produce correct results whatever order is used).

It will be appreciated from the above, that the embodiments of the technology described herein involve a number of processes that will be performed to generate the overall, final, "shadowed" output frame showing the scene.

For example, there will be a stage of building the sub-volumes for the scene. Subsequently those sub-volumes are appropriately "culled" against the light sources to determine the sub-volumes that could be lit by a light source (and which light sources will light each such sub-volume).

There will also be a stage of building the subsets of primitives, and, subsequently, appropriately "culling" those subsets of primitives to determine a set of subsets of primitives that could cast a shadow for the sub-volumes of the scene being rendered. Finally, the determined sets of subsets of primitives that could cast shadows in the sub-volumes are then used when rendering the scene to determine and simulate the effects of shadows in the rendered scene. These various processes may be carried out at different points in time and in different places in the overall graphics processing system.

Figure 16:
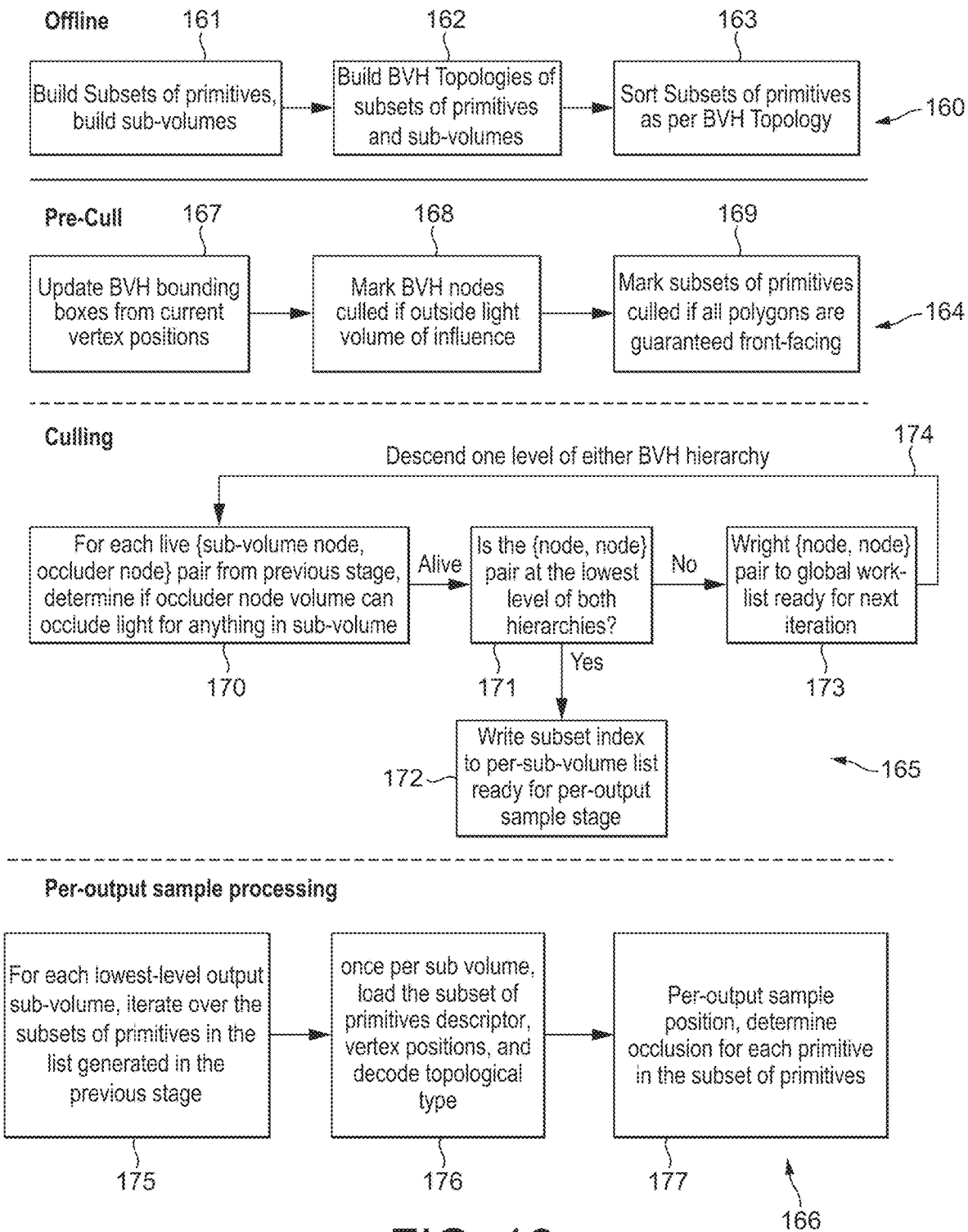
FIG. 16 shows schematically an embodiment of the operation of the graphics processing system of FIG. 1 in accordance with the technology described herein.

FIG. 16 shows schematically the various stages of the overall operation of the present embodiments.

As shown in FIG. 16, the process starts with the construction of the sub-volumes of the scene world-space volume and of the subsets of primitives 160. This process comprises dividing the world-space volume for the scene into appropriate sub-volumes (step 161), and then building the bounding volume hierarchy (tree structure) topology of the sub-volumes (step 162), and correspondingly dividing the set of primitives in question into appropriate subsets of primitives (step 161), and then building the bounding volume hierarchy (tree structure) topology of the subsets of primitives (step 162). Finally, the subsets of primitives may be sorted based on the bounding volume hierarchy (tree structure) topology (step 163). This sorting may, as discussed above, comprise, e.g., sorting the subsets of primitives into respective groups of subsets of primitives each of which will be represented by a given tree structure, such that the individual groups of subsets of primitives that are represented by a given tree structure have as small a size as possible (e.g. measured in terms of the sum of the axis extents of their bounding boxes and/or the surface areas of their bounding boxes).

As shown in FIG. 16, this process of building the sub-volumes and subsets of primitives and the corresponding bounding volume hierarchy topologies can be performed offline, in advance of the generation of the output frame in question, e.g. on a CPU (e.g. of the overall graphics processing system). It could also, e.g., be performed by the driver for the graphics processor that is to perform the graphics processing, if desired.

As shown in FIG. 16, once the sub-volumes and subsets of primitives and their bounding volume topologies (tree structures) have been constructed, that information can then be used to perform the operations discussed above when generating an output frame. As shown in FIG. 16, these operations can be divided into a pre-culling stage 164, a culling stage 165 and finally the per-sampling point (per-output sample) processing stage 166.

These processes can all be, and are in an embodiment, performed at "run time", on the graphics processor.

As shown in FIG. 16, the pre-culling stage 164 may comprise first updating the bounding volume hierarchy (tree structure) bounding boxes for the sub-volumes and subsets of primitives using the current vertex positions (step 167) (if appropriate and desired).

This may be appropriate to allow for any animation of the geometry (e.g. a character's lips, cheeks, etc. could move as they talk). In this case, it may be assumed that the topology of the vertices which form the primitives in question remains the same, but the actual vertex positions will change. At this stage therefore the bounding volumes could be updated with the new vertex position data (but with the topology for the subsets of primitives remaining the same). In this case, a "reference pose" (e.g. of the character "at rest" in a non-animated state) could be used to build the subsets of primitives (and sub-volumes, if desired) initially.

It would also be possible as part of this pre-culling processing 164 to allow for any animation of the geometry in this step of updating the bounding volume hierarchy bounding boxes from the current vertex positions, if desired.

It is then determined, as discussed above, whether any of the sub-volumes and subsets of primitives fall completely outside the light volume of influence (and any such primitive subsets and sub-volumes are then culled at this stage) (step 168).

As shown in FIG. 16, there may also be a step of culling subsets of primitives if it can be determined that all the primitives in the subset of primitives are guaranteed to be front-facing (step 169). This may be used to cull subsets of primitives where the shadow determination process assumes that primitives (and thus subsets of primitives) that entirely face the light will not cast shadows (i.e. that only primitives that are facing a sampling position (and thus whose back-face is "seeing the light") can cast shadows.

The facing direction of the subsets of primitives can be determined, e.g., by checking the normals for the subsets of primitives.

It would also be possible after this pre-culling stage 164 to regenerate the bounding boxes for the subsets of primitives (occluding geometry) and/or sub-volumes, if desired. This may provide tighter bounding boxes and thus more efficient culling and faster performance for the later stages of the process, notwithstanding the processing required to regenerate the bounding boxes.

The result of the pre-culling stage 164 will be a reduced, overall set of sub-volumes for which it should be determined whether there are any subsets of primitives that could cast a shadow within the sub-volume, and a reduced, overall set of subsets of primitives that can then be tested against each sub-volume to be tested to determine a set of subsets of primitives that could cast a shadow for each such sub-volume.

This process is shown as the culling stage 165 in FIG. 16.

As shown in FIG. 16, this culling stage 165 comprises testing each subset of primitives bounding volume hierarchy (tree structure) node (each occluding geometry node) and each sub-volume bounding volume hierarchy (tree structure) node (each sub-volume (output volume) node) pair to determine if the subset of primitives bounding volume hierarchy node volume (the occluder node volume) can occlude light for anything in the sub-volume bounding volume hierarchy node bounds (in the output sub-volume node volume) (step 170).

If it is determined that the "occluder node" could occlude the light for anything in the sub-volume node volume, it is then determined if the primitive subset bounding volume hierarchy node and the sub-volume bounding volume hierarchy node are at the lowest level of both hierarchies (step 171). If so, the primitive subset in question (i.e. represented by the occluder bounding volume hierarchy node in question) is added to the per-sub-volume list of subsets of primitives for the sub-volume corresponding to the sub-volume bounding volume hierarchy node in question ready for the per-output sample stage (step 172).

On the other hand, if the lowest level of both hierarchies has not yet been reached, the subset of primitives bounding volume hierarchy node (the occluder hierarchy node) and the sub-volume bounding volume hierarchy node pair is added to a global worklist ready for the next iteration (step 173), and the process then descends 174 one level of either the occluder subset of primitives bounding volume hierarchy (tree structure) or the output sub-volume bounding volume hierarchy (tree structure), to perform the test at the next lower level of the hierarchy.

This is continued until all of the subsets of primitives have been appropriately tested against all the sub-volumes to be considered.

The output of the culling stage 165 will be respective lists of subsets of primitives that could cast a shadow for each (appropriate) sub-volume of the scene.

The sub-volumes are then processed (e.g. rendered) in the per-output sample processing stage 166 to determine the occlusion (the visibility parameter) for each desired output sample (e.g. sampling position) in the sub-volume.

As discussed above, and as shown in FIG. 16, this comprises, inter alia, for each sub-volume iterating over the subsets of primitives in the list generated in the culling stage (step 175), and once per sub-volume, loading the appropriate subset of primitives descriptor and vertex positions for each subset of primitives to be considered for the sub-volume and decoding the vertex positions and topological type for the subset of primitives (step 176), and then using that information to determine the per-output sample occlusion for each primitive in the subset of primitives (step 177).

This is repeated for each subset of primitives listed as potentially casting a shadow in the sub-volume in question (and is correspondingly repeated for each desired sub-volume of the output frame to be generated).

The above operations of the present embodiments (and of the technology described herein) can be implemented as desired. For example, it would be possible to perform the culling stage 165 in its entirety to provide complete sub-volume lists of subsets of primitives to be tested, and then thereafter perform the per output sample processing 166. Alternatively, these stages could be "interleaved", e.g., such that some culling 165 is performed, then some per output sample processing 166 is performed using the results of the culling that has been performed, before then performing further culling, and then further output sample processing using the results of that further culling, and so on. This may make the process more efficient, as it may allow the results of the culling stage 165, etc., to be retained locally (in local buffers) for use by the output sample processing stage 166, rather than having to write the culling stage 165 results out to, e.g. main memory.

In an embodiment, some culling 165 is performed until a local buffer of occluding geometry is filed, and then output sample processing 166 is performed for that occluding geometry so as to free up more space in the buffer. This is then repeated to "refill" the buffer with more occluding geometry, which is then used for further output sample processing to free up space in the buffer, and so on. This can then allow a smaller, local "occluding geometry" buffer that may be more limited in size to be used for storing the occluding geometry that is to be tested when performing the per output sample processing 166.

Thus in an embodiment, the determination of the geometry that could cast shadows and the subsequent use of that geometry to determine light source visibility parameters for output samples is performed in an interleaved manner, by performing some occluding (shadow casting) geometry determination for the scene (e.g., and in an embodiment, until a local buffer for storing a set(s) of occluding (shadow casting) geometry is full and/or reaches a threshold level of data), then performing output sample processing using the results of the occluding geometry processing that has been performed to date (e.g., and in an embodiment, using the occluding geometry stored in the local buffer), and then performing further occluding (shadow casting) geometry determinations (e.g., and in an embodiment, when the local buffer is empty and/or falls below a threshold level), and then performing further output sample processing using the further determined shadow casting (occluding) geometry, and so on.

Various modifications, additions, and alternatives to the above-described embodiments of the technology described herein would be possible, if desired.

For example, although the present embodiment has been described above with reference to testing "light source bounding frustums" to determine subsets of primitives that could cast a shadow in a given frame region (tile), it would alternatively be possible to test for this by trying to find a "splitting plane", where the light and the sub-volume to be lit are on one side of the plane, and the potentially occluding geometry (e.g. subset of primitives) is on the other side of the plane.

The present embodiments have been described above primarily with the output samples for which light source visibility parameters are determined and that are then correspondingly shaded using those light source visibility parameters, being screen space sampling positions that are to be rendered when rendering an output frame representing the scene in question.

However, it would also be possible for those output samples (sampling positions) to correspond to other defined positions, such as, defined vertex positions for the scene, defined discrete output sample positions for the scene (e.g. representing a cloud of particles, such as smoke or other particles, that is present in the scene), and/or other sampling positions defined for surfaces in the scene. Indeed, it is an advantage of the present embodiments that they can be used to derive light source visibility parameters per-vertex or for an arbitrary set of points.

Also, the above embodiments have been described primarily with respect to an arrangement in which the set of output samples to be considered for a given sub-volume are known (it is known which sub-volume the output samples fall within (correspond to)).

However, it could be the case that a given output sample to be processed is not directly associated with a particular sub-volume. This could be the case, for example, where the output samples correspond to an array of arbitrary positions in the world-space volume for the scene, and the sub-volumes have simply been defined by subdividing the world-space volume for the scene into sub-volumes, without any reference to that set of sampling positions.

In such cases, it may be necessary to first determine which sub-volume a given output sample falls within, before then using the set of determined geometry for that sub-volume to determine a light source visibility parameter for the output sample in question. This can be done, e.g., by mapping the position for the output sample to the appropriate sub-volume.

Thus in an embodiment the process of the present embodiments will comprise first determining for a, e.g. plural, e.g. each, output sample (e.g. vertex or sampling position)) which sub-volume it is in, and then iterating through the set of geometry (e.g. set of subsets of primitives) for that sub-volume to determine a light source visibility parameter for the output sample in question.

So far as the light source visibility parameters are concerned, this process could be adapted to take account of transparent primitives. For example, when a rasterisation process to compute visibility for the sample points is performed, the resulting set of bits could be modulated by a random set of bits whose ratio of set bits is proportional to the transparency (or opacity) of the primitive (geometry) in question. Alternatively, if the sample points themselves are suitably randomised, they could be modulated by a simple fixed bit-string with an appropriate ratio of set bits. It would also be possible to extend this to provide fully coloured RGB transparency, by having one bit each for each colour channel R, G, B (for each visibility sample).

Also, although the above embodiments have been described in the context of a tiled deferred renderer, this is not essential, and the present embodiments (and the technology described herein) can be used with and for other forms of renderer. Thus, for example, the present embodiments and the technology described herein could be used with other tiled methods, such as "tiled forward rendering" (also known as "forward plus"), and also with non-tiled renderers. With a non-tiled renderer, a tiled approach could be used to render the light source visibility parameters into respective sub-volume visibility buffers, with the final rendering (shading) then being performed in a separate pass.

Also, although the present embodiments have been described with reference to the use of the present embodiments for an area light, it would also be possible to use the techniques of the present embodiments for point ("punctual") lights, if desired. In this case, for example, a single light source sampling position for the point light could be used.

It will be seen from the above that the technology described herein, in its embodiments at least, provides a graphics processing method and system that can simulate the effect of shadows in an output being rendered in a more efficient and effective manner, and that can, for example, be used to simulate the effect of shadows for, e.g., arbitrary sets of points, such as clouds of particles, such as smoke, defined for a scene.

This is achieved in the embodiments of the technology described herein at least, by dividing the world-space volume for a scene being rendered into a plurality of sub-volumes, and then determining for one or more of those sub-volumes, a set of geometry that could cast a shadow in the sub-volume, and then using the determined sets of geometry for the sub-volumes to determine light source visibility parameters for output samples for the scene.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

The invention claimed is:

1. A method of operating a graphics processing system when rendering a scene for output that includes a light source that could cast shadows, the method comprising:
   partitioning by processing circuitry the world-space volume for the scene to be rendered into a plurality of sub-volumes;
   once the world-space volume for the scene to be rendered has been partitioned into a plurality of sub-volumes:
   determining by processing circuitry which of the sub-volumes that the world-space volume for the scene has been divided into could be lit by a light source for the scene; wherein determining whether a sub-volume could be lit by a light source for the scene comprises:
      determining whether the sub-volume is located within the volume of influence of the light source; and
      when it is determined that the sub-volume is located outside of the volume of influence of every light source for the scene, determining that the sub-volume could not be lit by a light source for the scene;
   culling by processing circuitry any sub-volume that it has been determined could not be lit by a light source for the scene;
   after culling any sub-volume that it has been determined could not be lit by a light source for the scene, for at least one sub-volume for the scene being rendered that has not been culled:
      determining by processing circuitry a set of geometry to be processed for the scene that could cast a shadow from a light source to be considered for the scene in the sub-volume; and
   for at least one output sample for the scene being rendered:
      determining by processing circuitry a light source visibility parameter using the determined set of geometry for a sub-volume that the world-space volume for the scene has been partitioned into;
   the method further comprising:
   for an output sample for which a light source visibility parameter has been determined:
      using by processing circuitry the determined light source visibility parameter for the output sample to modulate the effect of the light source at the output sample when rendering an output version of the output sample.

2. The method of claim 1, further comprising:
   partitioning by processing circuitry the world-space volume for the scene into a plurality of sub-volumes based on the position and volume of each sub-volume; or
   partitioning by processing circuitry the world-space volume for the scene into a plurality of sub-volumes by dividing structural elements defined in the world-space for the scene into plural groups of those structural elements to thereby divide the world-space volume for the scene into a plurality of sub-volumes.

3. The method of claim 1, further comprising:
   partitioning by processing circuitry the world-space volume for the scene into a plurality of sub-volumes by dividing structural elements defined in the world-space for the scene into plural groups of those structural elements to thereby divide the world-space volume for the scene into a plurality of sub-volumes;
   wherein the structural elements defined in the world-space for the scene comprise one or more of: a set of vertex positions defined for the scene; and a set of points in the 3D world-space defined for the scene.

4. The method of claim 1, further comprising:
   partitioning by processing circuitry the world-space volume for the scene into a plurality of sub-volumes by dividing structural elements defined in the world-space for the scene into plural groups of those structural elements to thereby divide the world-space volume for the scene into a plurality of sub-volumes;
   wherein dividing structural elements defined in the world-space for the scene into plural groups of those structural elements comprises dividing the structural elements defined for the scene into groups based on the size of the volume of world-space that will be occupied by the structural elements of the groups.

5. The method of claim 1, comprising:
   generating by processing circuitry a tree representation for representing the sub-volumes that the world-space volume has been divided into, the tree representation being configured such that each leaf node of the tree represents one of the sub-volumes that the world-space volume has been divided into, and each parent node of the tree represents a volume of the world-space volume corresponding to the combination of the sub-volumes of all of its child nodes;
   and
   generating and storing by processing circuitry for each leaf node of the tree representation, data indicating the volume of world-space that the sub-volume that the leaf node represents falls within, and, optionally, data representative of graphics structural elements defined for the scene that fall within the sub-volume that the leaf node represents.

6. The method of claim 1, comprising:
   determining by processing circuitry the set of geometry that could cast a shadow from a light source for a sub-volume by:
   sorting by processing circuitry a set of primitives to be processed for the scene into plural subsets of primitives; and
   determining by processing circuitry the subsets of primitives that could cast a shadow from a light source for the sub-volume.

7. The method of claim 1, wherein:
   the output sample or samples for the scene for which a light source visibility parameter is determined comprise one or more of:

a set of vertices that are defined for the scene;
a set of points that are defined for the scene; and
a set of screen space sampling positions to be rendered when rendering a frame representing the scene.

8. The method of claim 1, comprising:
determining by processing circuitry a light source visibility parameter for an output sample for the scene being rendered by:
determining by processing circuitry which sub-volume of the set of sub-volumes that the world-space volume for the scene to be rendered has been partitioned into, the output sample falls within; and
then using by processing circuitry the determined set of geometry that could cast a shadow from a light source to be considered for the scene for that sub-volume to determine a light source visibility parameter for the output sample.

9. The method of claim 1, comprising determining by processing circuitry light source visibility parameters for output samples for a scene being rendered by:
first performing by processing circuitry a lower resolution, coarser light source visibility parameter determining pass that determines light source visibility parameters for output samples at a coarser resolution;
using by processing circuitry the results of the first, coarser light source visibility parameter determination pass to select regions of the scene for which to perform a second, higher resolution light source visibility parameter determining pass; and
performing by processing circuitry a second, higher resolution light source visibility parameter determining pass that determines light source visibility parameters for output samples at a higher resolution than the first pass for the selected regions of the scene.

10. A graphics processing system comprising:
partitioning processing circuitry configured to, when rendering a scene for output that includes a light source that could cast shadows, partition the world-space volume for the scene to be rendered into a plurality of sub-volumes;
processing circuitry configured to, once the world-space volume for the scene to be rendered has been partitioned into a plurality of sub-volumes:
determine which of the sub-volumes that the world-space volume for the scene has been divided into could be lit by a light source for the scene; wherein determining whether a sub-volume could be lit by a light source for the scene comprises:
determining whether the sub-volume is located within the volume of influence of the light source; and
when it is determined that the sub-volume is located outside of the volume of influence of every light source for the scene, determining that the sub-volume could not be lit by a light source for the scene; and
cull from the processing to determine a set of geometry to be processed for the scene that could cast a shadow from a light source to be considered for the scene any sub-volume that it has been determined could not be lit by a light source for the scene;
geometry set determining circuitry configured to determine, after the culling of any sub-volume that it has been determined could not be lit by a light source for the scene, for at least one sub-volume that the world-space volume for the scene has been partitioned into and that has not been culled, a set of geometry to be processed for the scene that could cast a shadow from a light source to be considered for the scene in the sub-volume;
and
light source visibility parameter determining circuitry configured to determine, for at least one output sample for the scene being rendered, a light source visibility parameter using the determined set of geometry for a sub-volume that the world-space volume for the scene has been partitioned into;
the system further comprising processing circuitry configured to use the determined light source visibility parameter for an output sample to modulate the effect of the light source at the output sample when rendering an output version of the output sample.

11. The system of claim 10, wherein the portioning processing circuitry is configured to:
partition the world-space volume for the scene into a plurality of sub-volumes based on the position and volume of each sub-volume; or
partition the world-space volume for the scene into a plurality of sub-volumes by dividing structural elements defined in the world-space for the scene into plural groups of those structural elements to thereby divide the world-space volume for the scene into a plurality of sub-volumes.

12. The system of claim 10, wherein the partitioning processing circuitry is configured to:
partition the world-space volume for the scene into a plurality of sub-volumes by dividing structural elements defined in the world-space for the scene into plural groups of those structural elements to thereby divide the world-space volume for the scene into a plurality of sub-volumes;
wherein the structural elements defined in the world-space for the scene comprise one or more of: a set of vertex positions defined for the scene; and a set of points in the 3D world-space defined for the scene.

13. The system of claim 10, wherein the partitioning processing circuitry is configured to:
partition the world-space volume for the scene into a plurality of sub-volumes by dividing structural elements defined in the world-space for the scene into plural groups of those structural elements to thereby divide the world-space volume for the scene into a plurality of sub-volumes;
wherein the partitioning processing circuitry is configured to divide the structural elements defined for the scene into groups based on the size of the volume of world-space that will be occupied by the structural elements of the groups.

14. The system of claim 10, wherein the partitioning processing circuitry is configured to generate a tree representation for representing the sub-volumes that the world-space volume has been divided into, the tree representation being configured such that each leaf node of the tree represents one of the sub-volumes that the world-space volume has been divided into, and each parent node of the tree represents a volume of the world-space volume corresponding to the combination of the sub-volumes of all of its child nodes;
and
generate and store for each leaf node of the tree representation, data indicating the volume of world-space that the sub-volume that the leaf node represents falls within, and, optionally, data representative of graphics structural elements defined for the scene that fall within the sub-volume that the leaf node represents.

15. The system of claim 10, wherein the geometry set determining circuitry is configured to determine the set of geometry that could cast a shadow from a light source for a sub-volume by:
sorting a set of primitives to be processed for the scene into plural subsets of primitives; and
determining the subsets of primitives that could cast a shadow from a light source for the sub-volume.

16. The system of claim 10, wherein:
the output sample or samples for the scene for which a light source visibility parameter is determined comprise one or more of:
a set of vertices that are defined for the scene;
a set of points that are defined for the scene; and
a set of screen space sampling positions to be rendered when rendering a frame representing the scene.

17. The system of claim 10, wherein the light source visibility parameter determining circuitry is configured to determine a light source visibility parameter for an output sample for the scene being rendered by:
determining which sub-volume of the set of sub-volumes that the world-space volume for the scene to be rendered has been partitioned into, the output sample falls within; and
then using the determined set of geometry that could cast a shadow from a light source to be considered for the scene for that sub-volume to determine a light source visibility parameter for the output sample.

18. The system of claim 10, wherein the light source visibility parameter determining circuitry is configured to determine light source visibility parameters for output samples for a scene being rendered by:
first performing a lower resolution, coarser light source visibility parameter determining pass that determines light source visibility parameters for output samples at a coarser resolution;
using the results of the first, coarser light source visibility parameter determination pass to select regions of the scene for which to perform a second, higher resolution light source visibility parameter determining pass; and
performing a second, higher resolution light source visibility parameter determining pass that determines light source visibility parameters for output samples at a higher resolution than the first pass for the selected regions of the scene.

19. A non-transitory computer readable storage medium storing computer software code which when executing on at least one processor performs a method of operating a graphics processing system when rendering a scene for output that includes a light source that could cast shadows, the method comprising:
partitioning by processing circuitry the world-space volume for the scene to be rendered into a plurality of sub-volumes;
once the world-space volume for the scene to be rendered has been partitioned into a plurality of sub-volumes:
determining by processing circuitry which of the sub-volumes that the world-space volume for the scene has been divided into could be lit by a light source for the scene; wherein determining whether a sub-volume could be lit by a light source for the scene comprises:
determining whether the sub-volume is located within the volume of influence of the light source; and
when it is determined that the sub-volume is located outside of the volume of influence of every light source for the scene, determining that the sub-volume could not be lit by a light source for the scene;
culling by processing circuitry any sub-volume that it has been determined could not be lit by a light source for the scene;
after culling any sub-volume that it has been determined could not be lit by a light source for the scene, for at least one sub-volume for the scene being rendered that has not been culled:
determining by processing circuitry a set of geometry to be processed for the scene that could cast a shadow from a light source to be considered for the scene in the sub-volume; and
for at least one output sample for the scene being rendered:
determining by processing circuitry a light source visibility parameter using the determined set of geometry for a sub-volume that the world-space volume for the scene has been partitioned into;
the method further comprising:
for an output sample for which a light source visibility parameter has been determined:
using by processing circuitry the determined light source visibility parameter for the output sample to modulate the effect of the light source at the output sample when rendering an output version of the output sample.

* * * * *